(12) United States Patent
Brown et al.

(10) Patent No.: US 9,424,417 B2
(45) Date of Patent: Aug. 23, 2016

(54) SECURE CURRENT MOVEMENT INDICATOR

(71) Applicant: QUALCOMM Incorporated, San Diego, CA (US)

(72) Inventors: Craig Matthew Brown, Freshwater (AU); Joel Benjamin Linsky, San Diego, CA (US); Michael William Paddon, Tokyo (JP); Craig William Northway, Aspley (AU)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/295,469

(22) Filed: Jun. 4, 2014

(65) Prior Publication Data

US 2015/0356289 A1 Dec. 10, 2015

(51) Int. Cl.
*G06F 15/16* (2006.01)
*G06F 21/44* (2013.01)
*G06F 21/35* (2013.01)
*H04L 29/06* (2006.01)
(Continued)

(52) U.S. Cl.
CPC .............. *G06F 21/44* (2013.01); *G06F 21/35* (2013.01); *H04L 63/0884* (2013.01); *H04W 12/06* (2013.01); *H04L 63/0853* (2013.01); *H04W 84/18* (2013.01)

(58) Field of Classification Search
CPC ..... G06F 21/31; H04L 63/08; H04L 63/083; H04L 9/32; H04L 63/0861
USPC .......................................................... 726/7
See application file for complete search history.

(56) References Cited

U.S. PATENT DOCUMENTS

| 7,317,377 B2 | 1/2008 | Galperin et al. |
| 2005/0143092 A1 | 6/2005 | Tamaki et al. |
| 2008/0107274 A1 | 5/2008 | Worthy |

(Continued)

FOREIGN PATENT DOCUMENTS

| CN | 102348282 A | 2/2012 |
| EP | 2506201 A1 | 10/2012 |

(Continued)

OTHER PUBLICATIONS

International Search Report and Written Opinion—PCT/US2015/033654—ISA/EPO—Aug. 27, 2015.

*Primary Examiner* — Baotran N To
(74) *Attorney, Agent, or Firm* — The Marbury Law Group, PLLC

(57) ABSTRACT

Methods, devices, systems, and non-transitory processor-readable storage media for authenticating a computing device to access functionalities. An embodiment method may include operations for receiving in the computing device a signal from a proximity beacon device, obtaining from the received signal information that indicates whether the proximity beacon device has detected movement, determining whether the obtained information matches stored data corresponding to the proximity beacon device, performing an abbreviated authentication operations for the computing device to access the functionalities when it is determined that the obtained information from the received signal matches the stored data, and performing a normal authentication operations for the computing device to access the functionalities when it is determined that the obtained information from the received signal does not match the stored data.

30 Claims, 28 Drawing Sheets

(51) Int. Cl.
*H04W 12/06* (2009.01)
*H04W 84/18* (2009.01)

(56) References Cited

U.S. PATENT DOCUMENTS

| | | |
|---|---|---|
| 2009/0019152 A1* | 1/2009 | Huang .................. H04L 67/125 |
| | | 709/224 |
| 2009/0320123 A1 | 12/2009 | Yu et al. |
| 2010/0033299 A1 | 2/2010 | Davis |
| 2011/0151898 A1 | 6/2011 | Chandra et al. |
| 2011/0159850 A1 | 6/2011 | Faith et al. |
| 2011/0314539 A1 | 12/2011 | Horton |
| 2012/0260311 A1 | 10/2012 | Kang |
| 2013/0217332 A1 | 8/2013 | Altman et al. |
| 2013/0281110 A1 | 10/2013 | Zelinka et al. |
| 2013/0282438 A1 | 10/2013 | Hunter et al. |
| 2014/0162685 A1 | 6/2014 | Edge |
| 2014/0274150 A1 | 9/2014 | Marti et al. |

FOREIGN PATENT DOCUMENTS

| | | |
|---|---|---|
| WO | 2013090465 A1 | 6/2013 |
| WO | 2013126747 A2 | 8/2013 |

\* cited by examiner

SECURE CURRENT MOVEMENT INDICATOR

BACKGROUND

Cellular and wireless communication devices, such as smartphones, have seen explosive growth over the past several years. This growth has been fueled by better communications hardware, larger networks, and more reliable protocols. Today's smartphones include cameras, GPS receivers, Bluetooth® transceivers, and of course the cellular communication capabilities (e.g., LTE, 3G and/or 4G network access) to enable the devices to establish data communication links with the Internet. Smartphones are now very widely deployed in society. Additionally, the components and capabilities in smartphones are now very affordable, enabling the capabilities to be deployed in other types of devices.

There are many uses for a device that can report when the device has been moved or is moving. On application is for determining location-based functionality—as long as computing device remains in a particular location (e.g., on the desk), it need not change its security or other settings. Another application is as a theft detector that sends a signal when it is being moved that a service can track. The use of GPS sensors for these applications may be expensive overkill.

SUMMARY

The various embodiments provide methods, devices, systems, and non-transitory processor-readable storage media for authenticating a computing device to access functionalities. An embodiment method may include operations for receiving, in the computing device, a first signal from a proximity beacon device, obtaining, from the received first signal, information that indicates whether the proximity beacon device has detected movement, determining whether the obtained information from the received first signal matches stored data corresponding to the proximity beacon device, performing an abbreviated authentication operation for the computing device to access the functionalities when it is determined that the obtained information from the received first signal matches the stored data, and performing a normal authentication operation for the computing device to access the functionalities when it is determined that the obtained information from the received first signal does not match the stored data. In an embodiment, the first signal may be one of a broadcast message and a secure link. In an embodiment, the method may further include operations for authenticating the proximity beacon device based on the obtained information from the received first signal. In an embodiment, authenticating the proximity beacon device based on the obtained information from the received first signal may include transmitting a message to a server to authenticate the proximity beacon device based on the obtained information from the received first signal, and receiving from the server a response message that indicates whether the proximity beacon device is authenticated. In an embodiment, the obtained information from the received first signal may include an obscured device identifier. In an embodiment, the obtained information from the received first signal may include a 64-bit movement indicator. In an embodiment, the abbreviated authentication operation may include automatically logging into at least one of a WiFi router, a website, and an application or automatically configuring the computing device to operate in a configuration mode. In an embodiment, the method may further include operations for broadcasting a second signal with a device identifier, receiving, from a server, a message that indicates whether a proximity broadcast receiver that received the broadcast second signal has been moved, performing the abbreviated authentication operation for the computing device to access the functionalities when the received message indicates the proximity broadcast receiver has not been moved, and performing a normal authentication operation for the computing device to access the functionalities when the received message indicates the proximity broadcast receiver has been moved.

Further embodiments include a computing device, which may be a computing device configured with processor-executable instructions to perform operations of the methods described above. Further embodiments include a computing device having means for performing functions of the operations of the methods described above. Further embodiments include non-transitory processor readable medium on which are stored processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
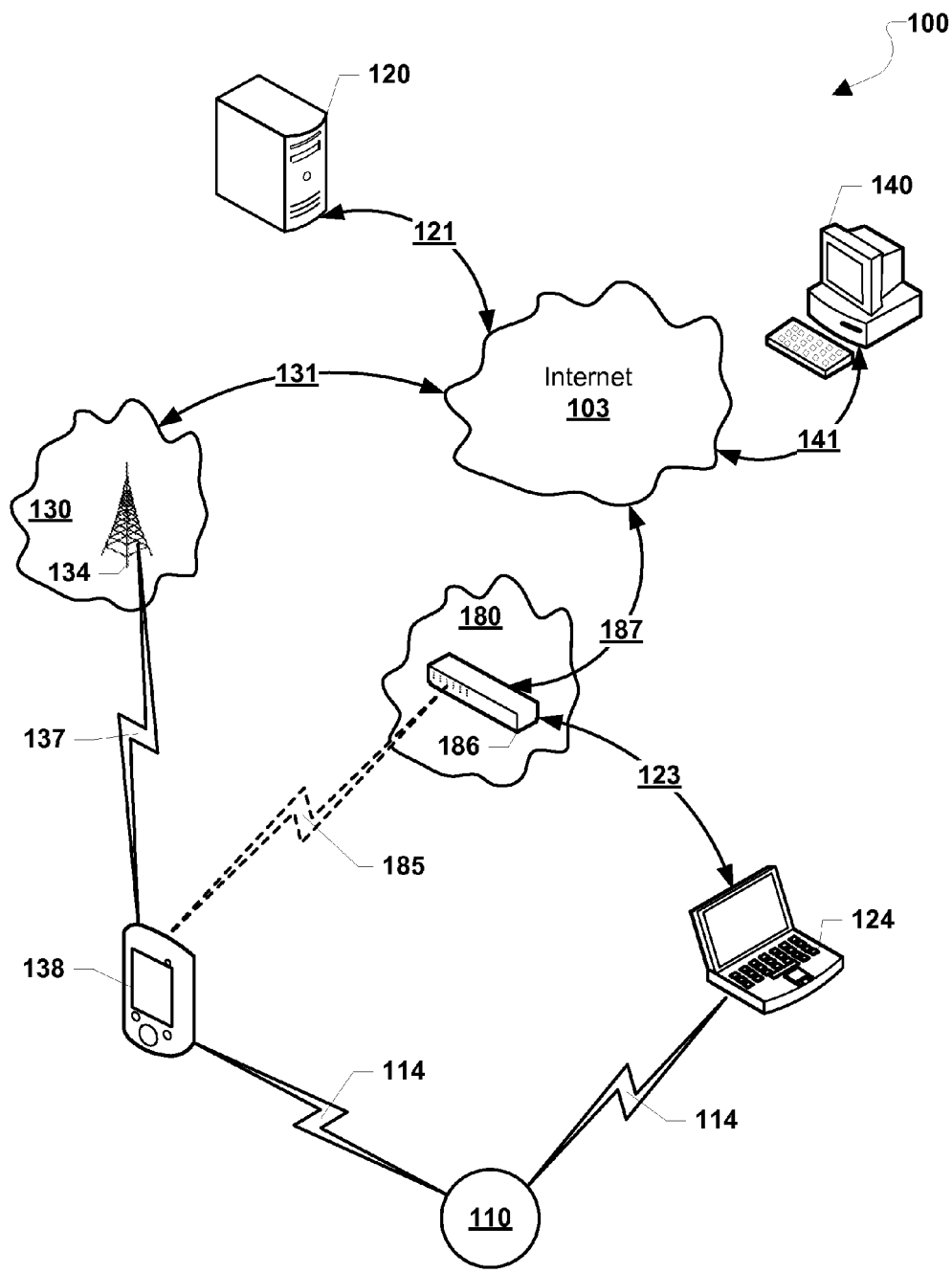
FIG. 1 is a communication system diagram illustrating network components of embodiment architectures suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" or "mobile device" or "computing device" are used herein to refer to any one or all of cellular telephones, smartphones (e.g., iPhone), webpads, tablet computers, Internet enabled cellular telephones, WiFi enabled electronic devices, personal data assistants (PDA's), laptop computers, personal computers, and similar electronic devices equipped with at least a processor. In various embodiments, such devices may be configured with a network transceiver to establish a wide area network (WAN) or local area network (LAN) connection (e.g., an LTE, 3G or 4G wireless wide area network transceiver, a wired connection to the Internet, or WiFi). Further, such devices may also be configured with components for exchanging short-range wireless signals, such as Bluetooth transmissions.

The term "server" is used to refer to any computing device capable of functioning as a server, such as a master exchange server, web server, mail server, document server, and a personal or mobile computing device configure with software to execute server functions (e.g., a "light server"). A server may be a dedicated computing device or a computing device including a server module (e.g., running an application which may cause the computing device to operate as a server). A server module (or server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

The various embodiments include systems, methods, devices, and non-transitory processor-readable storage media for beacon devices to transmit information that provides location awareness to nearby receiver computing devices, such as Bluetooth-capable mobile devices. A beacon device may include a short-range wireless signal transmitter, such as a Bluetooth transmitter, an accelerometer or other sensor that can detect movement of the beacon device, and a processor configured to change information (e.g., an device identifier or 'ID', movement indicator, etc.) transmitted via the transmitter in response to the accelerometer or other sensor detecting that the beacon device has moved. The transmitted information (e.g., ID) may be generated in a manner that enables a remote server to identify and confirm the identity of the beacon device to a receiver computing device reporting receipt of the transmitted information. Because the beacon device transmits a short range signal that includes information that changes in response to movement, a receiver computing device determining that the information (e.g., ID) has not changed can perform operations presuming that the receiver computing device is in the same location (i.e., within close proximity to the beacon device which has not moved) as it was when it first encountered to beacon device. Thus, an authentication or registration process that was performed when information from the beacon device (e.g., ID) was first received and confirmed can be relied on to enable the receiver computing device to perform an abbreviated authentication or registration process. For example, when a smartphone receiver computing device receives from a beacon device a wireless signal that includes expected data (e.g., identifier, value, etc.), the receiver computing device may determine that it is within an office in which the beacon device was previously broadcasting. Receiver computing devices may be configured to perform operations in response to determining they are in proximity to a beacon device in a known (or pre-associated) location, such as abbreviated authentication operations for accessing functionalities appropriate for the known location. For example, a receiver computing device that has determined based on receiving a beacon device ID that it previously received that it is within an office (or other pre-associated location) may utilize an easy setup routine that runs applications, supplies credentials, or performs other menial tasks related to the office or other associated location.

As actual location information (e.g., GPS coordinates or other geographic information, etc.) may not be within signals from beacon devices, a receiver computing device in receipt of a beacon device signal may merely be aware that it is within proximity to a beacon device without being certain the beacon device is still at its pre-associated location. Therefore, a beacon device may transmit information within wireless signals that indicates whether the beacon device has been moved or otherwise re-located to avoid spoofed or otherwise inaccurate information that may improperly cause the receiver computing device to determine it is within a known location. The beacon device may transmit a rolling device identifier, a movement indicator (e.g., a numeric value), or both that change in relation to the beacon device being moved. For example, every time sensor data is detected that indicates movement, the beacon device may be configured to roll, increment, decrement, or otherwise change a number (e.g., a 64-bit register value) included or encoded within its periodic broadcast signals. As another example, every time sensor data is detected that indicates movement, the beacon device may stop rolling an encoded device identifier within periodic broadcasts to indicate movement of the beacon device. Such changing information based on movement may enable nearby receiver computing devices to validate any inference of location from signals received from known beacon devices, thereby making information tamper or movement resistant.

As an illustration, a beacon device may be placed in an office and may periodically broadcast a signal that includes a first identifier. A laptop receiver computing device may store information associating the beacon device and the first identifier with a particular ("first") configuration mode in which the laptop screen does not lock when within proximity of the beacon device (i.e., it is safe to leave the screen unlocked when within the office). When the laptop is in the office receiving wireless signals including the first identifier from the beacon device, the laptop may operate in the first configuration mode. If the beacon device is moved from the office to a lobby area, the beacon device changes the identifier included in broadcasts from the device so that it begins periodically broadcasting a signal including a second identifier. The next time that the laptop receives signals from the beacon device the signals include the second identifier. Because the laptop determines that beacon device signals include a different identifier than previously received, the laptop may not operate in the first configuration mode, and thus may enter another ("second") configuration mode such as a screen lock configuration, because the laptop cannot determine that it is safe to remain in the first configuration, such as the screen unlocked configuration.

In various embodiments, a beacon device may periodically broadcast a secure identifier (e.g., a unique device identifier, MAC address, etc.) using short-range wireless signals (e.g., Bluetooth LE, WiFi, etc.). The secure identifier may be encrypted, encoded, or otherwise obfuscated, such as by encrypting a device identifier using a pseudo-random function or encryption algorithm with a secret key. The beacon device may be registered with a central server and/or other devices so that the secure identifier may be cross-checked. For example, a central server may also utilize the same encryption function and secret key used by the beacon device to decode the secure identifier to obtain an identification code that may be matched to stored identity data for the beacon device.

As beacon device identities may be spoofed or otherwise faked, in various embodiments, authentication of a beacon device may be required before a receiver computing device may perform operations associated with the beacon device and/or its pre-associated location. In particular, a receiver computing device receiving a broadcast message from a beacon device may authenticate the beacon device based on information stored locally on the receiver computing device. For example, the receiver computing device may match a secure identifier to data of previously authenticated beacon devices. Alternatively, the receiver computing device may transmit a message to a central server, causing the central server to perform authentication operations and return information indicating whether the beacon device is or is not authenticated. For example, a central server may decode a rolling identifier to compare with stored information of all registered beacon devices. In another embodiment, authentication operations may not be required when the beacon device and receiver computing device communicate via a secured link, such as a paired Bluetooth connection or other similar secure transport mechanism, as the communication may only be achieved with the pre-authenticated parties.

In an embodiment, the beacon device may be configured to maintain and transmit a movement indicator as a value, number, code, or other data that indicates whether the beacon device has been moved. The movement indicator may be a large numeric (e.g., a 32-bit, 64-bit or 128-bit) identifier such that the beacon device may be capable of changing the movement indicator once a second for an indefinite period without ever using the same value more than once. For example, a 64-bit movement indicator (e.g., a register value) may be incremented in a random, non-repeating way every second without ever duplicating a value within a period of thousands of years. The movement indicator may be broadcast as an extra piece of data in addition to a secure identifier (or a unique device identifier). In an embodiment, the movement indicator may be broadcast in the open and the secure identifier (e.g., a unique device identifier) may be obscured or otherwise require authentication. In an embodiment, the movement indicator may be signed.

In various embodiments, the beacon device may include one or more internal motion sensors, such as an accelerometer, a magnetometer, a piezoelectric sensor, etc., configured to detect motion, acceleration, or other changes in environment. For example, the beacon device may detect when it has been moved based on accelerometer sensor data that exceeds predefined threshold values. Other sensors, such as a barometer, a microphone, a camera, etc., may also be included within the beacon device and monitored to determine when the beacon device has been moved or experienced similar conditions. For example, based on detected environmental changes (e.g., air pressure, light, and/or ambient sound) as indicated in obtained sensor data (e.g., barometer sensor data, camera sensor data, microphone sensor data, etc.), the beacon device may determine it has been moved into a new location. As another example, the beacon device may determine it has been moved in response to an internal switch opening due to the absence of a magnet. In an embodiment, the beacon device may utilize various tolerance thresholds when evaluating sensor data and determining movement. Such thresholds may be used to ignore errata or noise, such as sensor data representing a bump or an earthquake as opposed to the wireless device being picked up and moved. For example, the beacon device may determine that detected accelerometer sensor data having values lower than a predefined threshold value may not represent a movement, but instead may represent a non-actionable event (e.g., a quick bump by a passerby).

Configured to detect movement based on sensor data, the beacon device may be enabled to change information (e.g., the secure identifier and/or a movement indicator) that it periodically broadcasts in response to being moved. For example, the beacon device may roll a rolling identifier in response to detecting sensor data from an accelerator. The beacon device may increment/decrement a value, generate a new or random number as an identifier or movement indicator, or perform other algorithms for adjusting the information it transmits when sensor data is detected that indicates movement. For example, the beacon device may begin (or stop) rolling a device identifier in response to an internal switch opening due to the absence of a magnet. As another example, with every detected movement based on a motion detector sensor, a beacon device may perform an operation on a 64-bit register and broadcast the register's value in a payload. In an embodiment, a previously transmitted information (e.g., an identifier or movement indicator value) may never again be transmitted by the beacon device once movement is detected. In other words, a movement indicator may keep climbing without being reset. For example, when the beacon device initially broadcasts a first code (e.g., a zero) as a movement indicator, after a detected movement the beacon device may never broadcast the first code again, instead broadcasting different codes (e.g., a '1', etc.). In this way, the beacon device may transmit movement indicators that are unique to itself (but not necessarily different from movement indicators of other beacon devices), enabling disambiguation when the beacon device has been moved. In an embodiment, the beacon device may generate a secure identifier using the sensor data, such as using accelerometer data as a source of random numbers that may be in the payload of a broadcast message or used in generating an obfuscated identifier. Accordingly, when the beacon device is moved, it may be configured to broadcast a packet that includes a unique identifier that is changed due to signals from a sensor.

Receiver computing devices may receive messages from beacon devices and determine whether identifiers within the messages are valid (i.e., whether the beacon devices are still in a known location). In particular, receiver computing devices may compare secure identifiers and/or movement indicators from proximity beacon devices to stored identifiers to see if they match. For example, a receiver computing device may compare a newly received movement indicator from a beacon device to a stored identifier that was received when the beacon device was located in an office. Alternatively, receiver computing devices may transmit messages to a central server that may perform validation operations on identifiers. When identifiers from beacon devices are determined to be valid (i.e., the beacon device has not been moved), the receiver computing devices may perform operations associated with the locations related to the beacon devices.

In various embodiments, when it confirms a proximity beacon device has not been moved from a known location, a receiver computing device may perform abbreviated authentication operations (or simplified authentication operations) for accessing functionalities. In other words the receiver computing device may require less or different information from human operators before authenticating them for accessing protected information or services. For example, a laptop that has become location aware of being within proximity of a beacon device in an office may automatically use stored user passwords that otherwise would have to be manually entered into the laptop by a user in order to access websites, intranets, etc. This is beneficial in that sensitive data (e.g., passwords for web sites, email, documents, etc.) may be conveniently and safely accessible when the receiver computing device is determined to be within known locations. The receiver computing device (e.g., a laptop, a smartphone, etc.) may assume that the person using the receiver computing device is known when the receiver computing device is in certain known locations.

In an embodiment, the receiver computing device may be configured to operate in different modes when it confirms a proximity beacon device has not been moved from a known location. For example, when determined to be near a beacon device within a trusted known location (e.g., a home), a laptop receiver computing device may be configured to operate in a configuration mode that permits the receiver computing device's screen to not lock after a certain number of minutes of non-use. As another example, when in a trusted office location, a smartphone receiver computing device may give its user access to some or all the information on the smartphone, such as credentials to authenticate with a network, however when not in the trusted office location, the smartphone may change back to a operational or configuration mode that prompts the user to enter passwords to login, unlock the screen, access network resources, etc.

In an embodiment, identifiers concurrently received from more than one beacon device may be utilized to provide a receiver computing device with location awareness and enable abbreviated access to functionalities. As an illustration: a first beacon device may be associated with a work desk, such as by storing the identity of the first beacon device and its movement indicator in a relational database. A second beacon device may be associated with a verified user (e.g., placed within the user's wallet, purse, backpack, etc.), such as by storing the identity of the second beacon device in the relational database. When a laptop receiver computing device receives broadcast messages from only one of the first and the second beacon devices, nothing may happen (e.g., no configuration mode may change in the laptop, no automatic authentication operations may be available, etc.). However, when the laptop receiver computing device receives broadcast messages from both the first and the second beacon devices, the laptop may perform operations associated with the verified user and the work desk (e.g., automatic login to a work intranet, enters screen unlock mode, auto-log the verified user into low-risk systems, websites, etc.).

In an embodiment, a moved beacon device may be re-validated by updating stored data. For example, after a beacon device changes its broadcast movement indicator due to being moved into a new office, a smartphone receiver computing device may store the changed movement indicator for subsequent use. As another example, a user may provide a new valid movement indicator of a beacon device to a central server for storage via a web portal (e.g., update a beacon profile). As another example, a smartphone receiver computing device may transmit a new valid movement indicator to a central server based on user inputs on the smartphone receiver in response to receiving a broadcast message from a moved beacon device.

The various embodiments of this disclosure are different from typical motion detection techniques that send alarm signals in response to detected movement. The techniques of various embodiments may utilize beacons that continuously transmit signals with a secure identifier and/or a movement indicator that changes in response to detected movement. Further, the embodiment techniques do not transmit location information, but instead identifiers that may be evaluated to determine whether a receiver computing device is within a known location based on its proximity to a beacon device associated with the known location.

For the purpose of simplicity, the following descriptions may refer to the communication framework, devices, and techniques as described in U.S. Provisional Patent Application No. 61/745,308 entitled "Platform For Wireless Identity Transmitter and System Using Short Range Wireless Broadcasts", filed Dec. 21, 2012 and related U.S. Non-Provisional patent application Ser. No. 13/773,379, the entire contents of all of which are hereby incorporated by reference. However, it should be appreciated that the various embodiments may utilize any similar communication framework and devices (e.g., short-range wireless signaling devices or beacon devices) to exchange information enabling location awareness of receiver computing devices.

The term "broadcast message" is used herein to refer to short-range wireless broadcast signals broadcast by wireless identity transmitters (defined below) that may include identification information (i.e., identifiers) associated with the wireless identity transmitters and/or their users. Such identifiers may be periodically changed and encrypted (i.e., rolling identifiers). In various embodiments, broadcast messages may include other identifying information, such as Bluetooth® media access control (MAC) addresses and counters, which may also be encrypted. Additionally, broadcast messages may include metadata and other data, such as characteristics of the transmitting wireless identity transmitter (e.g., device type), sensor data, and/or commands or other instructions. In various embodiments, broadcast messages may be transmitted via a wireless communication protocol, such as Bluetooth Low Energy, WiFi, WiFi Direct, Zigbee®, Peanut®, and other RF protocol. In various embodiments, because of the high unreliability of certain short-range transmission channels, broadcast messages may be single packet transmissions limited to a certain size (e.g., 80 bits, 10 bytes, 20 bytes, etc.). For example, the payload of an embodiment broadcast message may be 80 total bits, including 4 bits that indicate battery status information and 76 bits that indicate a rolling identifier. As another example, an embodiment broadcast message may include 20 bits representing a nonce or counter and 60 bits representing a rolling identifier, such as generated with a pseudo-random function or encryption algorithm.

The term "wireless identity transmitter" is used herein to refer to a beacon device that is configured to periodically transmit broadcast via short-range wireless transmitters messages that include an identifier of the transmitter in addition to the movement indicator. The unique device identifier (i.e., a "deviceID"), such as a factory ID, may be a transmitted encoded number that can be correlated to the device through an algorithm or table lookup procedure by a receiver device or by a server receiving the identifier from a receiver device. In an embodiment, the unique device identifier may be a code 56-bits in length. In various embodiments, for security purposes, this unique device identifier, along with other data (e.g., nonce or counter values), may be encoded, encrypted, or otherwise obfuscated when included within broadcast messages as a "rolling identifier." Wireless identity transmitters may be configured to maintain inaccurate time (e.g., UTC) information, such as by using a 30 ppm 16 kHz crystal oscillator as a clock. In various figures and diagrams of this disclosure, wireless identity transmitters may be referred to as "WIT" or "WITs."

The term "proximity broadcast receiver" is used herein to refer to any computing device that is configured to receive broadcast messages transmitted by wireless beacon devices, such as wireless identity transmitters. In various embodiments, proximity broadcast receivers may be mobile devices configured to operate as proximity broadcast receivers (or "mobile proximity broadcast receivers"). For example, a smartphone or a laptop computing device may be configured to receive broadcast messages and operate as a mobile proximity broadcast receiver. Reference to a particular type of computing device as being a proximity broadcast receiver is not intended to limit the scope of the claims unless a particular type of device is recited in the claims. Further, unless otherwise indicated, references to proximity broadcast receivers throughout this disclosure are not intended to limit any method or system to a particular type of proximity broadcast receiver device. Proximity broadcast receivers are described throughout the disclosure. In various figures and diagrams of this disclosure, proximity broadcast receivers may be referred to as "PBR" or "PBRs," and mobile proximity broadcast receivers are referred to in the figures as "MPBR" or "MPBRs."

The terms "identity transceiver" and "wireless identity transceiver" are used herein to refer to devices that are configured to receive and transmit broadcast messages. In other words, an identity transceiver may function as both a proximity broadcast receiver and an identity transmitter. For example, a smartphone may be configured to broadcast short-range signals that include its unique identifier as well as receive broadcast messages from nearby wireless identity transmitters. Throughout this disclosure, various operations may be described as being distinctly performed by either a wireless identity transmitter or a proximity broadcast receiver; however, those skilled in the art should appreciate that a device configured to operate as an identity transceiver may be configured to perform any or all of the same operations and thus may be interchangeable with references to either a wireless identity transmitter or a proximity broadcast receiver.

The term "sighting message" is used herein to refer to reports, signals, and/or messages sent by proximity broadcast receivers to a central server in response to receiving broadcast messages from wireless identity transmitters. Sighting messages may be transmissions that include part or all of the information encoded in received broadcast messages, including any obscured or encrypted information, such as identifiers of wireless identity transmitters. Additionally, sighting messages may include metadata and other information (or "associated data"), such as the sending proximity broadcast receivers' identification information (e.g., device ID, third-party affiliations, etc.), whether the proximity broadcast receiver paired with a wireless identity transmitter, transmissions context information (e.g., a code indicating the sighting message is related to an alert or a registered service), information regarding software or applications executing on proximity broadcast receivers (e.g., app IDs), location information, proximity information with respect to known areas within a place, and timestamp data. In an embodiment, sighting messages may also include authentication information (e.g., secret keys, passes, special codes, digital certificates, etc.) that may be used by a central server to confirm the identification (or identification information) of proximity broadcast receivers transmitting the sighting messages. For example, a sighting message may include a code from a hash function that can be decoded by the central server to ensure the sending proximity broadcast receiver is associated with a particular registered service. In various embodiments, sighting messages may be sent immediately after receipt of broadcasts (e.g., when related to an alert), buffered, or scheduled along with other scheduled transmissions.

In general, a wireless identity transmitter may be a compact device configured to transmit a packet with at least a movement indicator and an identifier or identification code in a format that can be received by any in a network of proximity broadcast receivers (e.g., cell phones, mobile devices, stationary receivers, etc.) within range of the short-range wireless broadcast. The wireless identity transmitter relies on a short-range wireless signaling (e.g., short-range radio signals, such as Bluetooth Low Energy packets, light signals, sound signals, etc.) to transmit such broadcast messages, and thus only proximity broadcast receivers within the reception range of the short-range wireless signaling may receive such broadcast message. In other words, only receiver devices that are in proximity to beacon devices/wireless identity transmitters will receive their signals, and thus reception of those signals communicates information about the location of the receiver device. Each proximity broadcast receiver receiving a broadcast message from a wireless identity transmitter may pass sighting messages including the encrypted wireless identity transmitter identifiers to a central server for processing. The central server may decode encrypted or obscured information including the identifier within received sighting messages.

As noted above, a wireless identity transmitter may be configured to change the movement indicator value in response to detecting movement of the device via an accelerometer, gyroscope and/or other movement or inertia sensor. The movement indicator value may be changed in a random manner (e.g., through the use of a random number generator and/or random process using a random seed value) such that the same value is never (or very rarely) used twice within the lifetime of the device.

In an embodiment, the identifier of the wireless identity transmitter may be incorporated within the movement indicator value so that the broadcast messages include a single value that can be used by receiving computers to both indicate that the device has moved and uniquely identify the device. For example, the device identifier may be a large prime number, the movement indicator may be a large number that is randomly generated each time movement of the device is detected, and the broadcast message may be the product of these two numbers. In this example, a proximity receiver device will recognize that the wireless identity transmitter has moved because the broadcast value will have changed, and a server receiving the broadcast value can determine the identity of the wireless identity transmitter by dividing the value by the prime numbers of registered transmitters.

In some embodiments, a wireless identity transmitter may be configured to periodically change the manner in which the device identifier is encoded/encrypted or change the identifier itself (referred to herein as a "rolling identifier") in a manner that makes tracking the transmitter difficult while enabling the central server to decode, decrypt or otherwise recognize the unique device identifier (and other identifying information) of the wireless identity transmitter. For example, a wireless identity transmitter may be configured to periodically broadcast a Bluetooth packet including an encoded version of the wireless identity transmitter's device identifier (i.e., deviceID). Such encryption of identifiers indicated in broadcast messages may be required to enable the central server to reliably identify the originator wireless identity transmitter of a broadcast message while forcing a third-party (e.g., passive attacker) to determine the origin of the broadcast message by only guessing. For example, if the identifier was static, the third party could sniff the identifier, such as by impersonating a proximity broadcast receiver, and then use the identifier to track the wireless identity transmitter. Rolling identifiers may make such an attack impossible if the third party lacks the means of generating the encrypted identifiers.

Since a single packet broadcast message may not support a payload that can fit a cipher text of a conventional asymmetric key encryption, standard private/public key pair encryption may not be useable in the various embodiments. Additionally, wireless identity transmitters may be generally broadcast-only devices, so there may be no back channel that is typically required in conventional encryption schemes. Therefore, the central server in various embodiments may process encrypted message payloads by pre-provisioning a shared secret key unique to each wireless identity transmitter. Such secret keys may be associated with each wireless identity transmitter's unique device identifier at the central server and may be used to decode data (e.g., identifiers) encoded by the each wireless identity transmitter. Various techniques for obfuscating, encoding, encrypting, decoding, decrypting, and otherwise enabling secure identifiers suitable for use in the various embodiments of this disclosure are described in related U.S. Provisional Patent Application No. 61/745,395 entitled "Preserving Security By Synchronizing a Counter Between Systems", filed Dec. 21, 2012 and related U.S. Non-Provisional patent application Ser. No. 13/773,336, the entire contents of all of which are hereby incorporated by reference.

Additional precautions may be important to protect against security breaches, such as hacker attacks against databases associated with a central server, as well as to provide registered users (e.g., merchants, parents, children, etc.) peace of mind and confidence their privacy may be fully protected. Such privacy safeguards may be provided to parties registered with embodiment systems by storing identifying information (e.g., names, addresses, financial information, medical information, etc.) separately from other information related to tracking devices and/or proximity information of users. In particular, to avoid unintended leaking of personal information of registered merchants, customers, children, or individuals, embodiment systems may utilize "double-blind" architectures. For example, such a double-blind architecture may use a first unit (e.g., a server, database, or other computing hub) that stores and has access to information related to the proximity information or other location-based data of registered users' devices (e.g., wireless identity transmitters, proximity broadcast receivers, identity transceivers, mobile devices, etc.). In other words, the first unit may access information associated with sighting messages that indicate approximate locations/proximities of various users' devices. However, the first unit may not store uniquely identifying personal information, such as user names, addresses, and/or social security numbers. Instead, a second unit may store the identifying personal information without being configured to access any location/proximity information as used by the first unit. The first and second units may use anonymous identifiers that connect data stored within the two units without indicating the protected information stored in either unit. In an embodiment, the first and second units may be maintained by separate entities (e.g., service providers), and further, at least one of such entities may be trusted by registered users who provide identifying information.

Any mobile device, such as smartphones, equipped with a short-range radio such as a Bluetooth® transceiver may be configured to perform as mobile proximity broadcast receivers and receive identification codes from wireless identity transmitters that may be nearby. Mobile devices are also often equipped with a clock that may provide a current time and a GPS receiver that may provide a current location whenever a wireless identity transmitter identifier is received. The mobile devices may communicate these identification codes, times, and locations via sighting messages to central servers through longer range network connections, such as a cellular radio connection.

Because the broadcast signals should be short range in order to enable the security aspects of the various embodiments, wireless identity transmitters can be relatively small, inexpensive, and simple devices, including little more than a short-range radio, such as a Bluetooth® LE transceiver, and a battery. In various embodiments, wireless identity transmitters may also include additional short-range radios, such as Peanut® radios. In various embodiments, the wireless identity transmitters may not include a user interface, multiple radios, global positioning system (GPS) receiver, or other features common on mobile devices. Embodiment wireless identity transmitters may also consume very little power allowing them to be deployed without needing to be frequently recharged or replaced. These characteristics make them ideal for a wide variety of uses and implementation in a variety of physical configurations. For example, wireless identity transmitters may be easily hidden or incorporated into many different objects, such as desks, closets, bags, etc.

Wireless identity transmitters may also serve to communicate information (e.g., sensor data) or prompt proximity broadcast receivers to take particular actions. In some embodiments, wireless identity transmitters may transmit broadcast messages that indicate one or more behaviors to be performed by a proximity broadcast receiver, such as a mobile phone, in which case the broadcast message may also include a secondary segment corresponding to a command (i.e., a command identifier) or the type of the wireless identity transmitter (i.e., a device type identifier or device type information). Proximity broadcast receivers receiving the broadcast message may take an action based on the identification or secondary code. Alternately, the proximity broadcast receivers may transmit the received broadcast message to the central server, which may return instructions or another code to the proximity broadcast receiver to indicate a behavior to be performed.

In further embodiments, wireless identity transmitters and proximity broadcast receivers may be configured to exchange transmissions using various wireless technologies, such as LTE-D, peer-to-peer LTE-D, WiFi, and WiFi Direct. In an embodiment, wireless identity transmitters may be configured to broadcast messages via a WiFi radio such that proximity broadcast receivers with WiFi transceivers may receive the broadcast messages. In such embodiments, wireless identity transmitters may utilize WiFi transmissions to broadcast identification information similar to WiFi access point broadcast advertisements. For example, a wireless identity transmitter including a WiFi radio may be configured to transmit broadcast messages via WiFi transmissions with low power so that the reception range is limited, thereby providing a short-range radio signal with a range similar to that of Bluetooth LE transmissions. In utilizing various wireless broadcast technologies and communication protocols with wireless identity transmitters, proximity broadcast receivers with limited capabilities may still be capable of receiving and processing broadcast messages from wireless identity transmitters. For example, a smartphone configured to operate as a mobile proximity broadcast receiver and including a WiFi transceiver but not a Bluetooth LE radio may receive and process broadcast messages from a wireless identity transmitter configured to broadcast short-range signals with a WiFi radio. In an embodiment, wireless identity transmitters may broadcast over multiple radios, such as a Bluetooth LE transceiver and a low-power WiFi transceiver, in order to enable more models of proximity broadcast receivers (e.g., more types of smartphones) to receive the message broadcasts.

The various embodiment methods may determine that proximity broadcast receivers are within proximity to wireless identity transmitters based on the receipt of the short-range wireless broadcast messages. Further, embodiments may not require determining exact locations for wireless identity transmitters and/or proximity broadcast receivers but instead may determine approximate and/or relative locations of devices between each other.

In an alternative embodiment, the roles of the beacon and the receiver device as described above may be reversed, with stationary proximity broadcast receivers designed to be placed in particular locations and transmit movement indicators to a central server in sighting messages in response to receiving broadcast messages from mobile wireless identity transmitters or transceivers (e.g., a user carrying a smartphone configured to operate as an identity transceiver, etc.). In such an embodiment, stationary proximity broadcast receivers may be configured to detect when they are moved based on one or more incorporated sensors, such as an accelerometer. For example, a stationary proximity broadcast receiver including an accelerometer that is positioned on a desk may detect when the proximity broadcast receiver is moved based on accelerometer data exceeding a predefined tolerance threshold. The central server may evaluate the movement indicators from the stationary proximity broadcast receivers to determine whether the data indicates movement has occurred, and may then report to user devices (e.g., the smartphone configured to operate as a wireless identity transceiver, etc.) when the stationary proximity broadcast receiver is moved.

FIG. 1 illustrates an exemplary communication system 100 that may be used in various embodiments. The communication system 100 may include at least one wireless identity transmitter 110, such as a Bluetooth® LE transmitter or beacon device. The wireless identity transmitter 110 may be coupled with, installed upon, or otherwise positioned within various locations and/or objects. For example, the wireless identity transmitter 110 may be positioned on a desk within an office (e.g., at work), in a home bedroom (e.g., at home), and/or a vehicle (e.g., cargo truck, car, etc.). The wireless identity transmitter 110 may be configured to transmit a short-range wireless signal 114. For example, the short-range wireless signal 114 may be a periodic broadcast of a Bluetooth advertisement packet (i.e., a broadcast message) that may include an identification code for the wireless identity transmitter 110, such as a rolling or obscured device identifier.

In an embodiment, the short-range wireless signal 114 may correspond to an established wireless communication link (e.g., a secure link via Bluetooth, etc.) between the wireless identity transmitter 110 and a nearby device, such as a proximity broadcast receiver. Such a secure link may be established when the wireless identity transmitter 110 is paired, bonded, or otherwise pre-authenticated with another trusted device.

The short-range wireless signal 114 may be according to any of a variety of communication protocols, such as Bluetooth®, Bluetooth LE®, Wi-Fi, infrared wireless, induction wireless, ultra-wideband (UWB), wireless universal serial bus (USB), Zigbee®, Peanut®, or other short-range wireless technologies or protocols which have or which can be modified (e.g., by restricting transmit power) to limit their effective communication range to relatively short range (e.g., within about 100 meters). In some embodiments, the wireless identity transmitter 110 may use the low energy technology standardized in the Bluetooth® 4.0 protocol (or later versions). For example, in some embodiment systems a wireless identity transmitter 110 may periodically broadcast identification packets configured as an advertiser as described in the Bluetooth® 4.0 protocol.

The Bluetooth® protocol and Bluetooth® devices (e.g., Bluetooth LE devices) have a relatively short effective communication range, are widely used in deployed communication and computing devices, have standard advertising or pairing procedures that meets the discovery and reporting needs of various embodiments, and exhibit low power consumption, which make the protocol ideal for many applications of the various embodiments. For this reason, Bluetooth® and Bluetooth LE protocols and devices are referred to in many of the examples herein for illustrative purposes. However, the scope of the claims should not be limited to Bluetooth® or Bluetooth LE devices and protocol unless specifically recited in the claims. For example, Peanut® transceivers may be included within wireless identity transmitters 110 and may be used to transmit two-way communications with proximity broadcast receivers also configured to utilize Peanut® short-range radio transmissions.

The communication system 100 may also include a first proximity broadcast receiver 138 (e.g., a smartphone mobile computing device) and a second proximity broadcast receiver 124 (e.g., a laptop computing device). The proximity broadcast receivers 138, 124 may be configured to automatically scan for and receive the short-range wireless signals 114 transmitted by the wireless identity transmitter 110. For example, when within proximity (or broadcast range) of the wireless identity transmitter 110, the first proximity broadcast receiver 138 and/or the second proximity broadcast receiver 124 may utilize Bluetooth® radios to receive broadcast messages periodically sent from the wireless identity transmitter 110. Alternatively, when paired, bonded, or otherwise pre-authenticated with the wireless identity transmitter 110, the proximity broadcast receivers 138, 124 may receive information via a secure link established with the wireless identity transmitter 110.

In an embodiment, the proximity broadcast receivers 138, 124 may be in communication with a local area network 180 (or LAN), such as a WiFi network, that may include an Internet access server (not shown) that provides a connection 187 to the Internet 103. In particular, the first proximity broadcast receiver 138 may have a wireless connection 185 to a router 186 (e.g., a WiFi router) associated with the local area network 180, and the second proximity broadcast receiver 124 may have a wired or wireless connection 123 to the router 186. In an embodiment, the first proximity broadcast receiver 138 may be configured to communicate with a cellular network 130 via long range wireless links 137 to one or more base stations 134 that may be coupled to one or more network operations centers (not shown). Such a cellular network 130 may utilize various technologies, such as 3G, 4G, and LTE, and may further include network operations centers (not shown) that may manage voice calls and data traffic through the cellular network 130, and that typically may include or may be connected to one or more servers (not shown). The cellular network 130 may provide a connection 131 to the Internet 103. In another embodiment, the second proximity broadcast receiver 124 may also be configured to communicate with the cellular network 130 via long range wireless links (not shown).

The proximity broadcast receivers 138, 124 may be configured to inspect received broadcast messages to determine whether at least a portion of the message associated with a movement indicator has changed, and to automatically take an action in response to the movement indicator matching or no longer matching a stored value. For example, the proximity broadcast receivers 138, 124 may be configured to execute an abbreviated network authentication routine (e.g., registering with the local area network 180) in response to determining that a received movement indicator matches a previously received movement indicator that is stored in memory, and to execute a normal or more involved network authentication routine in response to determining that the received movement indicator does not match a previously received movement indicator.

The proximity broadcast receivers 138, 124 may be configured to report contact with the wireless identity transmitter 110 (e.g., received broadcast messages) to a central server 120 connected to the Internet 103. For example, the proximity broadcast receivers 138, 124 may transmit a sighting message to the central server 120 that includes a rolling device identifier corresponding to the identity of a user of the wireless identity transmitter 110. Each time a proximity broadcast receiver 138, 124 receives an identifier from a wireless identity transmitter 110, the identifier may be associated with the time of the connection as well as other information (e.g., location information from the proximity broadcast receiver 138, 124), and this information may be transmitted to the central server 120 within a sighting message. In some embodiments, the information for a sighting message may be stored in the memory of the proximity broadcast receiver 138, 124 for later reporting, such as in response to a query message broadcast or multicast by the central server 120. In an embodiment, proximity broadcast receivers 138, 124 may also be configured to operate as wireless identity transceivers that are capable of receiving short-range wireless signals 114 (i.e., broadcast messages) from the wireless identity transmitter 110 as well as transmitting short-range wireless signals for receipt by other devices.

The central server 120 may store the various information reported by sighting messages in a database, which may be used for identifying the wireless identity transmitter 110. Further, the central server 120 may be configured to store registration data, profiles, movement indicators, and other information associated with the wireless identity transmitter 110 and/or the proximity broadcast receivers 138, 124. For example, the central server 120 may include one or more databases that store a last known valid movement indicator of the wireless identity transmitter 110. The central server 120 may include a plurality of components, blades, or other modules to process sighting messages and data received from the proximity broadcast receivers 138, 124. Further embodiments may provide a direct connection (not shown) between the central servers 120 and any of the mobile device network components, such as network operations centers, to more directly connect the proximity broadcast receivers 138, 124 and the central servers 120.

The communication system 100 may also include computing terminals 140, such as personal computers at home or work, through which users may communicate via the connection 141 to the Internet 103 and thus with the central server 120. Such terminals 140 may allow users, such as parents, police, fire, medical attendants, and other authorized authorities to register devices (e.g., wireless identity transmitters 110), access records on the central server 120, and/or to change stored data related to the wireless identity transmitter 110. In an embodiment, users may use such terminals 140 to register wireless identity transmitters 110 and/or proximity broadcast receivers 138, 124 (e.g., smartphones configured to execute client software associated with the central server), such as by accessing web portals and/or user accounts associated with the central server 120. Similarly, third-parties, such as merchants, may use terminals 140 to register wireless identity transmitters 110, and/or proximity broadcast receivers 138, 124 (e.g., stationary receiver devices configured to execute client software and relay broadcast messages to the central server).

Figure 2A:
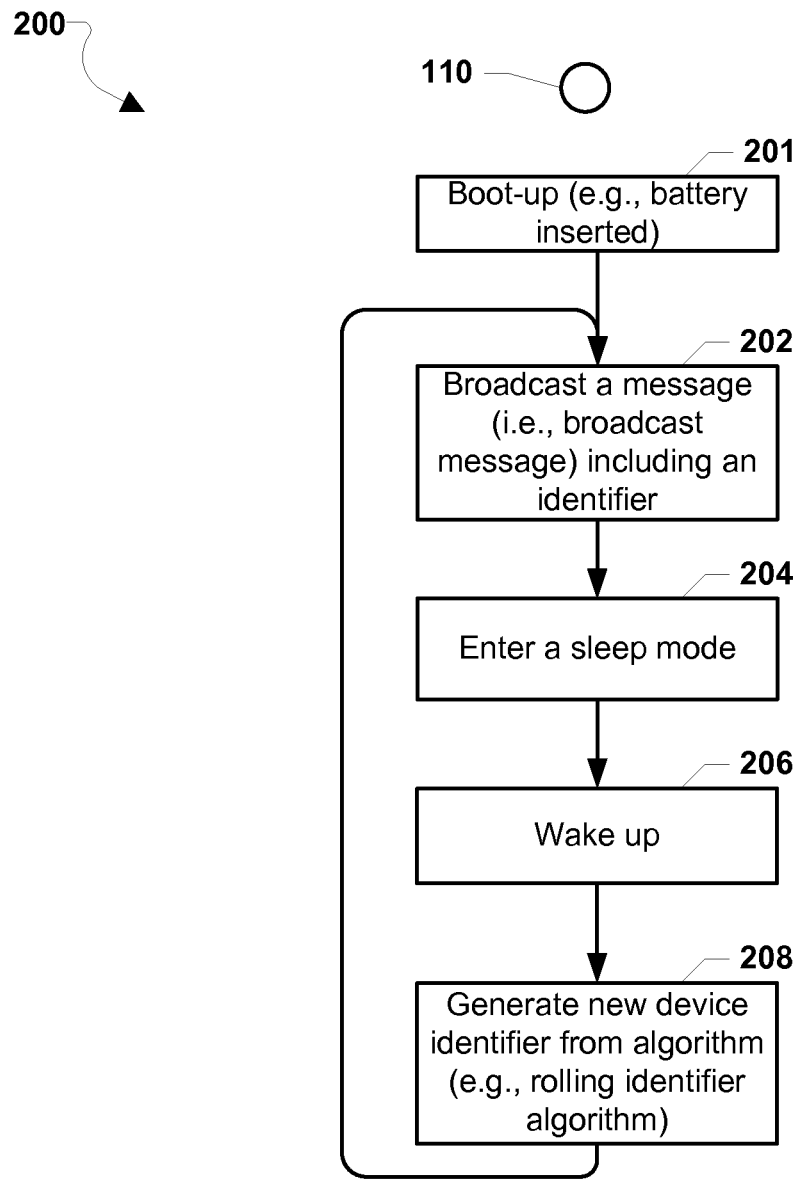
FIG. 2A is a process flow diagram illustrating an embodiment method for broadcasting an identifier from a wireless identity transmitter.

FIG. 2A illustrates an embodiment method 200 for a wireless identity transmitter 110 to periodically broadcast short-range wireless signals (e.g., broadcast messages) for reception by proximity broadcast receivers. In block 201, the wireless identity transmitter may boot-up, such as by becoming energized, initialized, and otherwise configured to operate from a hibernating, sleep, dormant, or otherwise deactivated state. In various embodiments, the boot-up operations may be performed in response to a user input (e.g., a button press), the insertion of a battery in the wireless identity transmitter 110, or receiving a short-range wireless signal (e.g., an activation signal). In block 202, a wireless identity transmitter 110 may broadcast a message that includes an identifier, such as a broadcast message as described above. For example, the processor of the wireless identity transmitter 110 may broadcast a Bluetooth LE advertising packet that includes a rolling device identifier (or an obscured device identifier) as described herein. This may be accomplished in block 202 by a microcontroller within the wireless identity transmitter 110 determining that it is time to broadcast its identifier, configuring a suitable broadcast message (e.g., an advertisement packet as specified for Bluetooth LE devices in the Bluetooth®4.0 protocol), and transmitting that packet via a short-range radio.

In various embodiments, the message broadcast by the wireless identity transmitter 110 (i.e., the broadcast message) may include an identifier segment, such as a rolling identifier. In various embodiments, the broadcast message may also include additional segments, such as a type segment. The type segment may indicate the type of wireless identity transmitter 110. For example, wireless identity transmitters may be marketed for various purposes, such as child safety devices, dog collars, or security tags for stores. The wireless identity transmitter 110 may have a different type segment based on the intended purpose (e.g., one code for child safety devices, a second code for dog collars, etc.). Type segments may be static and set by manufacturers, while the remaining portion of the identifier may be unique to each device, and may roll as described below. The type segment may also be changed by a user, such as when a wireless identity transmitter 110 is reset for a different purpose or application.

In other embodiments, a broadcast message may also include one or more static or dynamic segments with instructions or commands to be implemented by a proximity broadcast receiver. Such command segments may also be passed along to instruct a central server or other network device. Command segments may be set or static, similar to type segments, or may vary over time based on various conditions, such as pairings or data from one or more proximity broadcast receivers. Such command settings may also be configured by a user of the wireless identity transmitter 110. Second or additional segments may also indicate the status of the wireless identity transmitter 110. For example, a second segment may indicate the remaining power or estimated time left before the battery dies. Proximity broadcast receivers or a central server may interpret this status and respond accordingly.

Returning to FIG. 2A, in block 204, the processor of the wireless identity transmitter 110 may enter a sleep mode. For example, after broadcasting the broadcast message having the identifier, the wireless identity transmitter 110 may be configured to enter a power conservation state that may continue for a predetermined period of time. In various embodiments, the wireless identity transmitter 110 may sleep for a predetermined time, never sleep, or sleep for varying times determined based on various inputs. In block 206, the processor of the wireless identity transmitter 110 may wake up from the sleep mode, such as after the predetermined duration expires. In block 208, the processor of the wireless identity transmitter 110 may generate a new device identifier from an algorithm, such as a rolling identifier algorithm. For example, the wireless identity transmitter 110 may generate a rolling identifier using a pseudo-random function or a streaming-like encryption algorithm (e.g., AES-CTR). The wireless identity transmitter 110 may then return to block 202 to broadcast again, such as by broadcasting a message including the newly generated identifier. In various embodiments, the operations in blocks 202-208 may be performed by an identity transceiver (e.g., a smartphone configured to operate as both an identity transmitter and a proximity broadcast receiver).

The algorithm (or rolling identifier algorithm) used in block 208 may generate a rolling identifier which is very difficult to predict or recognize by a device or system that does not know either an identity of the wireless identity transmitter 110 (e.g., a media access control address (MAC) or Bluetooth ID), a decode key, and/or the algorithm used to generate the rolling identifier. As discussed below, the central server 120, configured with the algorithm (or a decoding algorithm) or a decode key, and in possession of the wireless identity transmitter 110 identities, can use the rolling identifier to determine a corresponding account or device identity. While method 200 shows the rolling identifier changing with every wake and broadcast cycle as one example, in other embodiments the identifier may be changed less frequently, such as once per minute, once per hour, etc. In such embodiments, the operation of generating a new identifier in block 208 may be performed only at the designated interval, so at other times upon waking (i.e., block 206) the wireless identity transmitter 110 may return to block 202 to broadcast the identifier. Various algorithms for generating rolling identifiers or other encoded identifiers are discussed in the related applications incorporated by reference above. In an embodiment, the rolling identifier and other information may be communicated within the payload of a Standard Bluetooth LE message packet format (or packet type).

Figure 2B:
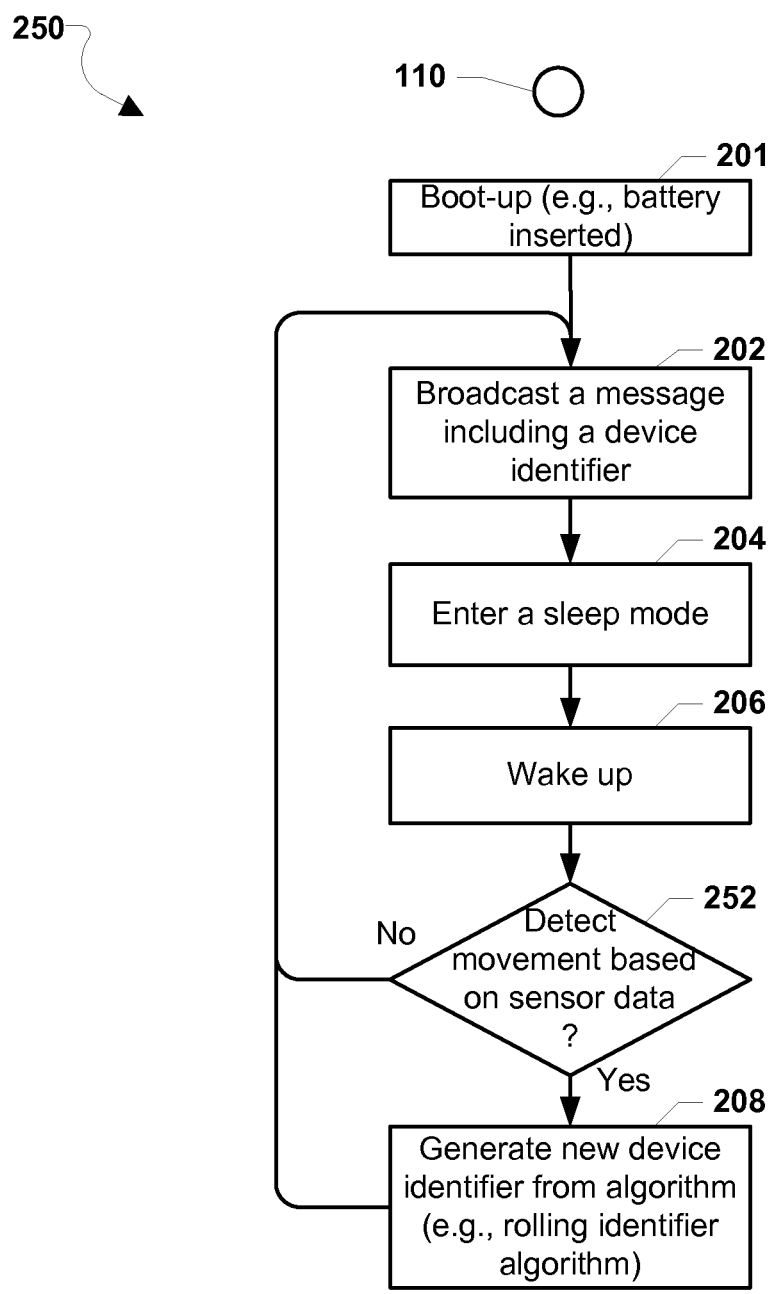
FIG. 2B is a process flow diagram illustrating another embodiment method for broadcasting an identifier from a wireless identity transmitter.

FIG. 2B illustrates another embodiment method 250 for a wireless identity transmitter 110 to broadcast information that may be received by proximity broadcast receivers, such as a smartphone proximity broadcast receiver. The method 250 may be similar to the method 200, except that the method 250 may include operations for changing the broadcast identifier, which in this embodiment also serves as a movement indicator, in response to detected movement of the wireless identity transmitter 110. For example, when the wireless identity transmitter 110 detects accelerometer sensor data from an internal accelerometer indicating the wireless identity transmitter 110 has been thrown, carried, re-oriented, or otherwise moved, the wireless identity transmitter 110 may perform operations, such as executing a routine for generating a rolling device identifier that may be broadcast via subsequent Bluetooth LE broadcast messages.

As described above, in block 201, the processor of the wireless identity transmitter may boot-up and may broadcast a message that includes an identifier in block 202, such as a broadcast message as described above. In block 204, the processor of the wireless identity transmitter 110 may enter a sleep mode, and may wake up from the sleep mode in block 206, such as after a predetermined duration expires.

In determination block 252, the processor of the wireless identity transmitter 110 may determine whether a movement is detected based on sensor data. In particular, the wireless identity transmitter 110 may evaluate data generated by an accelerometer, gyroscope, or other sensor within the wireless identity transmitter 110 to detect whether the wireless identity transmitter 110 has experienced motion or similar activity. For example, the wireless identity transmitter 110 may analyze accelerometer sensor data collected over a period (e.g., a number of seconds, an operational cycle, etc.) to determine whether someone has picked-up or otherwise moved the wireless identity transmitter 110. In an embodiment, the wireless identity transmitter 110 may compare sensor data to predefined values to determine whether sensor data indicating motion exceeds a minimum threshold. For example, when accelerometer sensor data indicates a slight and/or quick movement was experienced, the wireless identity transmitter 110 may determine that the movement does not exceed a minimum threshold and therefore may not determine that the wireless identity transmitter 110 was moved. In an embodiment, the wireless identity transmitter 110 may be configured to only determine a movement occurred when sensor data indicates movement to have been experienced over a certain duration. For example, the wireless identity transmitter 110 may determine a movement occurred only when accelerometer sensor data indicates motion was consistently experienced at the wireless identity transmitter 110 for a number of seconds, minutes, etc.

In an embodiment, in response to determining movement is detected based on sensor data, the wireless identity transmitter 110 may set stored information, such as a flag, variable, bit, or other data, to indicate movement has been experienced. Such stored information may be reset periodically, such as at the end of each operational loop of the method 250, or alternatively based on a detected event. For example, once movement is detected, the stored information may indicate movement has been experienced until the wireless identity transmitter 110 has been rebooted or a user has provided a reset input (e.g., tapped a reset button).

If movement is not detected based on sensor data (i.e., determination block 252="No"), the processor of the wireless identity transmitter 110 may continue with the operations in block 202 by broadcasting the same identifier, such as by broadcasting the default device identifier that has not been adjusted or alternatively the last generated device identifier when no further movements are experienced after generating the last device identifier. In this way, the wireless identity transmitter 110 may be configured to broadcast the same device identifier while in the same location.

If movement is detected based on sensor data (i.e., determination block 252="Yes"), in block 208, the processor of the wireless identity transmitter 110 may generate a new device identifier from an algorithm that minimizes the chances that the same number will be broadcast by the same device twice in its lifetime. The wireless identity transmitter 110 may then return to block 202 to broadcast again, such as by broadcasting a message including the newly generated device identifier. By repeating the operations in blocks 202 through 252, a new device identifier may be generated each time movement is detected. Thus, in this embodiment the device identifier also serves as the movement indicator, as the identifier changes in response to all significant movements (i.e., movements exceeding the threshold).

In an embodiment, the wireless identity transmitter 110 may continue generating and broadcasting new device identifiers in response to a single detected movement (e.g., a one-time move of the wireless identity transmitter 110 from office to office, etc.). In other words, once a movement is detected, the wireless identity transmitter 110 may always generate a new device identifier, such as once every second for an indefinite period. In another embodiment, the wireless identity transmitter 110 may be configured to discontinue generating and broadcasting new device identifiers in response to receiving a signal from a nearby beacon device and/or user inputs, such as a user pressing a halt button on the wireless identity transmitter 110. As an illustration of these embodiments, in response to a user (e.g., the owner) purposefully moving the wireless identity transmitter 110 from a first office to a second office, a wireless identity transmitter 110 may begin generating and broadcasting new device identifiers indefinitely. However, as the user intended to move the device, he/she may then press a 'halt' button on the wireless identity transmitter 110 that causes the wireless identity transmitter 110 to stop changing the identifier and continue broadcasting the last generated device identifier until the next time the wireless identity transmitter 110 is moved. The user's computing devices may then record in memory the stable last generated device identifier for subsequent comparisons to received device identifiers to recognize when the wireless identity transmitter 110 moved again.

In another embodiment, the wireless identity transmitter 110 may be configured to only generate new device identifiers in response to not detecting movement based on the sensor data (i.e., determination block 252="No"). In other words, by default, the wireless identity transmitter 110 may perform the operations described above in FIG. 2A, and may only cease generating new device identifiers periodically in response to detecting movement. In this way, a server or other device configured to look for a rolling or otherwise changing identifier from the wireless identity transmitter 110 may determine movement occurred when a broadcast identifier no longer rolls or is not otherwise adjusted on a periodic basis.

Figure 3:
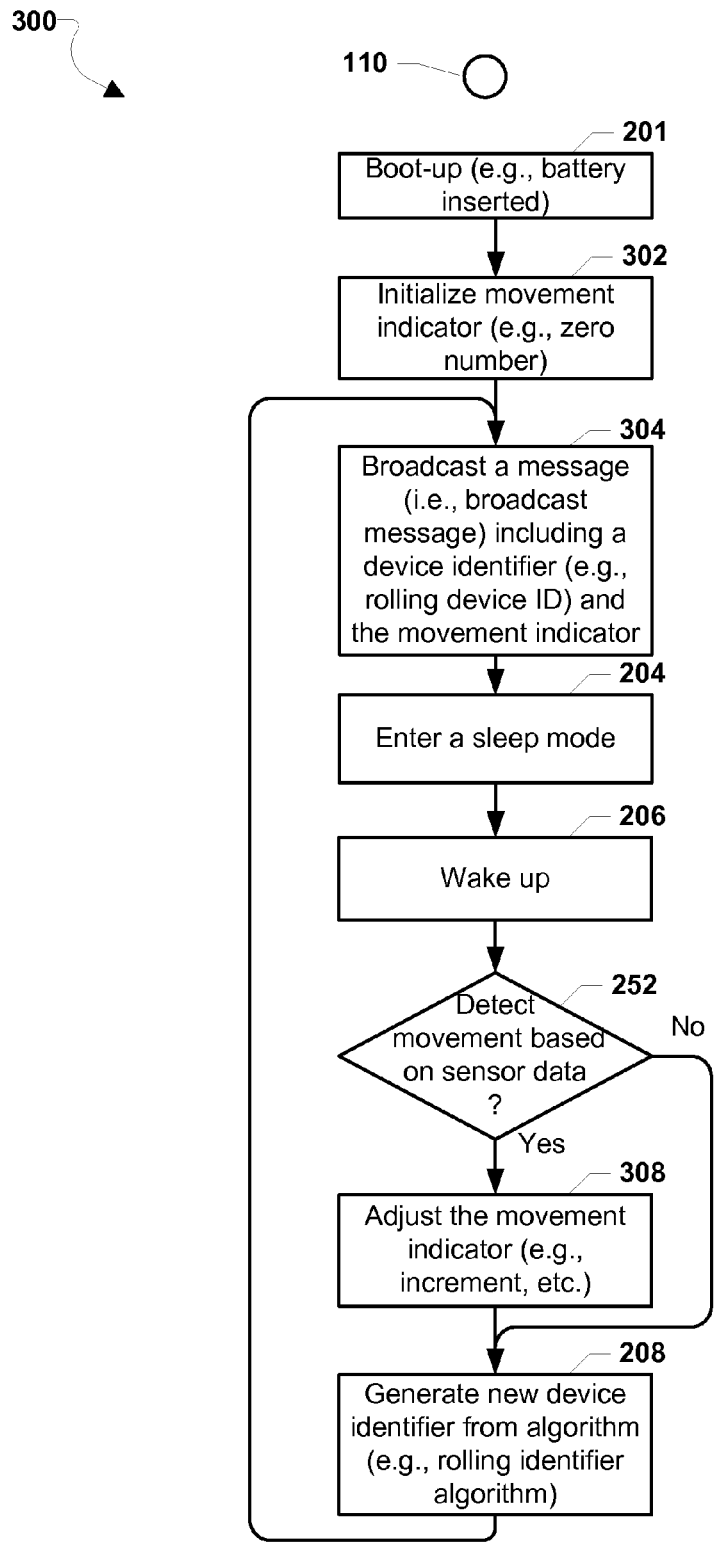
FIG. 3 is a process flow diagram illustrating another embodiment method for broadcasting an identifier from a wireless identity transmitter.

FIG. 3 illustrates another embodiment method 300 for a wireless identity transmitter 110 to broadcast information that may be received by proximity broadcast receivers, such as a smartphone proximity broadcast receiver. The method 300 is similar to the method 200 described above, except that the method 300 may include operations for the wireless identity transmitter 110 to transmit additional movement indicators within broadcast messages. By broadcasting both a device identifier and a movement indicator, the wireless identity transmitter 110 may enable other devices to authenticate the wireless identity transmitter 110 identity based on processing the device identifier (i.e., determine whether broadcasts from the wireless identity transmitter 110 are trustworthy) and also enable the same or other devices to validate whether the wireless identity transmitter 110 has been moved based on the movement indicator.

As described above, in block 201, the wireless identity transmitter 110 may boot-up. In block 302, the wireless identity transmitter 110 may initialize a movement indicator, such as a data that indicates whether the wireless identity transmitter 110 has been moved. The wireless identity transmitter 110 may initialize a register, variable, number, representation, or other data to a default or beginning value. For example, the wireless identity transmitter 110 may set a floating point number to an initial value (e.g., zero). The initial value of the movement indicator may be predetermined by a manufacturer, a central server, or a user. For example, during a registration process as described below, a central server may provide the wireless identity transmitter 110 with an initial movement indicator value. In an embodiment, the initial movement indicator may be a random number. In an embodiment, the initial movement indicator may be reported to and stored within a central server and/or various user devices (e.g., mobile devices configured to operate as proximity broadcast receivers, etc.) during an initial configuration or registration process when the wireless identity transmitter 110 is first activated. For example, a central server may store the initial movement indicator in a data structure in association with the identity of the wireless identity transmitter 110.

The movement indicator may data that is capable of representing a large number of unique values. In particular, the movement indicator may be represented by a 64-bit or similarly large register or data structure stored within the memory of the wireless identity transmitter 110. In this way, the wireless identity transmitter 110 may be capable of adjusting the movement indicator as described below a large number of times without ever duplicating a value. For example, with a 64-bit representation of the movement indicator, the wireless identity transmitter 110 may be capable of changing the movement indicator value once per second for an indefinite amount of time without the movement indicator every being set to the same value more than once.

In block 304, the wireless identity transmitter 110 may broadcast a message (i.e., a broadcast message) that includes a device identifier, such as a rolling unique device identifier as described above, and the movement indicator. For example the wireless identity transmitter 110 may broadcast a Bluetooth packet that includes in a payload both an encrypted device identifier as well as the movement indicator. In various embodiments, the broadcast message may be completely or partially encrypted, encoded, or otherwise obscured. For example, the broadcast message may include an encrypted payload that includes the device identifier and the movement indicator. As another example, the broadcast message may include an encrypted device identifier but unencrypted or otherwise "in the clear" data representing the movement indicator. Based on the structure and formatting of the broadcast message, a device (e.g., a proximity broadcast receiver, a central server, etc.) configured to access the information of the message, such as by applying a decryption algorithm with a secret key, may be capable of identifying the device identifier and the movement indicator independently or alternatively may be required to process the broadcast message to identify either identifier. For example, a proximity broadcast receiver may be configured to recognize an "in the clear" movement indicator, but may be required to relay other data from the broadcast message to a central server for further processing (e.g., decoding, etc.) to authenticate an obfuscated device identifier.

In block 204, the wireless identity transmitter 110 may enter a sleep mode and in block 206 may wake up from the sleep mode, such as after the predetermined duration expires. In determination block 252, the wireless identity transmitter 110 may determine whether movement is detected based on sensor data. If it is determined that movement was detected at the wireless identity transmitter 110 (i.e., determination block 252="Yes"), in block 308, the wireless identity transmitter 110 may adjust the movement indicator, such as by incrementing/decrementing a value. The wireless identity transmitter 110 may utilize various schemes, calculations, equations, seeds, and/or other predefined techniques for adjusting the movement indicator. For example, the wireless identity transmitter 110 may use a particular random number generating algorithm with a seed value that is known by a central server. As another example, the wireless identity transmitter 110 may simply add a value (e.g., '1') to the current movement indicator (e.g., the initial movement indicator).

If it is determined that movement was not detected at the wireless identity transmitter 110 (i.e., determination block 252="No") or if the movement indicator has been adjusted with the operations in block 308, the wireless identity transmitter 110 may generate a new device identifier from an algorithm in block 208, such as a rolling identifier algorithm. The wireless identity transmitter 110 may then return to block 304 to broadcast again, such as by broadcasting a message including the newly generated identifier and a movement indicator that may or may not be adjusted since the last broadcast message was transmitted based on the operations in determination block 252.

In an embodiment, the wireless identity transmitter 110 may continue generating and broadcasting adjusted movement indicators in response to a single detected movement (e.g., a one-time move of the wireless identity transmitter 110 from office to office, etc.). In other words, once a movement is detected, the wireless identity transmitter 110 may always adjust the movement indicator on a periodic basis, such as once every second for an indefinite period. In another embodiment, the wireless identity transmitter 110 may be configured to discontinue adjusting the movement indicator in response to receiving user inputs, such as a user pressing a halt button on the wireless identity transmitter 110.

As an illustration: in response to a user (e.g., the owner) purposefully moving the wireless identity transmitter 110 from a first office to a second office, the wireless identity transmitter 110 may begin adjusting the movement indicator to be different for each subsequent broadcast message that includes a periodically rolling device identifier. However, when the user presses a 'halt' button on the wireless identity transmitter 110, the wireless identity transmitter 110 may include the last adjusted movement indicator value in subsequent broadcast messages with the periodically rolling device identifier until the next time the wireless identity transmitter 110 is moved.

Figure 4:
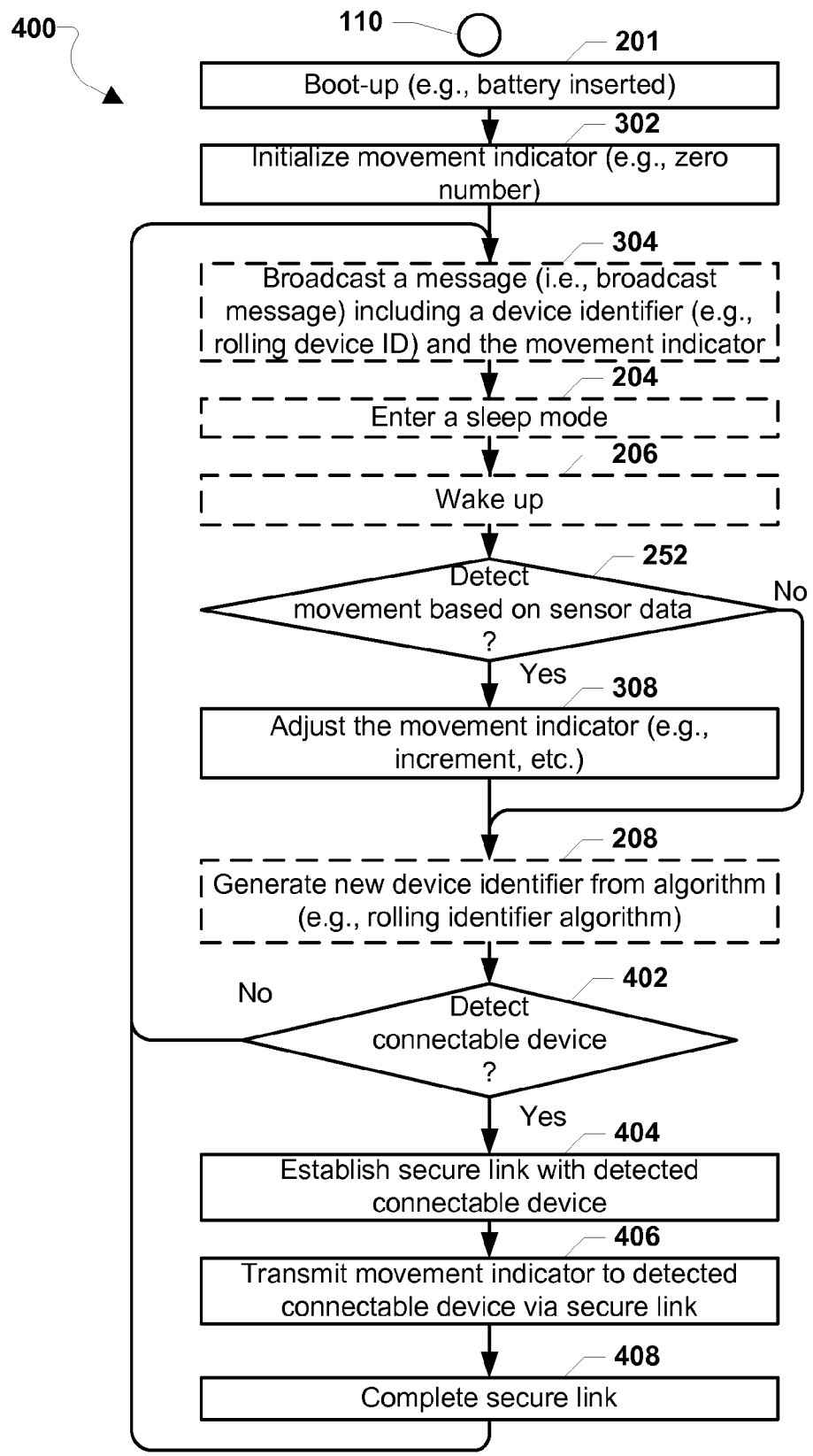
FIG. 4 is a process flow diagram illustrating an embodiment method for transmitting an identifier from a wireless identity transmitter.

FIG. 4 illustrates another embodiment method 400 for a wireless identity transmitter 110 (referred to as "WIT" in FIG. 4) to broadcast information that may be received by proximity broadcast receivers, such as a smartphone mobile device proximity broadcast receiver. The method 400 is similar to the methods 200, 300 described above, except that the method 400 may include operations for the wireless identity transmitter 110 to connect to another device via a secure link. For example, the wireless identity transmitter 110 may connect with a nearby smartphone via a secure Bluetooth link (i.e., a link between two paired devices). For the following description of the method 400, the operations related to broadcasting messages that include rolling device identifiers (i.e., blocks 304, 204, 206, 208) are described as optional, as the wireless identity transmitter 110 may or may not be required to periodically transmit its identity when configured to establish two-way communications with known devices within proximity.

As described above, in block 201, the wireless identity transmitter 110 may boot-up. In block 302, the wireless identity transmitter 110 may initialize a movement indicator. In optional block 304, the wireless identity transmitter 110 may broadcast a message (i.e., a broadcast message) that includes a device identifier, such as a rolling unique identifier as described above, and the movement indicator. In optional block 204, the wireless identity transmitter 110 may enter a sleep mode and in optional block 206 may wake up from the sleep mode, such as after the predetermined duration expires. In determination block 252, the wireless identity transmitter 110 may determine whether a movement is detected based on sensor data. If it is determined that movement was detected at the wireless identity transmitter 110 (i.e., determination block 252="Yes"), in block 308, the wireless identity transmitter 110 may adjust the movement indicator, such as by incrementing/decrementing a register value. If it is determined that movement was not detected at the wireless identity transmitter 110 (i.e., determination block 252="No") or if the movement indicator has been adjusted with the operations in block 308, the wireless identity transmitter 110 may generate a new device identifier from an algorithm in optional block 208, such as an algorithm for generating an obfuscated or otherwise rolling device identifier.

In determination block 402, the wireless identity transmitter 110 may determine whether a connectable device is detected, such as a Bluetooth paired or bonded smartphone, laptop, or other user device. The wireless identity transmitter 110 may detect such a connectable device by performing periodic scanning operations for nearby devices having compatible functionalities and pre-authenticated identities, such as Bluetooth radios configured to engage in paired or otherwise secure communication links. For example, the wireless identity transmitter 110 may perform operations for scanning for Bluetooth-capable devices that are bonded or otherwise known to the wireless identity transmitter 110 based on previously communications or user-supplied data (e.g., an address book, etc.). In an embodiment, connectable devices may be those nearby devices that are configured to be discoverable by nearby devices such as the wireless identity transmitter 110 and already known (e.g., paired) to the wireless identity transmitter 110.

If it is determined that no connectable device is detected within proximity of the wireless identity transmitter 110 (i.e., determination block 402="No"), the wireless identity transmitter 110 may then return to perform the operations in optional block 304 to broadcast again, such as by broadcasting a message including the newly generated device identifier (e.g., rolling identifier) and a movement indicator that may or may not be adjusted since the last broadcast message was transmitted based on the operations in determination block 252.

However, if it is determined that at least one connectable device is detected within proximity of the wireless identity transmitter 110 (i.e., determination block 402="Yes"), in block 404, the wireless identity transmitter 110 may establish a secure link with the detected connectable device. Such a link may enable two-way communications between the wireless identity transmitter 110 and the detected connectable device, such as a secure Bluetooth link between paired devices. In block 406, the wireless identity transmitter 110 may transmit the movement indicator to the detected connectable device via the secure link, and may complete the secure link in block 408. The wireless identity transmitter 110 may then continue with the operations in optional block 304 to broadcast another broadcast message.

Figure 5:
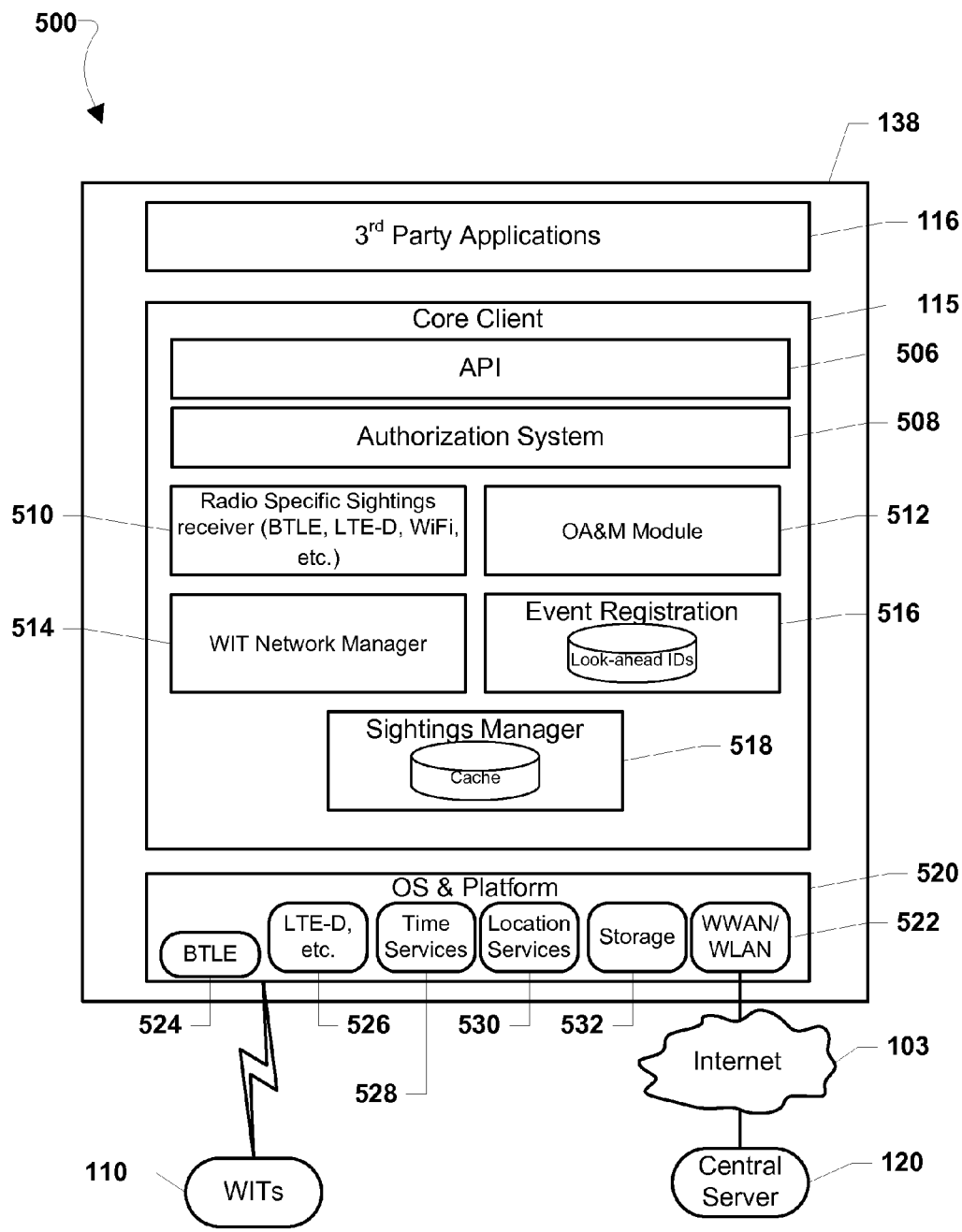
FIG. 5 is a component diagram illustrating various modules within a proximity broadcast receiver suitable for use in various embodiments.

FIG. 5 illustrates a diagram 500 of various modules within a proximity broadcast receiver 138. As described above, proximity broadcast receivers may include stationary proximity broadcast receivers, such as dedicated devices placed around a building, and mobile proximity broadcast receivers, such as mobile devices that are configured to perform operations to receive broadcast messages from wireless identity transmitters 110 and transmit sighting messages over the Internet 103 to a central server 120 via long-range communications (e.g., via WiFi or a cellular network). The various modules and components are described below in the context of elements within a mobile device proximity broadcast receiver, however in various embodiments, any proximity broadcast receiver, such as a stationary proximity broadcast receiver, may include similar modules and/or components.

The proximity broadcast receiver 138 may include a core client module 115 that may be software, instructions, routines, applications, operations, or other circuitry utilized to process received broadcast messages from proximate wireless identity transmitters 110. The core client module 115 may also handle communications between the proximity broadcast receiver 138 and the central server 120, such as transmitting sighting messages and receiving return messages from the central server 120. For example, the core client module 115 may operate as a background service that performs operations, such as uploading or transmitting sighting messages, without interaction from a user.

The core client module 115 may include an API component 506 that corresponds to application programming interface data, code, or other commands related to broadcast messages and/or sighting messages. For example, the API component 506 may be utilized by a proximity broadcast receiver when listening for Bluetooth LE advertising packets received from the wireless identity transmitter 110. As another example, the API component 506 may be utilized to register the proximity broadcast receiver 138 to receive notifications, alerts, or other communications corresponding to wireless identity transmitters 110.

The core client module 115 may also include an authorization system component 508 for processing received broadcast messages. For example, the proximity broadcast receiver 138 may support oAuth for authorization requests and xAuth for approved communication partners.

The core client module 115 may also include a radio specific sightings receiver component 510 (e.g., a component for handling Bluetooth LE, LTE-D, WiFi, and other communications), an operations, administration, and management (or OA&M) module 512, a wireless identity transmitter network manager component 514, an event registration component 516 that relates to stored look-ahead identifiers, and a sightings manager component 518. In an embodiment, the event registration component 516 may store numerous rolling identifiers downloaded from the central server 120 and corresponding to a particular wireless identity transmitter 110, such as a set of rolling device identifiers that may match possible rolling identifiers broadcast by the wireless identity transmitter 110 during a certain time window.

Like many modern mobile devices, the proximity broadcast receiver 138 may be configured to execute third-party applications (or "apps"), and thus may include a third-party applications module 116 that may execute, manage, and otherwise perform software instructions and routines related to applications provided by various third-parties (e.g., merchants). For example, the third-party applications module 116 may receive various data from the core client module 115 to be used by various third-party applications. For illustration purposes, a third-party application related to a department store that is registered with the central server 120 may be configured to receive notifications from the core client module 115 when the user of the proximity broadcast receiver 138 enters, remains, and/or leaves the department store (e.g., a geofence of the store). In an embodiment, for optimization purposes, applications or apps executing via the third-party applications module 116 may register or otherwise be configured to received notifications from the core client module 115 when particular wireless identity transmitters are within proximity, or alternatively, leave proximity. For example, applications may register in advance with the core client module 115 to receive event notifications that indicate whether a particular wireless identity transmitter enters proximity, stays within proximity (e.g., standing nearby and not moving), or leaves proximity.

The proximity broadcast receiver 138 may also include an operating system and platform module 520 for performing various operations and managing circuitry, such as short-range signal receiver circuitry. In particular, the operating system and platform module 520 may include a Bluetooth Low Energy module 524 for processing communications utilizing Bluetooth LE protocols, a cellular network module 526 for processing communications corresponding to various cellular and similar long-range wireless networks (e.g., LTE-D, etc.).

The operating system and platform module 520 may also include a time services component 528 that may track time and generate timestamp data, a location services component 530 that may maintain low-precision location data or alternatively more precise GPS (or A-GPS) location data, a storage component 532, and a wireless wide area network/wireless local area network component 522 for enabling communications via WiFi or other wireless networks.

In an embodiment, the core client module 115 may request from the central server sets of wireless identity transmitter identifiers (e.g., rolling identifiers of all transmitters on an interested list, identifiers for all transmitters owned by a user, etc.). Such sets may correspond to wireless identity transmitters that are currently in use and are expected to be in use for some period of time.

Figure 6A:
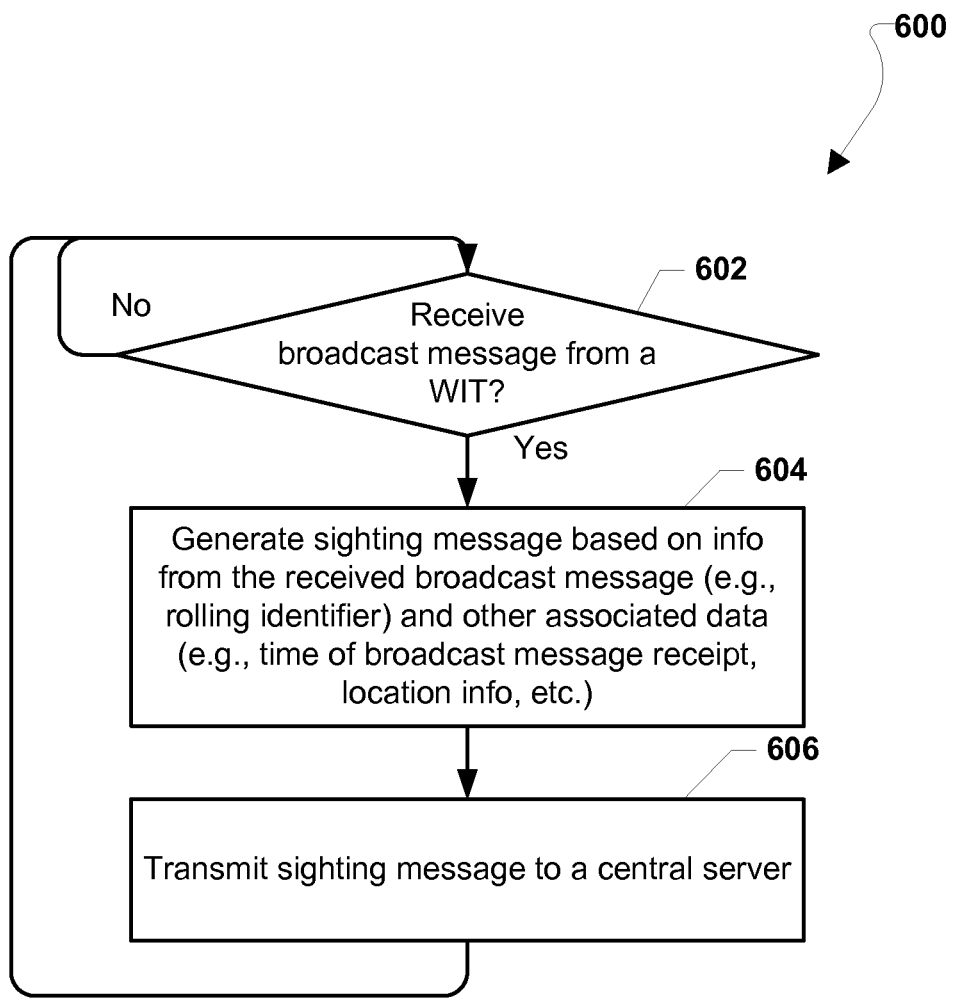
FIG. 6A-B are process flow diagrams illustrating embodiment methods of a proximity broadcast receiver relaying a wireless identity transmitter's identifier along with other data such as a time or location.

FIG. 6A illustrates an embodiment method 600 that may be implemented on a proximity broadcast receiver, such as a stationary proximity broadcast receiver or a mobile proximity broadcast receiver. In determination block 602, the proximity broadcast receiver may determine whether a broadcast message is received. For example, the proximity broadcast receiver may begin listening for broadcast advertisement packets or pairing attempts by wireless identity transmitters. The proximity broadcast receiver may continuously be in a monitoring mode, or begin listening for particular identifiers in response to an alert (or search activation message) received from a central server. If the proximity broadcast receiver does not receive a broadcast message (i.e., determination block 602="No"), the proximity broadcast receiver may continue with the operations in determination block 602.

If the proximity broadcast receiver receives a broadcast message (i.e., determination block 602="Yes"), in block 604 the proximity broadcast receiver may generate a sighting message based on information from the received broadcast message and other associated data. In particular, the sighting message may include an identifier specific to the wireless identity transmitter that transmitted the received broadcast message, such as a rolling identifier (i.e., an encoded device identifier), MAC address, or other unique code that may be used to identify the particular wireless identity transmitter.

Other associated data that may be included in a sighting message may include various information related to the receipt of the broadcast message, such as the time the proximity broadcast receiver received the broadcast message, location information, the proximity broadcast receiver's identification information, related services (e.g., associated software or third-parties), and signal strength information. In other words, the proximity broadcast receiver may associate data about present conditions (e.g., a timestamp, GPS coordinates, Cell ID of the closest base station, etc.) with the broadcast message and/or the wireless identity transmitter's identifier. This data may be stored in any of various types of data structures, such as an array with one or more identifiers associated with timestamps and GPS coordinates from when the sighting corresponding to each identifier occurred. In an embodiment, the sighting message may include authentication data, such as a digital certificate or code, that may be used by a central server to confirm the identity of the proximity broadcast receiver. For example, within the metadata of the sighting message, the proximity broadcast receiver may include a special hash code known only to the proximity broadcast receiver and the central server.

In block 606, the proximity broadcast receiver may transmit the sighting message to a central server, such as via a cellular (e.g., an LTE, 3G, or 4G network) or other network and the Internet as discussed above with reference to FIG. 1. Upon reporting a contact event by transmitting the sighting message, the proximity broadcast receiver may promptly return to perform the operations in determination block 602 and await further broadcasts from wireless identity transmitters. This enables the proximity broadcast receiver to continuously report contact events to the central server.

Figure 6B:
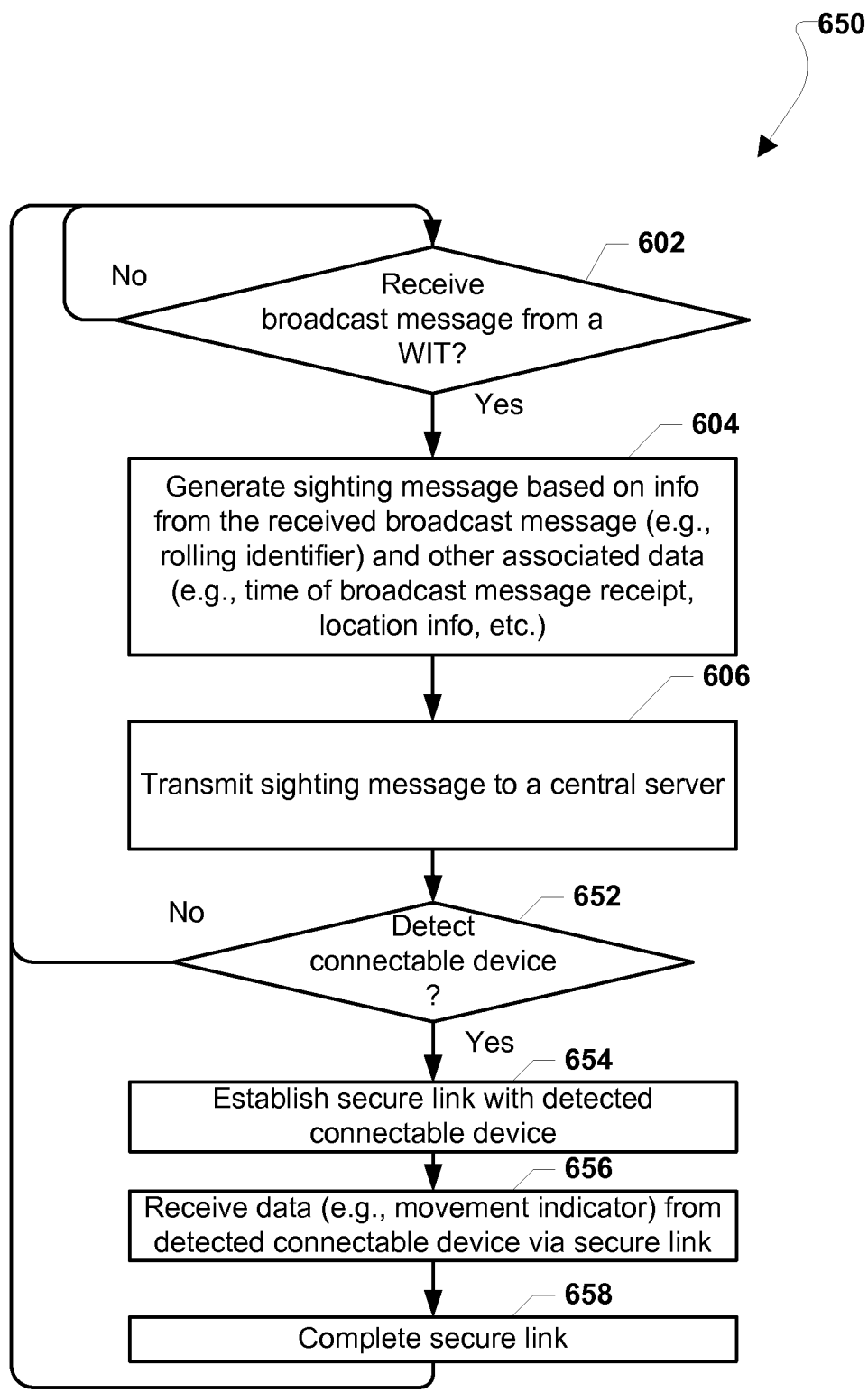

FIG. 6B illustrates an embodiment method 650 that may be implemented on a proximity broadcast receiver, such as a smartphone proximity broadcast receiver. The method 650 is similar to the method 600 described above, expect the method 650 may include operations for the proximity broadcast receiver to perform to exchange data with another device via a secure link, such as a secure Bluetooth connection with a paired device. The operations in blocks 652-658 may also be similar to the operations in blocks 402-408 as described above with reference to FIG. 4.

In determination block 602, the proximity broadcast receiver may determine whether a broadcast message is received. If the proximity broadcast receiver does not receive a broadcast message (i.e., determination block 602="No"), the proximity broadcast receiver may continue with the operations in determination block 602. If the proximity broadcast receiver receives a broadcast message (i.e., determination block 602="Yes"), in block 604 the proximity broadcast receiver may generate a sighting message based on information from the received broadcast message and other associated data. In block 606, the proximity broadcast receiver may transmit the sighting message to a central server, such as via a cellular (e.g., an LTE, 3G, or 4G network) or other network and the Internet as discussed above with reference to FIG. 1.

In determination block 652, the proximity broadcast receiver may detect a connectable device, such as Bluetooth paired or bonded wireless identity transmitters. The proximity broadcast receiver may detect such a connectable device by performing periodic scanning operations for nearby devices having compatible functionalities, such as Bluetooth radios configured to engage in paired or otherwise secure communication links. For example, the proximity broadcast receiver may perform operations for scanning for Bluetooth-capable wireless identity transmitters that are pre-authenticated, bonded, or otherwise known to the proximity broadcast receiver based on previously communications or user-supplied data (e.g., an address book, etc.). In an embodiment, connectable devices may be those nearby devices that are configured to be discoverable by nearby devices such as the proximity broadcast receiver and already known (e.g., paired) to the proximity broadcast receiver.

If it is determined that no connectable device is detected within proximity of the proximity broadcast receiver (i.e., determination block 652="No"), the proximity broadcast receiver may then return to perform the operations in determination block 602 to determine whether broadcast messages are received. However, if it is determined that at least one connectable device is detected within proximity of the proximity broadcast receiver (i.e., determination block 652="Yes"), in block 654, the proximity broadcast receiver may establish a secure link with the detected connectable device. Such a link may enable two-way communications between the proximity broadcast receiver and the detected connectable device, such as a secure Bluetooth link between paired devices. In embodiments in which pairing takes place, the pairing may be established automatically if the proximity broadcast receiver is set to pair with any wireless identity transmitter without using a key, by using a key saved from a previous pairing with the wireless identity transmitter, or by using a key received from a central server.

In block 656, the proximity broadcast receiver may receive data, such as a movement indicator from a wireless identity transmitter, via the secure link, and may complete the secure link in block 658. In alternate embodiments, the wireless identity transmitter's rolling identifier may be received via the secure link. The proximity broadcast receiver may then continue with the operations in determination block 602 to receive broadcast messages.

Figure 7:
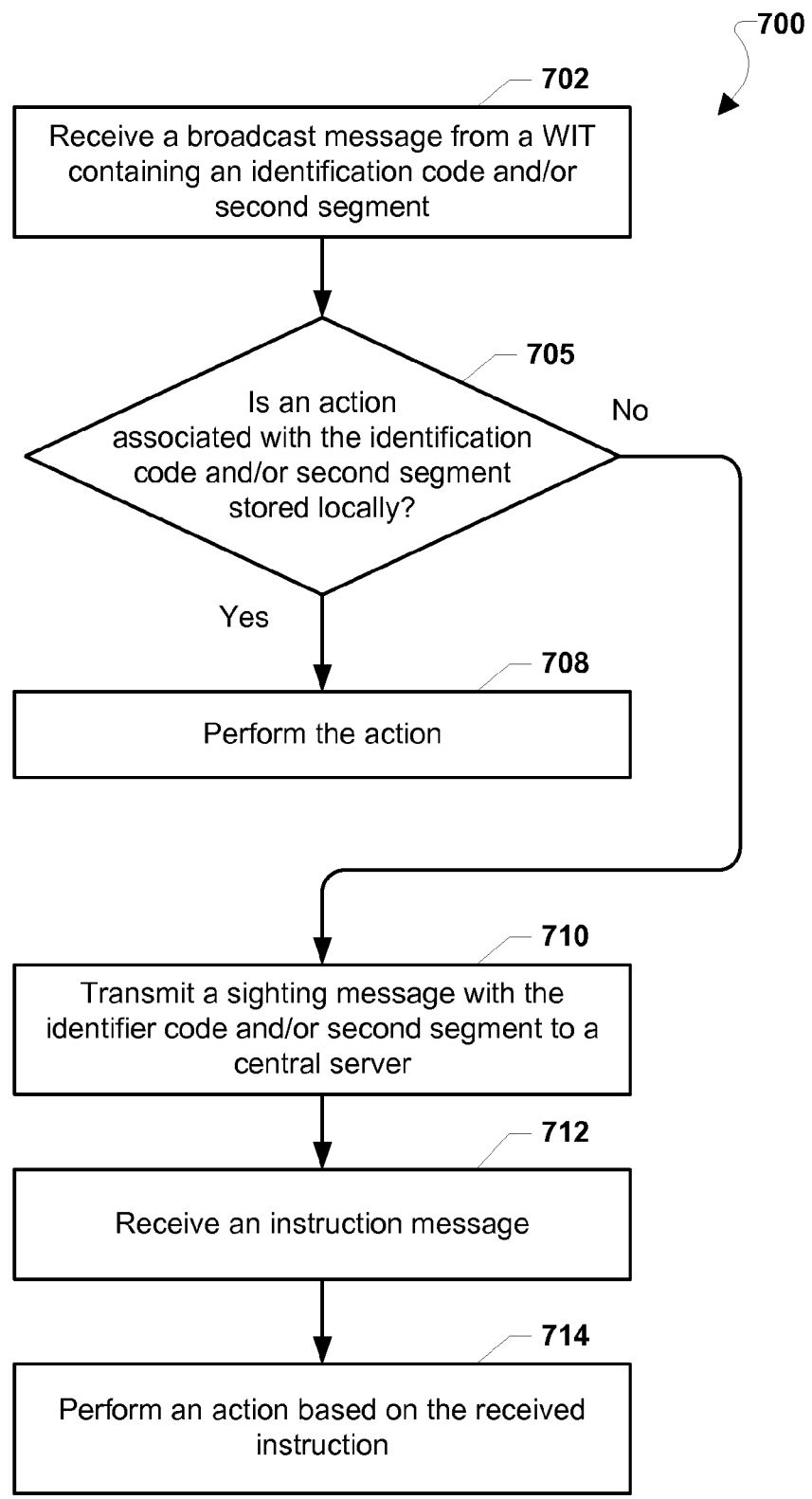
FIG. 7 is a process flow diagram illustrating an embodiment method of receiving an instruction from a central server in response to transmitting a sighting message based on proximity to a wireless identity transmitter.

FIG. 7 illustrates an embodiment method 700 for providing content based on proximity to a wireless identity transmitter. A proximity broadcast receiver may receive a broadcast message from a wireless identity transmitter (referred to as "WIT" in FIG. 7) containing an identification code and/or second segment in block 702. The proximity broadcast receiver may determine whether an action associated with the identification code and/or second segment is stored locally (e.g., in the proximity broadcast receiver's memory) in determination block 705. If an associated action is found locally (i.e., determination block 705=Yes), the action may be performed by the proximity broadcast receiver in block 708.

If an associated action is not found locally (i.e., determination block 705=No), the proximity broadcast receiver may transmit a sighting message with the identifier and/or second segment to a central server in block 710. In an embodiment, the proximity broadcast receiver may transmit a message to another device, such as a user device. The proximity broadcast receiver may receive an instruction message in block 712. This instruction may be sent by the central server or other device in response to the sighting message with the identifier and/or second segment. In block 714, the proximity broadcast receiver may perform an action based on the received instruction message, such as access content by going to a web page or other online resource. In alternate embodiments, the proximity broadcast receiver may skip the determination block 705 and automatically proceed to either transmit a sighting message in block 710 or attempt to perform an action stored locally.

Figure 8:
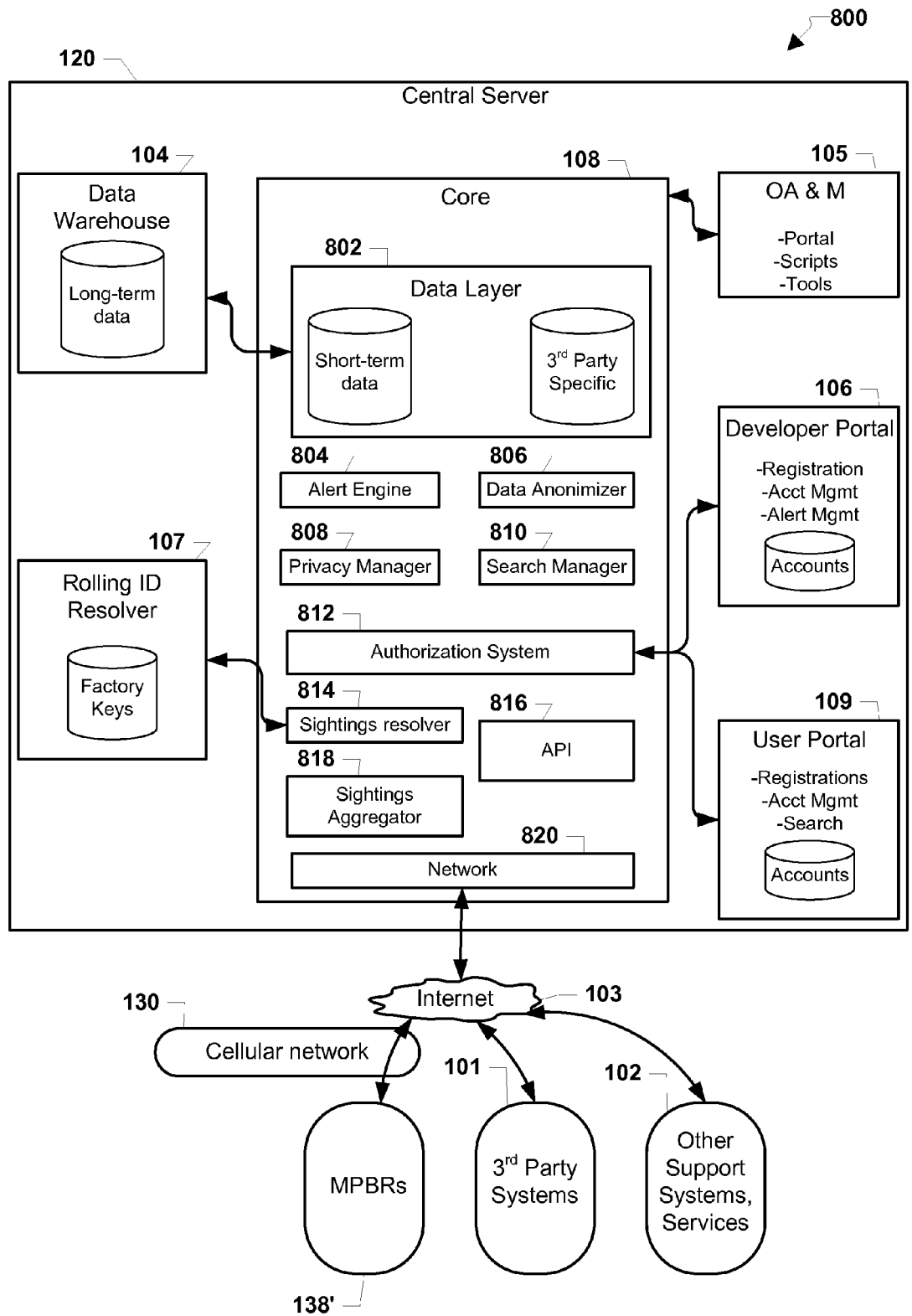
FIG. 8 is a component diagram illustrating various modules within a central server suitable for use in various embodiments.

FIG. 8 illustrates a diagram 800 of various modules within a central server 120. The various modules and components are described below in the context of modules, components, and/or elements within a central server 120. However, in various embodiments, the central server 120 may include or be connected to individual computing devices, server blades, or other units that may perform the operations associated with the various modules and/or components described below.

As described above, the central server 120 may be configured to receive, store, and otherwise process data corresponding to wireless identity transmitters. For example, the central server 120 may be configured to exchange communications with various devices via the Internet 103, such as proximity broadcast receivers 138' (e.g., mobile or stationary proximity broadcast receivers, etc.), third-party systems 101, and other support systems and/or services 102.

The central server 120 may include several components 104-109 to perform various operations to process data, such as received from proximity broadcast receivers 138, third-party systems 101, or other support systems and/or services 102. In particular, the central server 120 may include a core component 108 that may process sighting messages, execute an alert or notice engine module, handle application programming interface (API) commands, and exchange data with other components within the central server 120. The core component 108 may include a data layer module 802 that may include units for storing short-term data and third-party specific data. The core component 108 may also include an alert engine module 804 for generating alert messages for transmissions to proximity broadcast receivers and initiating searches of various wireless identity transmitters. The core component 108 may further include a data anonimizer module 806 that may generate generic, anonymous, or otherwise processed data based on privacy policies or profile preferences of users. For example, the data anonimizer module 806 may strip personal information from return messages transmitted to a proximity broadcast receiver associated with a store so that a consumer user of a wireless identity transmitter is not identified to the store, but the fact that the user is within the store is still reported to the store. The core component 108 may also include a privacy manager module 808 that may maintain privacy permission information for various users. For example, the privacy manager module 808 may include a database of privacy parameters provided by users at registration.

The core component 108 may also include a search manager module 810 for assisting in organizing and administering searches and an authorization system module 812. The core component 108 may further include a sightings resolver module 814 that may be utilized by the central server 120 for identifying wireless identity transmitters associated with broadcast messages reported within received sighting messages from proximity broadcast receivers 138. The core component 108 may include an API module 816 that may include functions and interfaces for initiating operations, a sightings aggregator module 818 for compounding various sighting messages over a period for transmissions in consolidated form to merchants, third-parties, and other services. The core component 108 may also include a network module 820 for transmitting and receiving various communications with devices, such as proximity broadcast receivers 138 and third-party systems 101 via the Internet.

The central server 120 may also include a data warehouse component 104 that may store long-term data (e.g., archived user data, past location information, etc.). The data warehouse component 104 may include various databases for storing information pertinent to users of wireless identity transmitters, such as profile information provided by users via registration websites. The data warehouse component 104 may be configured to exchange data with the data layer module 802 of the core component 108. The central server 120 may also include an operations, administration, and management (or OA & M) component 105 that may process and/or store software associated with user portal accesses, scripts, and tools (e.g., software utilities, routines, etc.). The OA & M component 105 may be configured to exchange data with the core component 108.

The central server 120 may also include a developer portal component 106 that may store developer account data and perform registration, account management, and alert (or notice) management routines associated with developers, such as vendors or merchants that register to interact with users of wireless identity transmitters 110. The central server 120 may also include a user portal component 109 that may store user account data and perform registration, account management, and search routines associated with users, such as persons associated with wireless identity transmitters. The user portal component 109 and developer portal component 106 may be configured to exchange data with the authorization system module 812 of the core component 108. The central server 120 may also include a rolling identifier (or ID) resolver component 107 that may store factory keys associated with wireless identity transmitters 110 as well as perform operations, software, or routines to match encrypted, encoded, rolling, or otherwise obfuscated identification information within received sighting messages with affiliated user data. The rolling identifier (or ID) resolver component 107 may be configured to exchange data with the sightings resolver module 814 of the core component 108.

In various embodiments, the modules and components described with reference to FIG. 8, such as the rolling ID resolver component 107, may be performed or otherwise enabled by software instructions, applications, routines, threads, circuitry, or hardware units.

Figure 9:
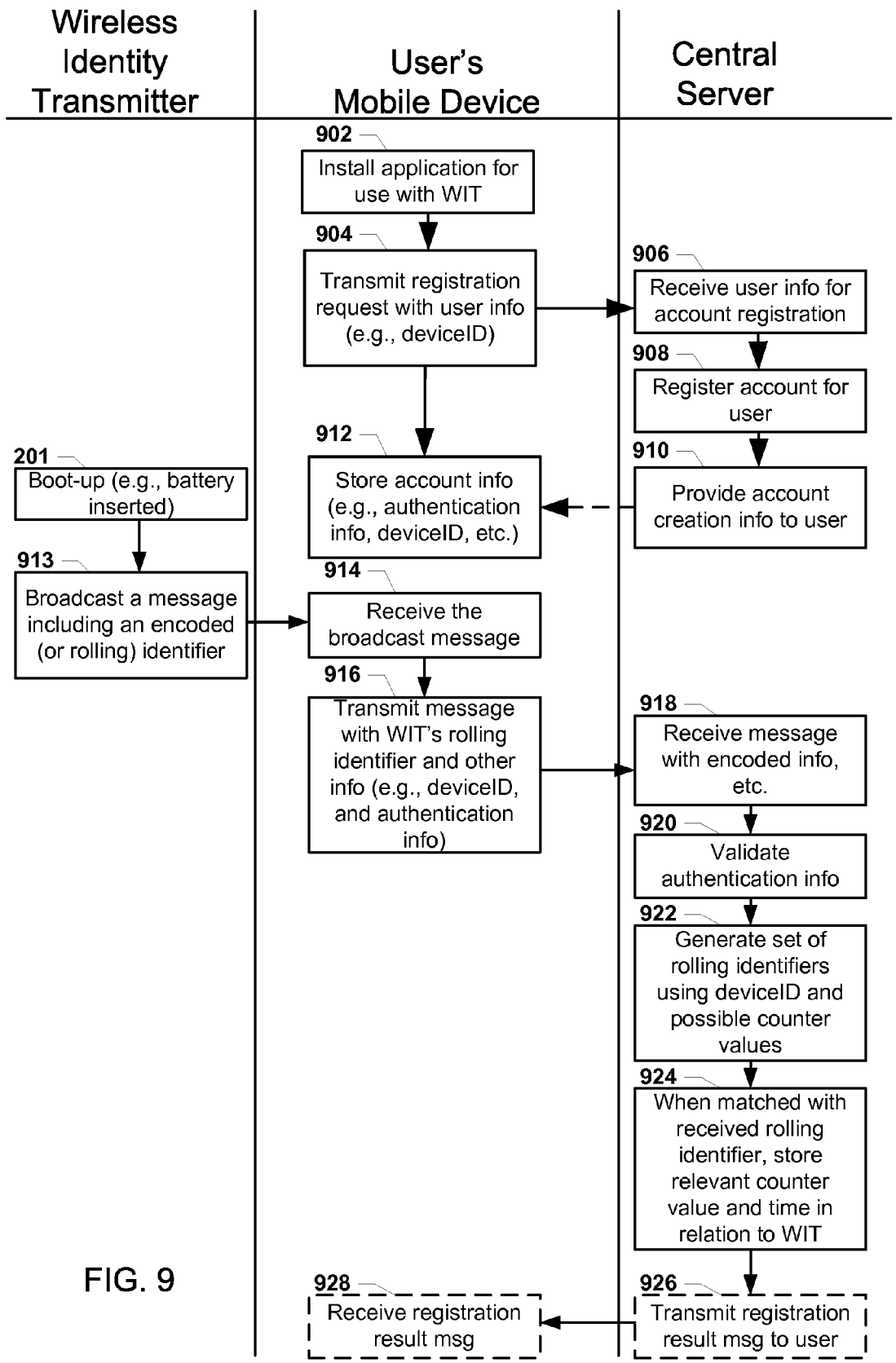
FIG. 9 is a diagram illustrating a wireless identity transmitter registration process for use in various embodiments.

FIG. 9 illustrates a wireless identity transmitter registration process for use in various embodiments. In general, before broadcast messages may be processed by a central server, the central server may require that wireless identity transmitters and their users be registered with the central server. For example, before any tracking, searching, or other services related to a wireless identity transmitter can be initiated, the central server must be able to determine the users associated with the various wireless identity transmitters circulating in the world. Registration may create links between identifiers transmitted by wireless identity transmitters in broadcast messages, the wireless identity transmitters, and their users. For example, in order to transmit a notification to a user that a wireless identity transmitter is nearby, relayed obfuscated (or encoded) identifiers must be matched to account information that indicates the user's mobile device contact information (e.g., cell phone number) as stored in relation to a registered user account.

In particular, through registration, a timing mechanism may be synchronized between each wireless identity transmitter and the central server (i.e., a counter). With such a counter, a wireless identity transmitter and the central server may encode (or roll) and decode identifiers respectively, keeping the identity associated with the wireless identity transmitter (and its users) concealed and private. The most appropriate time to synchronize such a timing mechanism or counter may be during a device registration and/or account creation process as described below. For the purpose of FIG. 9, a mobile device, such as a smartphone, is described as being used by a user to perform account creation and registration operations (e.g., the mobile device accesses a web portal to register with the central server, etc.). However, any computing device connected to the Internet and capable of exchanging communications with the central server via a registration web portal or website may be relevant.

In block 902, a user's mobile device (e.g., an iPhone, Android, tablet device, etc.) may install an application for use with wireless identity transmitters. Such an application (or "app") may execute on the mobile device's processor as a background service or alternatively may be activated for selective use by the user. As described throughout this disclosure, such an application may enable the mobile device to process short-range broadcast messages from nearby wireless identity transmitters, such as by identifying received signals as broadcast messages and relaying sighting messages having location information to the central server in response.

In block 904, the mobile device may transmit a registration request with user information (e.g., a device identity or "deviceID"). The registration request may be sent to the central server via Internet communications with a web portal, web site, or web server controlled or otherwise accessible by the central server. In other words, the mobile device may invoke the registration process or by providing user information (e.g., device ID) through the installed app by providing the device ID (deviceID) and other information the central server may utilize to bind the registration request to an account. For example, the user's mobile device may access a registration website, receive inputs from the user, and transmit the user input as data to the registration website for use by the central server as described above with reference to FIG. 9.

In an embodiment, the user information may include personal information about the user, such as name, address, contact information (e.g., social network sites, cell phone number, email address, telephone number, etc.) age, and other demographic information, as well as identifying information about wireless identity transmitters and/or proximity broadcast receivers that may be associated with the user's account. For example, the user information transmitted to the central server may include the serial number on a wireless identity transmitter and/or a confirmation code produced by the mobile device in response to installing the application with the operations in block 902. The user information may also include preference information, such as the user's preferred retails stores, product lines, and areas to eat or shop or work.

The user information may further include privacy permissions that indicate how personal information may be distributed or used by the central server. In an embodiment, users may register as anonymous users, such that the central server does not store any identifying information about the users. For example, an account may be registered that is linked to a non-descript post office box, a disposable cellular telephone number, or other contact information that does not directly identify the user or the holder of the account. This may be important for those who may choose to utilize services provided by the central server, but who are concerned about leaked private or identifying information.

In block 912, the user's mobile device may store account information, such as authentication information (e.g., codes, messages) from the central server or device ID associated with an owned wireless identity transmitter.

In block 906, the central server may receive the user information for account registration. In block 908, the central server may register an account for the user. For example, the central server may store the user's information, including provided device identifications, in a database of all registered users. In block 910 the central server may provide account creation information to the user. The account creation information may include an authentication code or other information the user's mobile device may store for future use. For example, the central server may display confirmation of account creation on a website accessible by the user's mobile device or alternatively may transmit a confirmation signal, text message, email, or other communication to the user's mobile device.

In block 201, the wireless identity transmitter may boot-up, such as in response to the user inserting a battery. When the wireless identity transmitter boots, a nonce or counter value may be initialized. For example, the wireless identity transmitter may begin to increment a value that represents the passage of time, starting from a zero value.

In block 913, the wireless identity transmitter may broadcast a message (i.e., a broadcast message) that includes an encoded (or rolling) identifier. For example, the wireless identity transmitter may begin transmitting broadcast messages every few seconds. The wireless identity transmitter may generate rolling identifiers with the embodiment methods described in the related applications incorporated herein. In an embodiment, the broadcast message may include an initial or default movement indicator value. The broadcast message may include a payload that includes data generated by performing a pseudo-random function. For example, the wireless identity transmitter may perform a pseudo-random function to generate encoded data based on input values of the wireless identity transmitter's device ID, a nonce or counter value, and a secret key, seed, or other value known only to the wireless identity transmitter and the central server. In an embodiment, the pseudo-random function may be a polynomial time computable function that may utilize a randomly selected seed value only known to the wireless identity transmitter and the central server, such that the pseudo-random function may be computationally indistinguishable from a random function defined on the same domain with output to the same range as the pseudo-random function. In an embodiment, the keyed-hash Message Authentication Code (HMAC) or the cipher-based Message authentication Code (CMAC) may be used as the pseudo-random function.

In an embodiment, the wireless identity transmitter may be required to be activated within a predefined number of seconds within the time the mobile device begins the registration process with the operations in block 904. In other words, once the wireless identity transmitter begins incrementing its nonce or counter value, the user must register with the central server within a certain period. This enables the central server to try at only a certain number of values when trying to determine the nonce or counter value at the wireless identity transmitter during registration.

In an embodiment, the wireless identity transmitter may indicate an initial broadcast by adjusting data within a broadcast message's payload. For example, the wireless identity transmitter may change a bit within a broadcast message that the central server may recognize as indicating an initialization time period for the wireless identity transmitter. If there are initialization indicators within payloads, the central server may expedite comparisons between received payloads and stored payloads by avoiding comparisons to payloads corresponding to already registered (or recognized) wireless identity transmitters within a central server lookup data table.

In block 914, the user's mobile device may receive the broadcast message. In other words, based on the installed application (or app), the mobile device may function as a proximity broadcast receiver. An installed application may, such as the app installed with the operations in block 902, may be waiting to receive such a broadcast message in response to initiating registration operations with the central server via the registration request. In block 916, the mobile device may transmit the wireless identity transmitter's rolling identifier and other information, such as the stored device ID and authentication information. In an embodiment, the mobile device may extract encoded information from the received broadcast message, such as by using text comparison and/or parsing operations. For example, the mobile device may perform a most-significant bit operation.

In block 918, the central server may receive the message with the encoded information, as well as the authentication information and the device ID. In block 920, the central server may validate authentication information, such as in the received message from the mobile device. In particular, the central server may compare the authentication information to information generated in the operations in blocks 908-910.

In block 922, the central server may generate a set of rolling identifiers using the device ID and possible nonce or counter values. The central server may compare the encoded identifiers of the set with the rolling identifier received from the mobile device. In an embodiment, the central server may compute a set of encoded data by using a pseudo-random function, such as described above, along with the device ID and a number of nonce or counter values. For example, the central server may execute the pseudo-random function with a seed shared with wireless identity transmitters, the device ID indicated by the mobile device, and many nonce or counter values, starting with 0.

In block 924, when the central server matches the received rolling identifier to one of the rolling identifiers in the generated set, the central server may store relevant nonce or counter value and time in relation to the WIT. The central server may use the nonce or counter value used to generate the matching rolling identifier to sync with the nonce or counter running on the wireless identity transmitter. In an embodiment, the central server may store an indicator that describes the wireless identity transmitter as having been successfully registered and/or synced.

In optional block 926, the central server may then transmit a registration result message to the user, such as by transmitting a message to the mobile device. The registration result message may indicate whether or not the central server was able to match the received encoded identifier with a generated identifier. Further the registration result message may indicate an initial or default movement indicator value.

In optional block 928, the mobile device may receive the registration result message. In an embodiment, the registration result message indicates that the registration process failed (e.g., the received broadcast message received by the mobile device did not correspond to the user's wireless identity transmitter), the mobile device may re-attempt the registration by receiving and relaying another broadcast message.

The operations described above, particularly within blocks 913-924, assume that message processing operations performed by the various devices, as well as any propagation delay, may be much smaller than the time required to increment (or update) the nonce or counter value at the wireless identity transmitter. This ensures that the nonce or counter values at the wireless identity transmitter and central server do not differ by more than 1.

Figure 10:
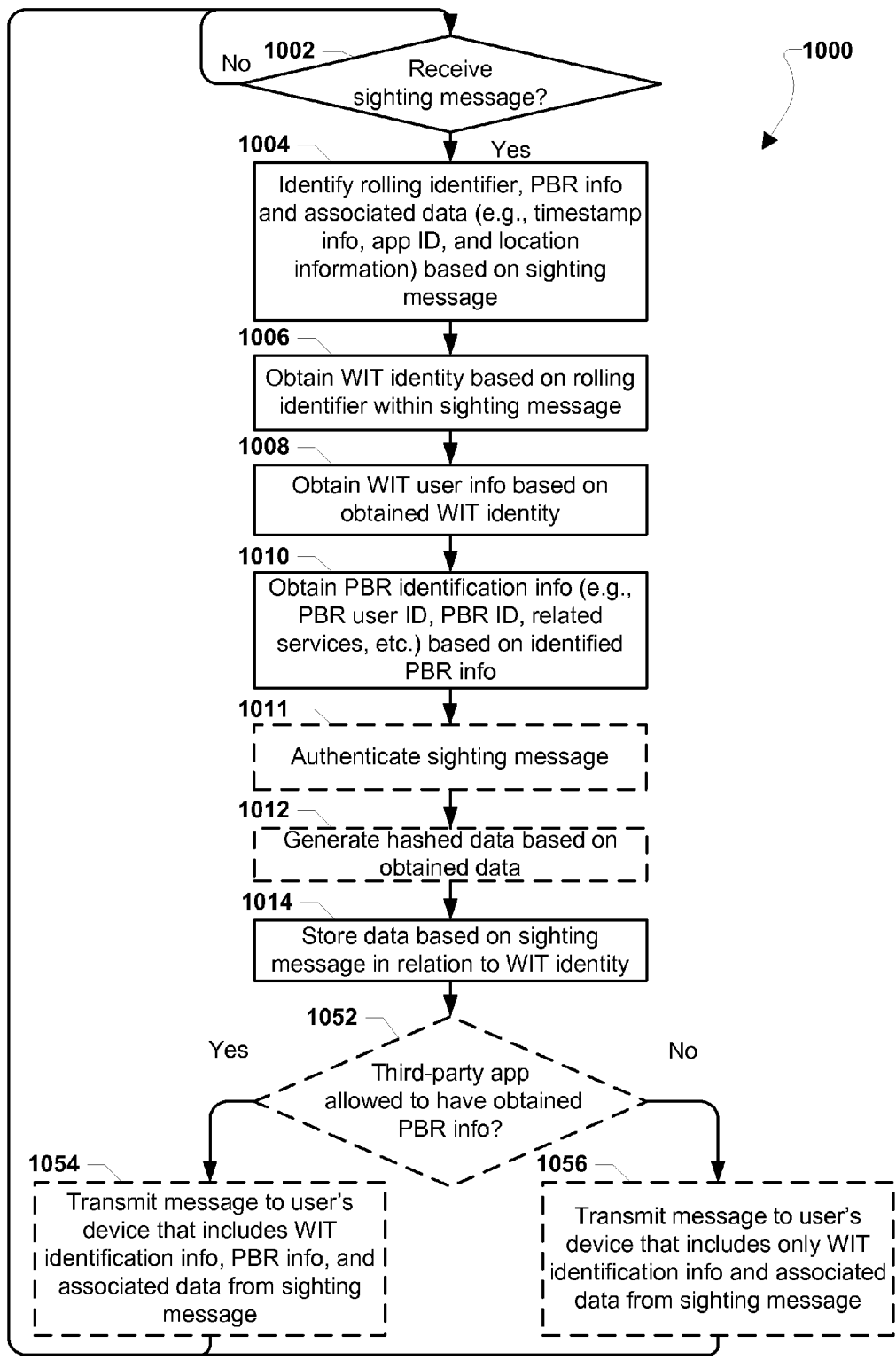
FIG. 10 is a process flow diagram illustrating an embodiment method for a central server to process sighting messages received from proximity broadcast receivers.

FIG. 10 illustrates an embodiment method 1000 for a central server to process sighting messages received from proximity broadcast receivers. As described above, the central server may be configured to utilize various modules, components, circuitry, and software to process sighting messages. In determination block 1002, the central server may determine whether a sighting message is received. The central server may evaluate a receiving circuit, buffer, queue or other indicator to determine when messages are received from various devices, such as proximity broadcast receivers. In an embodiment, the central server may utilize a network module as described above to determine whether a sighting message is received. In general, sighting messages may be received via long-range communications, such as packets transmitted via a cellular network over the Internet. If the central server does not receive a sighting message (i.e., determination block 1002="No"), the central server may continue with the operations in determination block 1002.

If the central server receives a sighting message (i.e., determination block 1002="Yes"), in block 1004 the central server may identify wireless identity transmitter information, proximity broadcast receiver information, and associated data based on the sighting message. The central server may evaluate, parse, and otherwise make accessible various data and information segments within the received sighting message. For example, the central server may parse the sighting message to identify an included broadcast message from the wireless identity transmitter. As another example, the central server may identify encoded data corresponding to a wireless identity transmitter identity (i.e., rolling identifier), proximity broadcast receiver identification information (e.g., a receiver ID), location information, timestamp information, sensor data (e.g., accelerometer sensor data, etc.), identifiers of applications (or apps) associated with a proximity broadcast receiver (e.g., a list of installed applications, an identifier for a relevant app executing on the proximity broadcast receiver, etc.). In an embodiment, the central server may perform the operations of block 1004 with a sightings resolver module as described above.

In block 1006, the central server may obtain the wireless identity transmitter identity based on the rolling identifier within the sighting message. The central server may perform operations to decode, descramble, decrypt, or otherwise make accessible the rolling identifier. For example, the central server may perform operations to apply a secret key or decoding algorithm to obtain the identity of the wireless identity transmitter. In an embodiment, the operations of block 1006 may be performed by the central server by way of a rolling ID resolver component as described above. For example, the central server may cause a sightings resolver module to exchange data with the rolling ID resolver component to obtain a decoded wireless identity transmitter identifier.

In block 1008, the central server may obtain (or retrieve) the wireless identity transmitter user information based on the obtained wireless identity transmitter identity. For example, the central server may retrieve user account information related to the wireless identity transmitter, such as demographics information, stored data indicating previous behaviors (e.g., travel paths, location history, etc.), and a last known movement indicator. In an embodiment, the operations of block 1008 may be performed by the central server by way of an authorization system module as described above. For example, the central server may cause the authorization system module to exchange wireless identity transmitter identity information with a user portal component to obtain user information as saved within user registration databases.

In block 1010, the central server may obtain (or retrieve) proximity broadcast receiver identification information, such as proximity broadcast receiver user information and related services, based on the identified proximity broadcast receiver information. For example, the central server may retrieve the merchant identity associated with the proximity broadcast receiver that transmitted the received sighting message, the services the proximity broadcast receiver is registered to participate in, as well as any other relevant information to the proximity broadcast receiver. The central server may retrieve email addresses, MAC addresses, phone numbers, and other contact information related to a user of related proximity broadcast receiver based on the information within the sighting message. For example, the central server may determine the user contact information associated with a proximity broadcast receiver that may be used for subsequent transmissions from the central server, such as emails or SMS text messages that indicate proximity to an item of interest. In an embodiment, the central server may determine the identity of a user of a smartphone that is configured to perform operations of a proximity broadcast receiver.

In an embodiment, the operations of block 1010 may be performed by the central server by way of an authorization system module as described above. For example, the central server may cause the authorization system module to exchange proximity broadcast receiver information with a developer (or user) portal component to obtain information about related registered services (e.g., merchants, stores, vendors, services, etc.) as saved within developer registration databases.

In optional block 1011, the central server may authenticate the sighting message. Based on authentication information within the received sighting message, the central server may perform authentication operations that confirm the legitimacy of the sighting message as coming from a known or otherwise valid proximity broadcast receiver. As described above, sighting messages may include data, such as secret codes, certificates, or hash data, that can be used to confirm the identities of valid proximity broadcast receivers.

As third-parties may attempt to spoof proximity broadcast receivers associated with registered services (e.g., a nefarious spammer may attempt to imitate a merchant's store proximity broadcast receiver by sending a fraudulent sighting message), the central server may check for authentication information that confirms the information within the sighting message is useful and related to a registered service (e.g., a registered merchant, a valid developer, or other party that deploys legitimate proximity broadcast receivers). For example, the central server may detect obscured header information within the sighting message that relates to a merchant established within the central server as a registered developer.

When the sighting message does not include authentication information expected by the central server, such as a special code that all proximity broadcast receivers within a certain building possess, or does include authentication information that does not match information stored in the central server, the central server may disregard the sighting message and all included information. For example, a sighting message with out-of-date or incomplete authentication information may be disregarded by the central server, or alternatively stored in a list for potentially fraudulent proximity broadcast receivers.

In optional block 1012, the central server may generate hashed data based on the obtained and/or retrieve data. In an embodiment, the operations of optional block 1012 may be performed by the central server by way of a data anonimizer module as described above. In block 1014, the central server may store data based on the sighting message in relation to the wireless identity transmitter identity. For example, the central server may store identified associated data from the sighting message in a database in relation to the wireless identity transmitter's decoded identity. In an embodiment, the operations of block 1014 may be performed by the central server by way of a data layer module as described above.

As described above, various messages, such as return messages, alerts (or search activation messages), may be transmitted by the central server to various recipients, such as mobile devices associated with a user. For example, the central server may transmit messages to a user's tablet, smartphone, wireless receiver computing device, or other computing device. A recipient may also include an application or app executing on a mobile device. In an embodiment, the central server may also transmit messages to other third-party recipients or devices, such registered services that may include EMT, fire, local police, retail store, merchant computing devices, and ad servers.

Messages transmitted by the central server in response to receiving sighting messages may be transmitted to inform devices, such as a mobile phone or mobile proximity broadcast receiver carried by a user, of the location of proximity of known wireless identity transmitters. For example, when a proximity broadcast receiver, such as a stationary proximity broadcast receiver within an office, relays a broadcast message from a wireless identity transmitter associated with a user, the central server may respond by transmitting a message back to a mobile device of the user indicating the user is near the office's receiver computing device. Further, a third-party application running on the user's device may use information within the message. For example, a retail store app running on a user's smartphone may receive a notice that the user has moved within proximity of a display area within proximity of a retail store building. In various other embodiments, the third-party applications may be utilized to track owned items associated with wireless identity transmitters. For example, a particular third-party application may perform a ring tone when the user is within proximity of a searched for item with an affixed wireless identity transmitter.

Returning to FIG. 10, in optional determination block 1052, the central server may determine whether a third-party application (or app) is allowed to have obtained proximity broadcast receiver information. In other words, based on data stored in the central server that is associated with the user of the wireless identity transmitter, the central server may detect any registered services or third-party applications that are associated with the user's devices. For example, the central server may evaluate database information to identify the user has installed a third-party application on his/her smartphone that corresponds to a retail store. The proximity broadcast receiver information may include proximity broadcast receiver identification (e.g., an ID code or identifier) and the user identity of the proximity broadcast receiver. In an embodiment, the central server may identify whether third-party applications are allowed such information based on the third-party's developer rights, such as indicated when the third-party registered as a developer or registered service, or alternatively based on the user's permission settings stored within the user's profile within the central server. In an embodiment, the central server may use application identification information provided within the received sighting message to determine whether the third-party applications on the user's device may receive proximity broadcast receiver information. For example, the sighting message may contain indicators of applications (e.g., app IDs) that correspond to the sighting message and thus are allowed to receive any proximity broadcast receiver information from the central server.

If the third-party app is not allowed to have the obtained proximity broadcast receiver information (i.e., optional determination block 1052="No"), in optional block 1056 the central server may transmit a message to the user's device that includes only wireless identity transmitter identification information and associated data from the sighting message. For example, the message transmitted by the central server may include the obtained wireless identity transmitter identity, user information, timestamp data, and location information from the sighting message.

If the third-party app is allowed to have the obtained proximity broadcast receiver information (i.e., optional determination block 1052="Yes"), in optional block 1054 the central server may transmit a message to the user's device that includes wireless identity transmitter identification information, proximity broadcast receiver information, and associated data from the sighting message. For example, the message transmitted by the central server to the user's smartphone may include indicators of the obtained proximity broadcast receiver identification (e.g., serial code, group affiliation, merchant category, etc.). The central server may then continue with the operations in determination block 1002. In an embodiment, the central server may utilize an alert engine module, such as described above with reference to FIG. 9, to transmit and/or generate messages for transmission to various devices.

Figure 11:
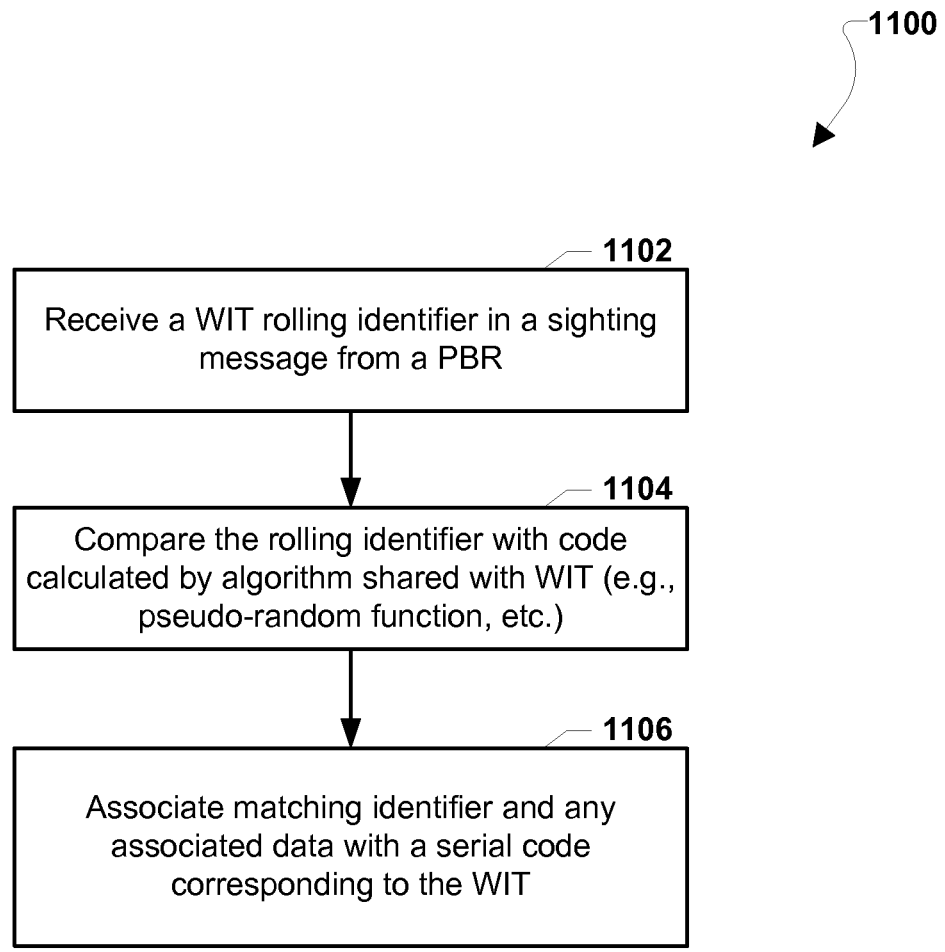
FIG. 11 is a process flow diagram illustrating an embodiment method for a server handling a rolling identifier.

FIG. 11 illustrates an embodiment method 1100 that may be implemented within a central server. The method 1100 may be performed by the central server in response to receiving a sighting message from a proximity broadcast receiver that includes encoded, rolling, or otherwise protected data originally broadcast by a wireless identity transmitter. Privacy of users of wireless identity transmitters may be protected by using a rolling or randomly varying identifier for each wireless identity transmitter so the identifier changes with time. New identifiers may be generated periodically or based on certain events, such when a wireless identity transmitter broadcasts an identifier a certain number of times or for a certain time period (e.g., an hour), or after one or more pairings. This rolling of identifiers may be coordinated with the central server so that the wireless identity transmitter may still be tracked. For example, the wireless identity transmitter and the central server may each have a cryptographically secure pseudo-random number generator algorithm that is used to generate identifiers on a common time scale so that any given moment, the central server can calculate the identifier being transmitted by a particular wireless identity transmitter.

Generating rolling identifiers, or other methods of obfuscating identifiers, is important in that it may prevent sniffing attacks from a third party. For example, if the identifier was static, a third party could sniff the identifier, such as by impersonating a proximity broadcast receiver, and then use the identifier to track the wireless identity transmitter. A rolling identifier may hinder such an attack impossible if the third party lacks the pseudo-random number generator or other means of generating the latest rolling identifiers.

In block 1102, the central server may receive a wireless identity transmitter's rolling identifier in a sighting message from a proximity broadcast receiver. In block 1104, the central server may compare the rolling identifier with code calculated by an algorithm shared with the wireless identity transmitter, such as a pseudo-random function or an encryption algorithm (e.g., AES-CTR, etc.) with shared secret keys. The algorithm may be software instructions, routines, algorithms, circuitry, or modules that are utilized by the central server to calculate codes that are expected to align with rolling identifiers generated and broadcast by the wireless identity transmitter over a period. In various embodiments, the central server may compare the received identifier with the next several codes in case some identifiers were missed. If the received identifier matches any codes generated or expected by the central server, in block 1106 the central server may associate the matching identifier and any associated data with a serial code corresponding to the wireless identity transmitter. This way, if the central server later receives a user request with the wireless identity transmitter's serial code, such as a request from a parent to locate the wireless identity transmitter carried by a child, then the central server can find all the prior matches and any associated data without having to search for every previous rolling identifier.

FIGS. 12A-12E illustrate embodiment methods 1200, 1250, 1260, 1280, 1290 for a proximity broadcast receiver, such as a smartphone or laptop configured with software, routines, and/or instructions to process short-range wireless signals from a wireless identity transmitter, and perform various operations to access functionalities. For example, proximity broadcast receiver may be configured to auto-log into a network, website, application, device, account, etc. or automatically change an operating or configuration mode (e.g., go in/out of sleep mode, security mode, etc.). In particular, the proximity broadcast receiver may perform the methods 1200-1290 in order to perform abbreviated authentication operations (e.g., short-cuts) or more involved authentication operations (e.g., providing complete credentials to log into a network, etc.) based on whether the proximity broadcast receiver is within a known location pre-associated with such operations. For example, when the proximity broadcast receiver receives broadcast messages from a wireless identity transmitter pre-associated with an office, the proximity broadcast receiver may execute operations for automatically logging into the office's local area network. However, as described above, as wireless identity transmitters are capable of being moved, such as by their owners or even nefarious persons, the proximity broadcast receiver may perform additional operations within the methods 1200-1290 to authenticate the wireless identity transmitters and/or validate movement indicators within received signals.

Figure 12A:
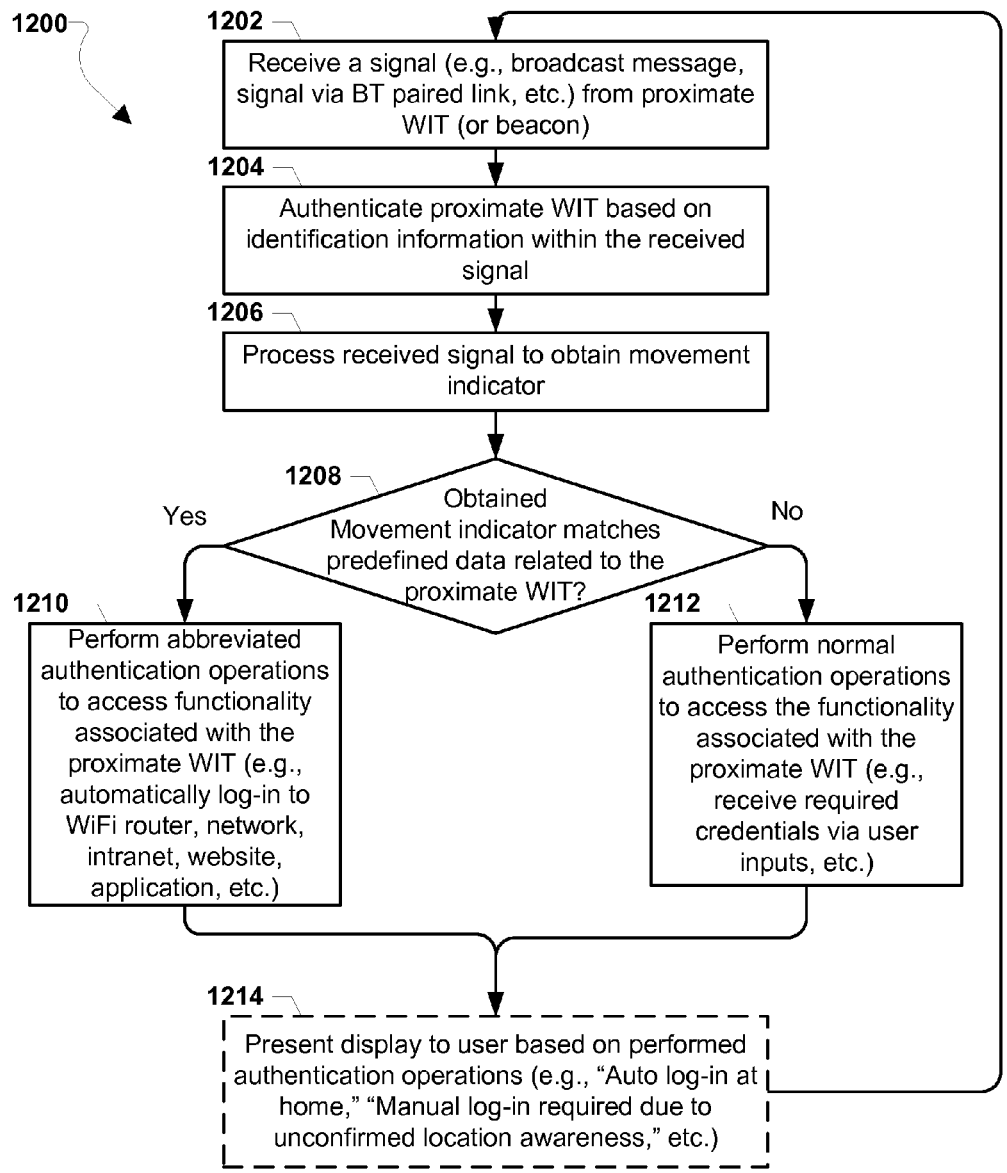
FIGS. 12A-12E are process flow diagrams illustrating embodiment methods for a proximity broadcast receiver to perform various authentication operations to access functionalities.

FIG. 12A illustrates an embodiment method 1200 for a proximity broadcast receiver to process short-range wireless signals from a wireless identity transmitter (referred to as "WIT" in FIG. 12A) and perform various operations to access functionalities associated with a location. In block 1202, the proximity broadcast receiver may receive a signal from a nearby wireless identity transmitter, such as a wireless identity transmitter as described above. The received signal may be a broadcast message, such as a Bluetooth advertisement that includes a rolling identifier associated with the wireless identity transmitter. Alternatively, the received signal may be a communication received via a secure link, such as a Bluetooth connection between paired or bonded devices. In block 1204, the proximity broadcast receiver may authenticate the nearby wireless identity transmitter based on identification information within the received signal. In other words, the proximity broadcast receiver may perform operations to determine whether the wireless identity transmitter can be trusted to provide accurate information. For example, the proximity broadcast receiver may transmit a sighting message with a rolling identifier from the received signal to a central server to authenticate the identity of the nearby wireless identity transmitter. As another example, the proximity broadcast receiver may compare a device identifier within the received signal to a local database of known devices to authenticate the nearby wireless identity transmitter.

In block 1206, the proximity broadcast receiver may process the received signal to obtain a movement indicator. For example, the proximity broadcast receiver may parse, decode, decrypt, and otherwise evaluate information or data within the received signal to identify a code, value, number, or other information representing whether the nearby wireless identity transmitter has been moved as described above. In an embodiment, the proximity broadcast receiver may obtain information such as the movement indicator from a central server in response to transmitting a sighting message based on the received signals. For example, the central server may return a decoded movement indicator from obscured information within a sighting message (or other payload) transmitted by the proximity broadcast receiver when the proximity broadcast receiver is not configured to decode the obscured information locally.

In determination block 1208, the proximity broadcast receiver may determine whether the obtained movement indicator matches stored data related to the nearby wireless identity transmitter. Such stored data may be locally stored data, such as a database on the proximity broadcast receiver that includes records or entries of the movement indicators of various wireless identity transmitters. For example, the proximity broadcast receiver may compare the obtained movement indicator from the received signal to a database entry associated with the nearby wireless identity transmitter to determine whether the obtained movement indicator matches the stored information, which would indicate that the wireless identity transmitter has not been moved since the last time the movement indicator was received and stored in memory. Alternatively, the stored data may be stored on a central server. For example, in response to transmitting the movement indicator to a central server, such as within a sighting message, the proximity broadcast receiver may receive a message from the central server indicating whether the movement indicator is valid (or validated) for the nearby wireless identity transmitter.

If it is determined that the obtained movement indicator matches the stored data related to the nearby wireless identity transmitter (i.e., determination block 1208="Yes"), then the nearby wireless identity transmitter that transmitted the received signal has not been moved and thus the received signal can be used to trigger pre-associated operations. Accordingly, in block 1210, the proximity broadcast receiver may perform abbreviated authentication operations to access functionality associated with the nearby wireless identity transmitter. Abbreviated authentication operations may include the automatic use of stored passwords, log-ins, configurations, scripts, or other secure information. For example, the proximity broadcast receiver may use stored credentials (e.g., username, password, PIN, etc.) to automatically log-in to a WiFi router, network, intranet, website, application, etc. associated with a known location (e.g., an office at work). The functionality that may be accessed with abbreviated authentication operations may include executing software/routines/apps/etc., transmitting communications, and/or setting operating or configuration modes of the proximity broadcast receiver. For example, the proximity broadcast receiver may automatically enable a security configuration mode to unlock a screen when it is determined to be within a home area. As another example, the proximity broadcast receiver may automatically bypass a log-in screen on a laptop when it is determined to be within a trusted location, like a home or office. The proximity broadcast receiver may store data tables or other stored information to associate various functionalities with a known wireless identity transmitter and/or its identifier. For example, the proximity broadcast receiver may perform a look-up on a database using the wireless identity transmitter's unique device identifier to determine that a workplace intranet auto-login functionality is associated. Such stored information may be defined by a user, such as via user inputs to add database entries and associations. In an embodiment, the stored information may be downloaded to the proximity broadcast receiver from another device, such as the central server. In another embodiment, the functionality may be indicated within the received signal, such as a code, script, number or other data broadcast by the wireless identity transmitter that indicates what abbreviated operations may be performed to access particular functionalities when it is determined the wireless identity transmitter has not been moved.

If it is determined that the obtained movement indicator does not match the stored data related to the nearby wireless identity transmitter (i.e., determination block 1208="No"), then the nearby wireless identity transmitter that transmitted the received signal has been moved and thus the received signal cannot be used to trigger pre-associated operations. Accordingly, in block 1212, the proximity broadcast receiver may perform normal authentication operations to access the functionality associated with the nearby wireless identity transmitter. For example, the proximity broadcast receiver may request a user to input a username and password in order to log-into an intranet, website, and/or application. As another example, because the proximity broadcast receiver has determined it is not near a known wireless identity transmitter that has not been moved (e.g., the proximity broadcast receiver is in the park as opposed to within an office, etc.), the proximity broadcast receiver may continue to operate in a normal security configuration mode that requires a finger print, facial recognition input, password, or other user-supplied information before opening a work-related email client application.

In optional block 1214, the proximity broadcast receiver may present a display to a user based on the performed authentication operations. For example, the proximity broadcast receiver may render on an attached LCD display a message indicating that an automatic login to an intranet was performed due to the proximity broadcast receiver being located within an office. As another example, the proximity broadcast receiver may render a message to the user indicating that a full-security mode is in effect, requiring credentials and other manual inputs in order to login to a network while the proximity broadcast receiver is not within the office. The proximity broadcast receiver may continue with the operations in block 1202 for receiving subsequent signals.

Figure 12B:
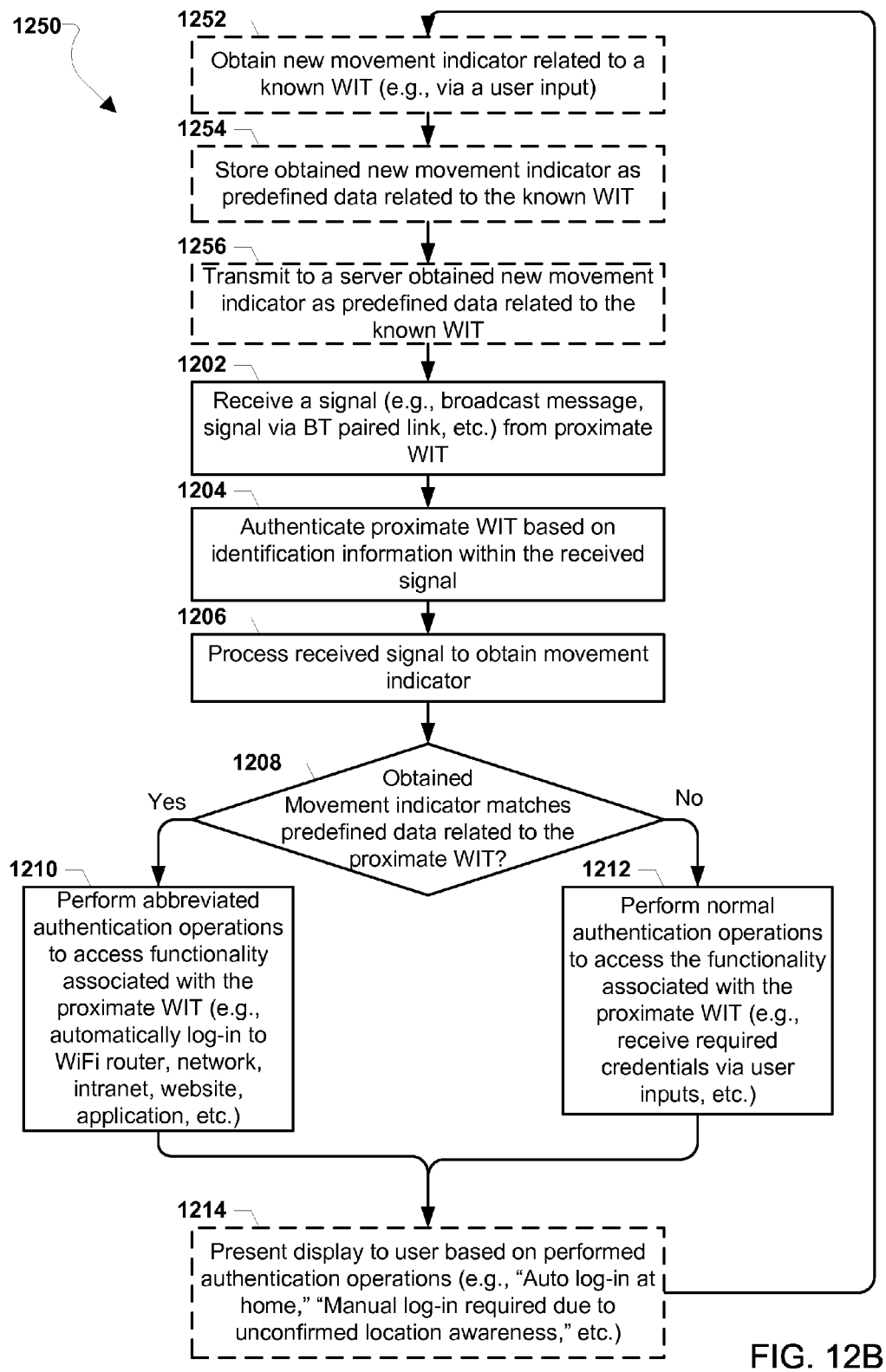

FIG. 12B illustrates an embodiment method 1250 for a proximity broadcast receiver to process short-range wireless signals from a wireless identity transmitter (referred to as "WIT" in FIG. 12B) and perform various operations to access functionalities associated with a location. The method 1250 is similar to the method 1200 described above, except the method 1250 may include operations for obtaining new movement indicators for wireless identity transmitters. For example, the proximity broadcast receiver may receive a user input indicating that a nearby wireless identity transmitter's movement indicator is valid. This may be beneficial when such a wireless identity transmitter or other beacon device is legitimately moved and the user must configure the proximity broadcast receiver to recognize a new movement indicator associated with an expected location.

Accordingly, in optional block 1252, the proximity broadcast receiver may obtain a new movement indicator related to a known wireless identity transmitter (e.g., via a user input). The new movement indicator may be input into a user interface on the proximity broadcast receiver, such as by the user adding a new database entry associated with a certain wireless identity transmitter of a location (e.g., an office, etc.). For example, during a set-up or updating process, the proximity broadcast receiver may receive new or updated values for movement indicators for one or more wireless identity transmitters within known locations (e.g., home, office, etc.). Alternatively, the proximity broadcast receiver may obtain the new movement indicator from a message received from another device, such as a central server. For example, based on new information received at the central server from a user via a web portal, the proximity broadcast receiver may receive an updated movement indicator from the central server. In optional block 1254, the proximity broadcast receiver may store the obtained new movement indicator as stored data related to the known wireless identity transmitter. For example, the proximity broadcast receiver may store the obtained new movement indicator in a database entry associated with the known wireless identity transmitter. In optional block 1256, the proximity broadcast receiver may transmit to a server obtained new movement indicator as stored data related to the known wireless identity transmitter. For example, when the new movement indicator is originally obtained locally, such as via user inputs on a touchscreen coupled to the proximity broadcast receiver, the new movement indicator may be transmitted to a cloud data storage device or server for record-keeping purposes.

As described above, in block 1202, the proximity broadcast receiver may receive a signal from a nearby beacon device, such as a wireless identity transmitter as described above, and may authenticate the nearby wireless identity transmitter based on identification information within the received signal in block 1204. In block 1206, the proximity broadcast receiver may process the received signal to obtain a movement indicator, and may determine whether the obtained movement indicator matches stored data related to the nearby wireless identity transmitter in determination block 1208. If it is determined that the obtained movement indicator matches the stored data related to the nearby wireless identity transmitter (i.e., determination block 1208="Yes"), in block 1210, the proximity broadcast receiver may perform abbreviated authentication operations to access functionality associated with the nearby wireless identity transmitter. If it is determined that the obtained movement indicator does not match the stored data related to the nearby wireless identity transmitter (i.e., determination block 1208="No"), in block 1212, the proximity broadcast receiver may perform normal authentication operations to access the functionality associated with the nearby wireless identity transmitter. In optional block 1214, the proximity broadcast receiver may present a display to a user based on the performed authentication operations, and may continue with the operations in optional block 1252 for obtaining new movement indicators.

Figure 12C:
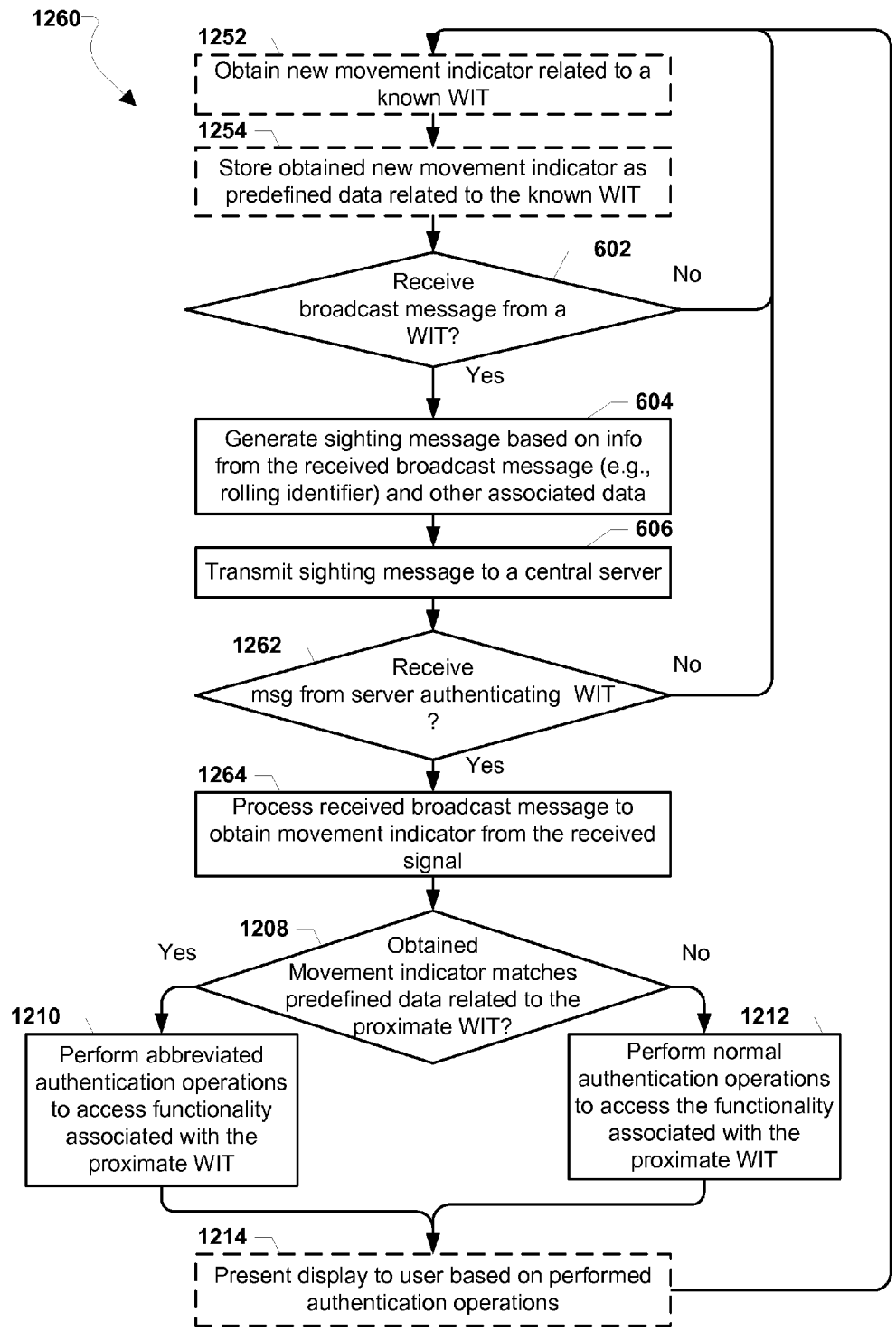

FIG. 12C illustrates an embodiment method 1260 for a proximity broadcast receiver to process short-range wireless signals from a wireless identity transmitter (referred to as "WIT" in FIG. 12C) and perform various operations to access functionalities associated with a location. The method 1260 is similar to the methods 1200, 1250 described above, except the method 1260 may include operations specifically for handling broadcast messages from wireless identity transmitters. In particular, the proximity broadcast receiver may be configured to perform operations for communicating with a central server to determine whether nearby wireless identity transmitters are authenticated (i.e., not spoofed) and thus providing trustworthy information about whether they have been moved or not.

As described above, in optional block 1252, the proximity broadcast receiver may obtain a new movement indicator related to a known wireless identity transmitter (e.g., via a user input), and may store the obtained new movement indicator as stored data related to the known wireless identity transmitter in optional block 1254. In determination block 602, the proximity broadcast receiver may determine whether a broadcast message is received from a nearby wireless identity transmitter. If the proximity broadcast receiver does not receive a broadcast message (i.e., determination block 602="No"), the proximity broadcast receiver may continue with the operations in optional block 1252 for obtaining new movement indicators. However, if the proximity broadcast receiver receives a broadcast message (i.e., determination block 602="Yes"), in block 604 the proximity broadcast receiver may generate a sighting message based on info from the received broadcast message (e.g., rolling identifier) and other associated data, and may transmit the sighting message to a central server in block 606. For example, the proximity broadcast receiver may transmit a sighting message to the central server that includes a rolling device identifier of the nearby wireless identity transmitter and a movement indicator, or simply the rolling device identifier.

In determination block 1262, the proximity broadcast receiver may determine whether a message that authenticates the wireless identity transmitter related to the received broadcast message is received from the central server, such as by monitoring an incoming message buffer. In other words, the central server may transmit messages that verify or deny whether the wireless identity transmitter can be trusted by the proximity broadcast receiver. Messages from the central server may include codes, language, flags, or other data that indicate whether the wireless identity transmitter related to the transmitted sighting message is authenticated. For example, a message may include a bit that is set to indicate whether the central server could resolve the identity of a known wireless identity transmitter based on the information in the transmitted sighting message. Further, the proximity broadcast receiver may compare unique codes or other information (e.g., metadata, header information, etc.) within incoming messages to determine whether the messages are related to the transmitted sighting message. If it is not determined that a message from the central server is received that authenticates the nearby wireless identity transmitter (i.e., determination block 1262="No"), the proximity broadcast receiver may continue with the operations in optional block 1252 for obtain new movement indicators.

However, if it is determined that a message from the central server is received that authenticates the nearby wireless identity transmitter (i.e., determination block 1262="Yes"), in block 1264 the proximity broadcast receiver may process the received broadcast message to obtain a movement indicator from the received signal, such as by perform operations similar to those described above with reference to block 1206. In determination block 1208, the proximity broadcast receiver may determine whether the obtained movement indicator matches stored data related to the nearby wireless identity transmitter. If it is determined that the obtained movement indicator matches the stored data related to the nearby wireless identity transmitter (i.e., determination block 1208="Yes"), in block 1210, the proximity broadcast receiver may perform abbreviated authentication operations to access functionality associated with the nearby wireless identity transmitter. If it is determined that the obtained movement indicator does not match the stored data related to the nearby wireless identity transmitter (i.e., determination block 1208="No"), in block 1212, the proximity broadcast receiver may perform normal authentication operations to access the functionality associated with the nearby wireless identity transmitter. In optional block 1214, the proximity broadcast receiver may present a display to a user based on the performed authentication operations, and may continue with the operations in optional block 1252 for obtaining new movement indicators.

Figure 12D:
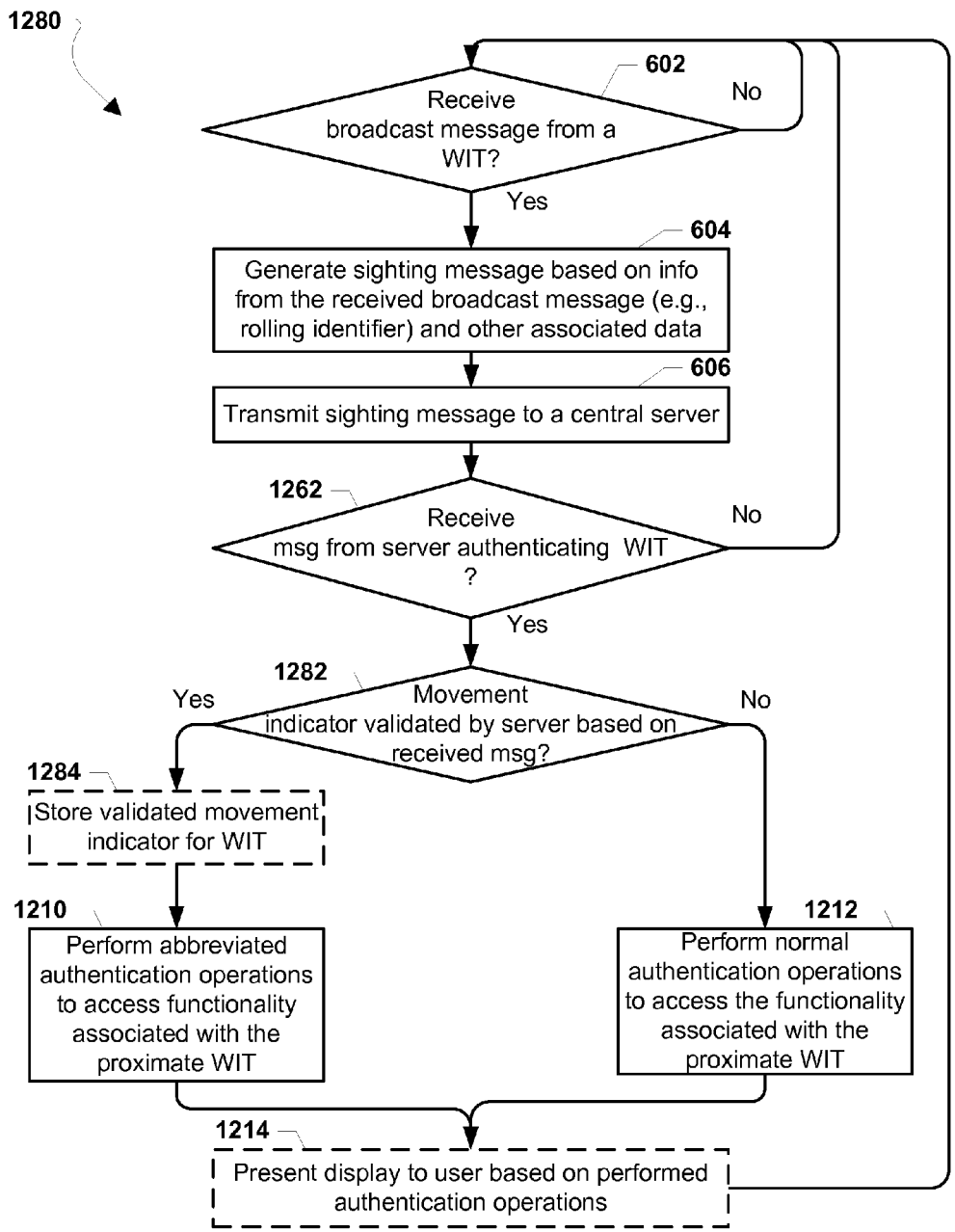

FIG. 12D illustrates an embodiment method 1280 for a proximity broadcast receiver to process short-range wireless signals from a wireless identity transmitter (referred to as "WIT" in FIG. 12D) and perform various operations to access functionalities associated with a location. The method 1280 is similar to the methods 1200, 1250, 1260 described above, except the method 1280 may include operations for receiving validation of movement indicators of wireless identity transmitters from a central server.

As described above, in determination block 602, the proximity broadcast receiver may determine whether a broadcast message is received from a nearby wireless identity transmitter. If the proximity broadcast receiver does not receive a broadcast message (i.e., determination block 602="No"), the proximity broadcast receiver may continue with the operations in determination block 602 for determining whether new broadcast messages are received. However, if the proximity broadcast receiver receives a broadcast message (i.e., determination block 602="Yes"), in block 604 the proximity broadcast receiver may generate a sighting message based on info from the received broadcast message (e.g., rolling identifier) and other associated data, and may transmit the sighting message to a central server in block 606.

In determination block 1262, the proximity broadcast receiver may determine whether a message that authenticates the wireless identity transmitter related to the received broadcast message is received from the central server, such as by monitoring an incoming message buffer. If the proximity broadcast receiver determines that a message from the central server is not received that authenticates the nearby wireless identity transmitter (i.e., determination block 1262="No"), the proximity broadcast receiver may continue with the operations in determination block 602 for determining whether new broadcast messages are received. However, if it is determined that a message from the central server is received that authenticates the nearby wireless identity transmitter (i.e., determination block 1262="Yes"), in determination block 1282, the proximity broadcast receiver may determine whether a movement indicator associated with the wireless identity transmitter (e.g., a movement indicator received via the received broadcast message) was determined to be valid by the central server. In other words, the proximity broadcast receiver may receive a code or other information from the central server, such as in a return or response message from the central server, that indicates stored data stored at the central server matches the movement indicator broadcast by the nearby wireless identity transmitter.

If it is determined that the movement indicator is validated by the central server based on the received message (i.e., determination block 1282="Yes"), in optional block 1284 the proximity broadcast receiver may store the validated movement indicator for the nearby wireless identity transmitter, such as by updating a local database, and may perform abbreviated authentication operations to access functionality associated with the nearby wireless identity transmitter in block 1210. If it is determined that the obtained movement indicator does not match the stored data related to the nearby wireless identity transmitter (i.e., determination block 1208="No"), in block 1212, the proximity broadcast receiver may perform normal authentication operations to access the functionality associated with the nearby wireless identity transmitter. In optional block 1214, the proximity broadcast receiver may present a display to a user based on the performed authentication operations, and may continue with the operations in determination block 602 for determining whether new broadcast messages are received.

Figure 12E:
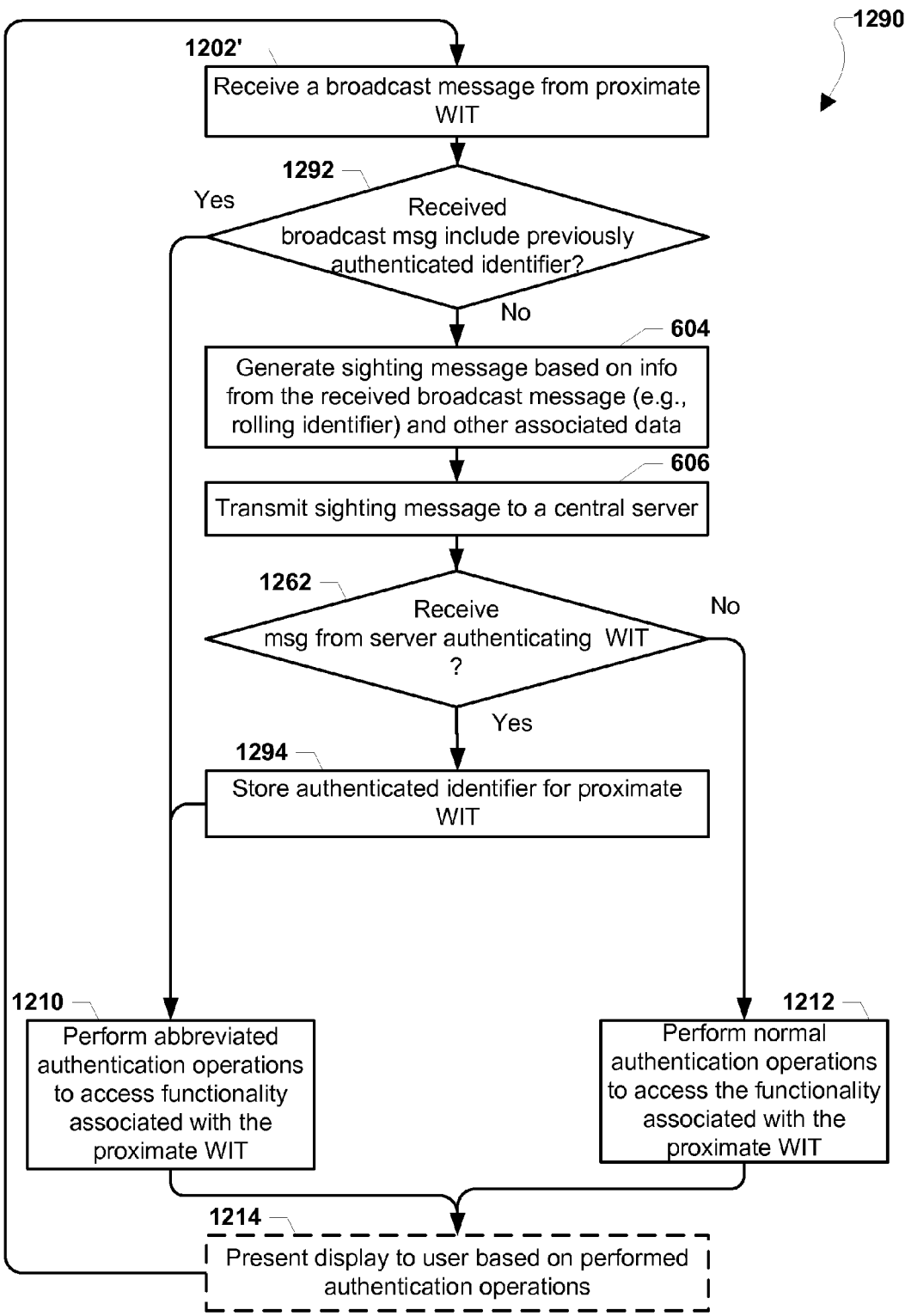

FIG. 12E illustrates an embodiment method 1290 for a proximity broadcast receiver to process short-range wireless signals from a wireless identity transmitter (referred to as "WIT" in FIG. 12E) and perform various operations to access functionalities associated with a location. The method 1290 is similar to the methods 1200, 1250, 1260, 1280 described above, except the method 1290 may be performed by the proximity broadcast receiver for scenarios when only a single identifier (e.g., a rolling device identifier) is transmitted by wireless identity transmitters such as described above with reference to FIG. 2B. In other words, the proximity broadcast receiver may perform the operations of the method 1290 in order to determine whether a wireless identity transmitter associated with a location has been moved based on whether a single broadcast identifier matches stored data.

In block 1202', the proximity broadcast receiver may receive a broadcast message from a nearby wireless identity transmitter. In determination block 1292, the proximity broadcast receiver may determine whether the received broadcast message includes a previously authenticated identifier. The proximity broadcast receiver may compare data, such as rolling device identifiers, an encrypted code, or other data extracted from the received broadcast message, to stored data corresponding to known (or authenticated) wireless identity transmitters. For example, proximity broadcast receiver may determine whether a device identifier from the received broadcast message is within a stored data table of devices associated with locations of interest the proximity broadcast receiver's user. In various embodiments, the previously authenticated identifiers may have been received from a central server in previous executions of the method 1290 or otherwise from user inputs, such as user confirmations of identities via a user interface or application executing on the proximity broadcast receiver. The operations in determination block 1292 may be beneficial in avoiding unnecessary communications to the central server to authenticate already known beacon devices that are configured to only broadcast different identifiers when moved.

If it is determined the received broadcast message does not include a previously authenticated identifier (i.e., determination block 1292="No"), in block 604 the proximity broadcast receiver may generate a sighting message based on info from the received broadcast message (e.g., rolling identifier) and other associated data, and may transmit the sighting message to a central server in block 606. In determination block 1262, the proximity broadcast receiver may determine whether a message that authenticates the wireless identity transmitter related to the received broadcast message is received from the central server. If it is determined that a message authenticating the wireless identity transmitter is received from the central server (i.e., determination block 1262="Yes"), in block 1294 the proximity broadcast receiver may store the authenticated identifier for the nearby wireless identity transmitter, such as by updating a locally stored database.

If it is determined the received broadcast message does include a previously authenticated identifier (i.e., determination block 1292="Yes"), or the operations in block 1294 have been performed, in block 1210 the proximity broadcast receiver may perform abbreviated authentication operations to access functionality associated with the nearby wireless identity transmitter. If it is determined that no message authenticating the wireless identity transmitter is received from the central server (i.e., determination block 1262="No"), in block 1212, the proximity broadcast receiver may perform normal authentication operations to access the functionality associated with the nearby wireless identity transmitter. In optional block 1214, the proximity broadcast receiver may present a display to a user based on the performed authentication operations, and may continue with the operations in block 1202' for receiving new broadcast messages.

Figure 13A:
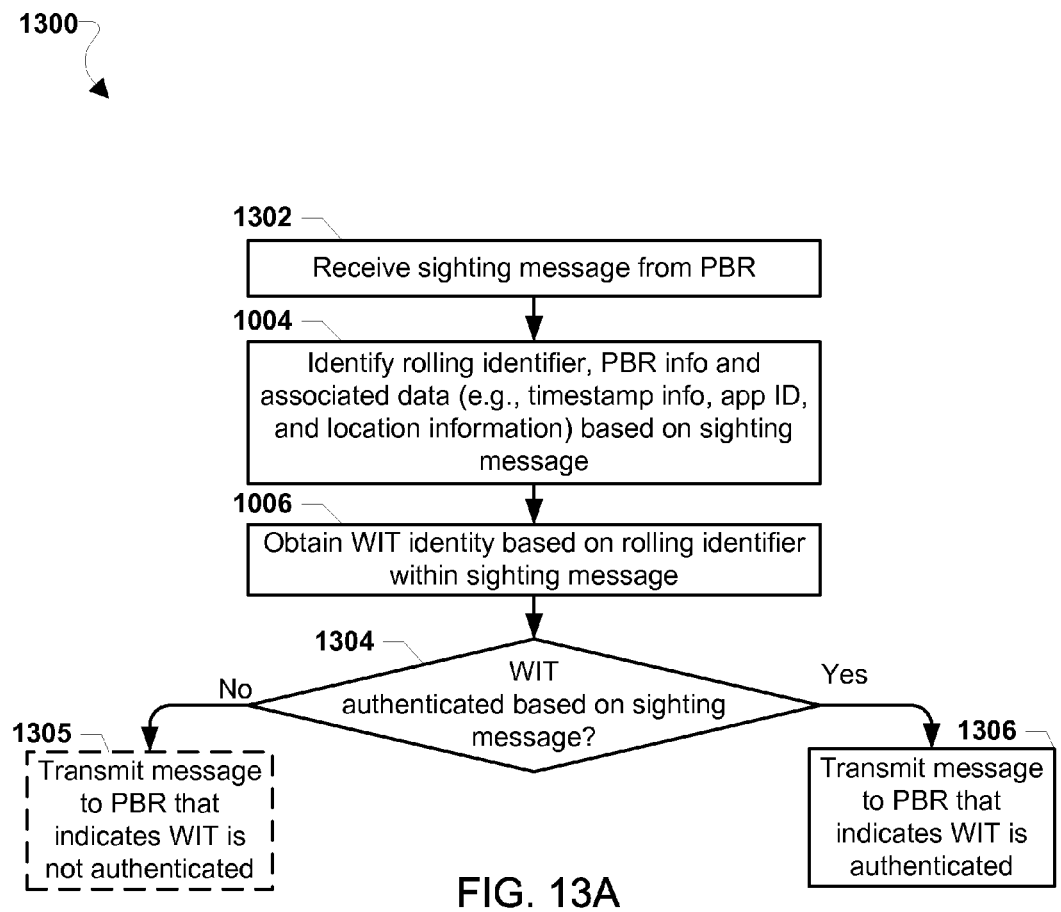
FIGS. 13A-13B are process flow diagrams illustrating embodiment methods for a server to transmit authenticating information to a proximity broadcast receiver.
Figure 13B:
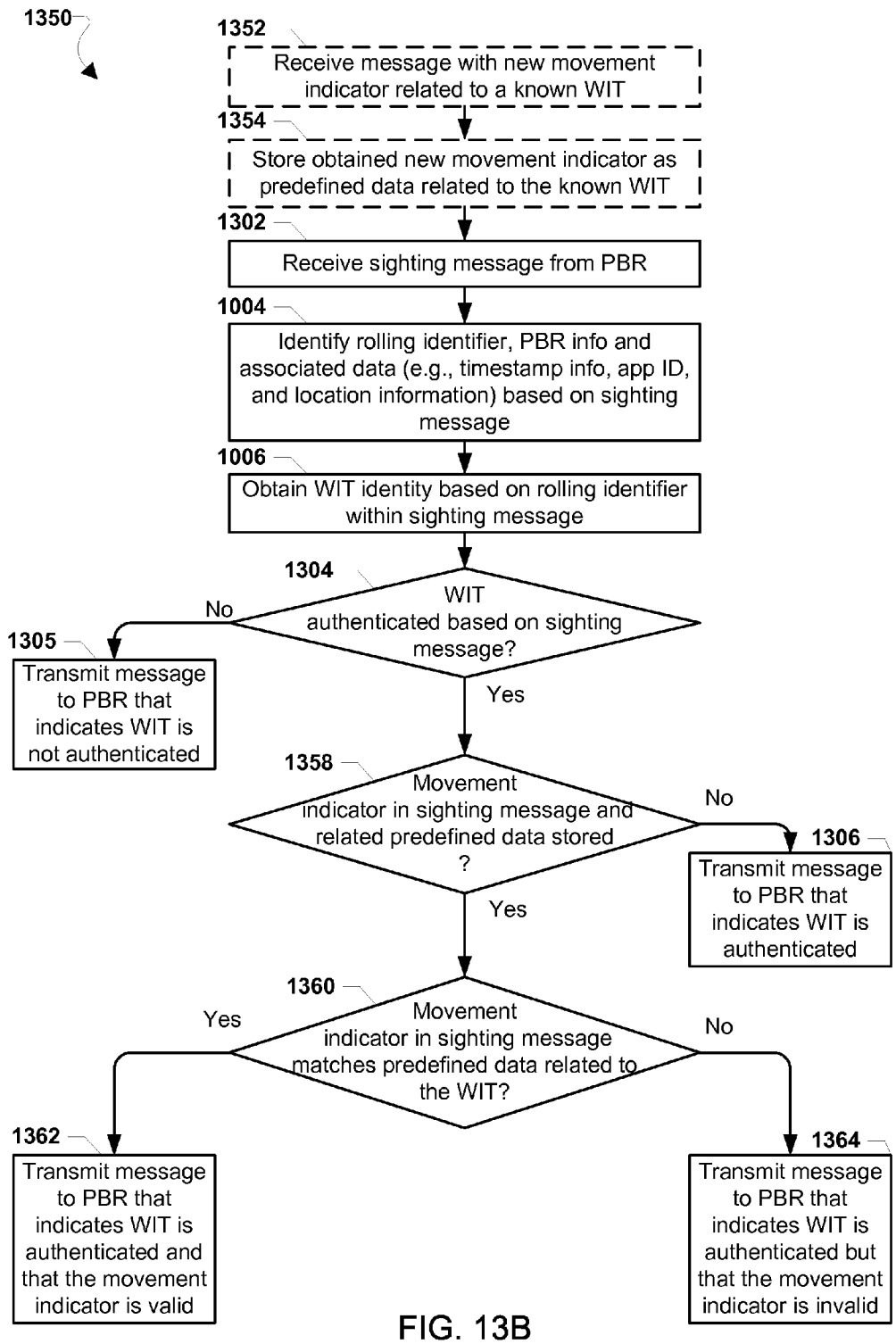

FIGS. 13A-13B illustrate embodiment methods 1300, 1350 for a central server to transmit authenticating information to a proximity broadcast receiver nearby to a wireless identity transmitter. The methods 1300, 1350 may be beneficial for returning authentications of identifiers (e.g., rolling device identifiers, etc.) and/or validations of movement indicators received by proximity broadcast receivers, such as described above with reference to FIGS. 12A-12E. In particular, a central server may be configured to decode, decrypt, and otherwise access obfuscated or obscured information within broadcast messages transmitted by wireless identity transmitters (or other similar beacon devices) as well as evaluate stored records to determine whether identifiers are authentic (e.g., from registered beacon devices) and/or up-to-date. For example, the central server may evaluate rolling device identifiers relayed from a proximity broadcast receiver using secret keys and algorithms to determine whether a rolling identifier is legitimate or spoofed. Further, the central server may be a resource or data hub (e.g., cloud server) that is configured to maintain the latest information about related devices, such as the latest valid movement indicator of a wireless identity transmitter known to be located within an office, etc. In this way, the central server may be configured to provide certainty to proximity broadcast receivers, indicating that broadcast information may be trusted and/or that operations may be performed based on being within a known location.

FIG. 13A illustrates an embodiment method 1300 for a central server to transmit authenticating information to a proximity broadcast receiver in response to receiving an identifier of a wireless identity transmitter. The method 1300 may be similar to the operations in FIG. 10, except the method 1300 includes operations for returning authentication information to proximity broadcast receivers. In block 1302, the central server may receive a sighting message from a proximity broadcast receiver, such as a sighting message that includes a rolling device identifier of a wireless identity transmitter. In block 1004, the central server may identify a rolling identifier, proximity broadcast receiver info and associated data (e.g., timestamp info, app ID, and location information) based on the received sighting message. In block 1006, the central server may obtain a wireless identity transmitter identity based on the rolling identifier within the received sighting message.

In determination block 1304, the central server may determine whether a wireless identity transmitter is authenticated based on sighting message. In other words, when an identity is successfully found based on the data within the sighting message (i.e., a rolling identifier may be decoded to reveal a known device identifier of a registered wireless identity transmitter), the central server may have authenticated that the wireless identity transmitter related to the sighting message is trustworthy for the proximity broadcast receiver. Therefore, if it is determined that a wireless identity transmitter is not authenticated based on the received sighting message (i.e., determination block 1304="No"), in optional block 1305, the central server may transmit a message to the proximity broadcast receiver that indicates the wireless identity transmitter that transmitted the related broadcast message is not authenticated. The operations in optional block 1305 may be optional as by default the proximity broadcast receiver may determine a wireless identity transmitter is not authenticated unless contrary information is received from the central server within a predefined period. However, if it is determined that a wireless identity transmitter is authenticated based on the received sighting message (i.e., determination block 1304="Yes"), in block 1302, the central server may transmit a message to the proximity broadcast receiver that indicates the wireless identity transmitter is authenticated.

In an embodiment, a wireless identity transmitter may not be authenticated when the central server determines that a device identifier within the received sighting message has been rolled or otherwise changed from its default (or last authenticated) value. For example, when a wireless identity transmitter is configured to roll its identifier in response to detecting motion activity based on accelerometer sensor data, the central server may determine the wireless identity transmitter is not authenticated due to being moved.

FIG. 13B illustrates an embodiment method 1350 for a central server to transmit authenticating information to a proximity broadcast receiver in response to receiving an identifier of a wireless identity transmitter. The method 1350 may be similar to the method 1300 described above, except the method 1350 includes operations for returning authentication information for device identifiers and validation information for movement indicators related to wireless identity transmitters.

In optional block 1352, the central server may receive a message with a new movement indicator related to a known wireless identity transmitter, and may store the obtained new movement indicator as stored data related to the known wireless identity transmitter in optional block 1354, such as by updating a related database entry. Messages with new movement indicators may be received from proximity broadcast receivers, such as in response to the operations of optional block 1256 described above. Alternatively, new or updated movement indicators may be received via a web portal, such as when a user accesses a web service related to the central server using a computer connected to the Internet.

As described above, in block 1302, the central server may receive a sighting message from a proximity broadcast receiver, such as a sighting message that includes a rolling device identifier of a wireless identity transmitter. In block 1004, the central server may identify a rolling identifier, proximity broadcast receiver info and associated data (e.g., timestamp info, app ID, and location information) based on the received sighting message. In block 1006, the central server may obtain a wireless identity transmitter identity based on the rolling identifier within the received sighting message. In determination block 1304, the central server may determine whether a wireless identity transmitter is authenticated based on sighting message. If it is determined that a wireless identity transmitter is not authenticated based on the received sighting message (i.e., determination block 1304="No"), in block 1305, the central server may transmit a message to the proximity broadcast receiver that indicates the wireless identity transmitter that transmitted the related broadcast message is not authenticated.

If it is determined that a wireless identity transmitter is authenticated based on the sighting message (i.e., determination block 1304="Yes"), in determination block 1358, the central server may determine whether there is a movement indicator in the received sighting message as well as stored within related stored data. For example, the central server may determine whether a representation (e.g., a 64-bit movement indicator) is within the sighting message and may also perform a look-up on a database associated with registered wireless identity transmitters using the obtained identity and determine whether a default or updated movement indicator is stored for the wireless identity transmitter. In other words, the central server may determine whether it has enough information available to validate a movement indicator and thus determine whether the wireless identity transmitter has moved. If it is determined that there are not both a movement indicator in the sighting message and related data stored in the central server (i.e., determination block 1358="No"), in block 1306 the central server may transmit a message to the proximity broadcast receiver that only indicates the wireless identity transmitter is authenticated without validating whether there has been any movement of the wireless identity transmitter.

If it is determined that there are both a movement indicator in the sighting message and related data stored in the central server (i.e., determination block 1358="Yes"), in determination block 1360, the central server may determine whether the movement indicator in the received sighting message matches the stored data related to the wireless identity transmitter, such as the last stored movement indicator in a database entry associated with the obtained identity. If it is determined that the movement indicator in the received sighting message matches the stored data related to the wireless identity transmitter (i.e., determination block 1360="Yes"), in block 1362 the central server may transmit a message to the proximity broadcast receiver that indicates the wireless identity transmitter is authenticated and that the movement indicator is valid. If it is determined that the movement indicator in the received sighting message does not match the stored data related to the wireless identity transmitter (i.e., determination block 1360="No"), in block 1364 the central server may transmit a message to the proximity broadcast receiver that indicates the wireless identity transmitter is authenticated but that the movement indicator is not valid.

Figure 14A:
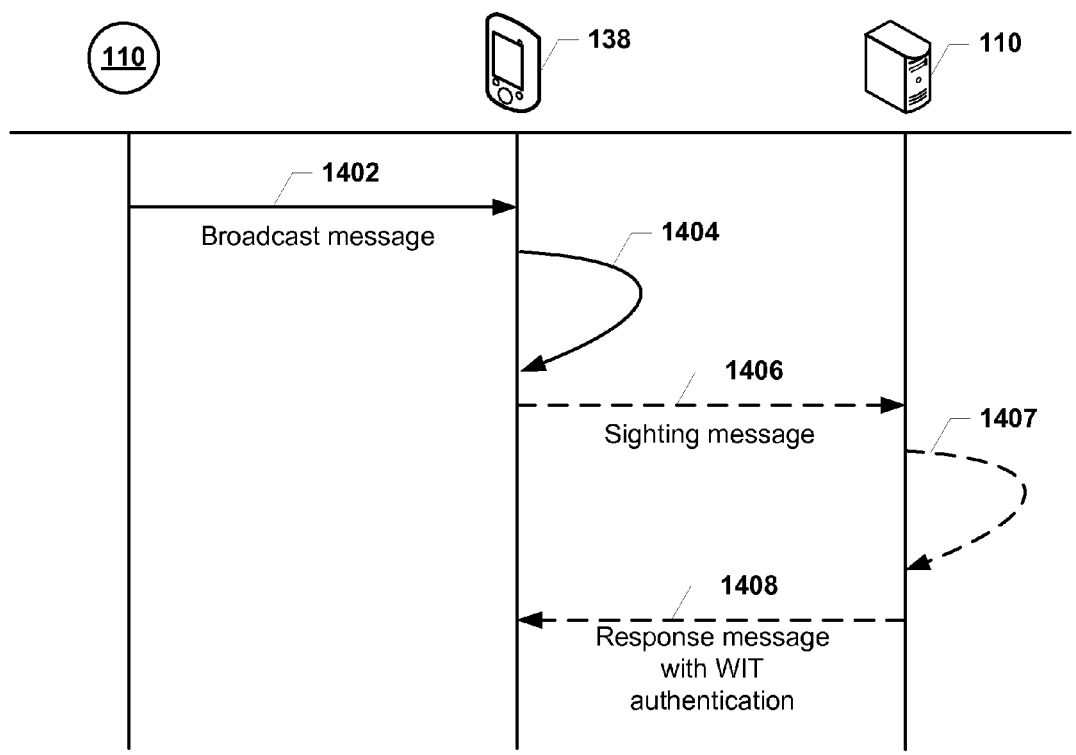
FIGS. 14A-14C are call flow diagrams illustrating exemplary signaling between a proximity broadcast receiver, a beacon (or wireless identity transmitter), and a central server suitable for use in the various embodiments.
Figure 14B:
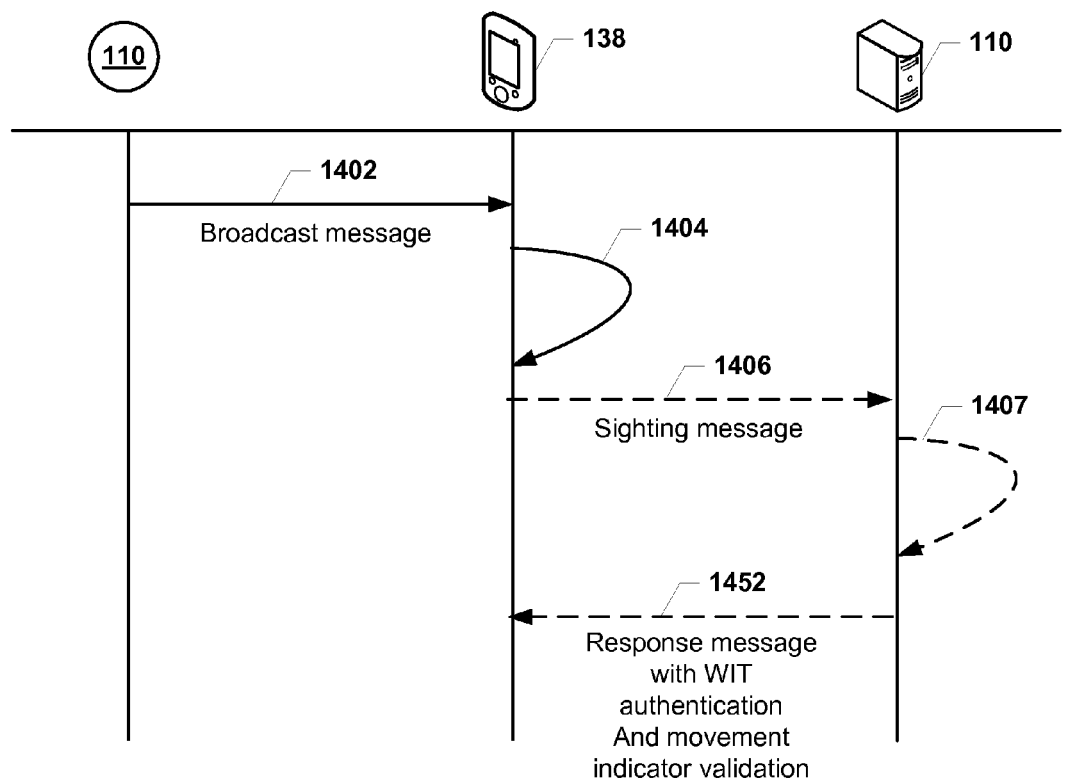
Figure 14C:
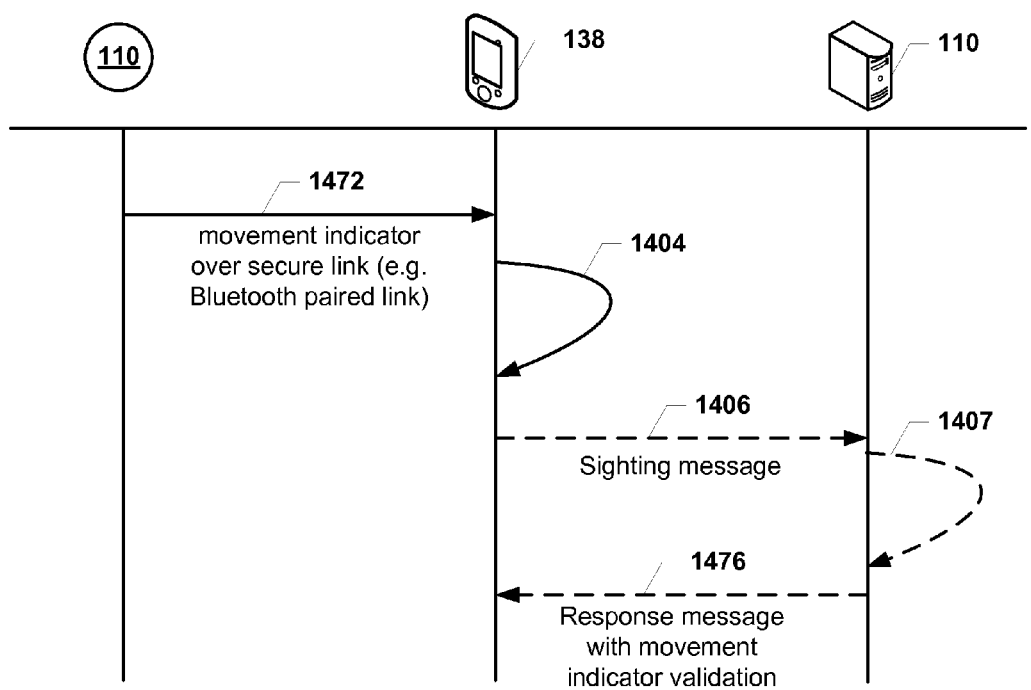

FIGS. 14A-14C illustrate exemplary signaling between a proximity broadcast receiver 138, a wireless identity transmitter 110, and a central server 120 suitable for use in the various embodiments described above. In FIG. 14A, the wireless identity transmitter 110 (or another similar beacon device) may broadcast a message 1402, such as a Bluetooth advertisement packet that includes a device identifier and optionally a movement indicator (e.g., a 64-bit representation of a value), that may be received by the proximity broadcast receiver 138 within proximity of the wireless identity transmitter 110. The proximity broadcast receiver 138 may perform various operations 1404 to process the received broadcast message, such as decoding, parsing, and otherwise evaluating data within the message 1402. Based on the operations 1404, the proximity broadcast receiver 138 may transmit an optional sighting message 1406 to the central server 120. In response, the central server may perform optional operations 1407 to process information within the optional sighting message 1406, such as identifying the wireless identity transmitter 110 based on a rolling device identifier, and may transmit an optional response message 1408 that indicates whether the wireless identity transmitter 110 is authenticated based on the optional operations 1407.

FIG. 14B illustrates signaling between a proximity broadcast receiver 138, a wireless identity transmitter 110, and a central server 120 similar to as described above with reference to FIG. 14A, except that the central server 120 may transmit an optional response message 1452 to the proximity broadcast receiver 138 that indicates both whether the wireless identity transmitter 110 is authenticated based on the optional operations 1407 and whether a movement indicator related to the wireless identity transmitter 110 and included within the optional sighting message 1406 is valid.

FIG. 14C illustrates signaling between a proximity broadcast receiver 138, a wireless identity transmitter 110, and a central server 120 similar to as described above with reference to FIGS. 14A and 14B, except that the wireless identity transmitter 110 may transmit its movement indicator over a secure link 1472 (e.g., a Bluetooth link between paired devices). Further, the central server 120 may transmit an optional response message 1476 to the proximity broadcast receiver 138 that indicates only whether a movement indicator related to the wireless identity transmitter 110 and included within the optional sighting message 1406 is valid. Authentication of the wireless identity transmitter may not be required in the scenario illustrated in FIG. 14C, as the proximity broadcast receiver 138 and the wireless identity transmitter 110 may be paired or bonded and thus their identities or trustworthiness are not in question.

Figure 15:
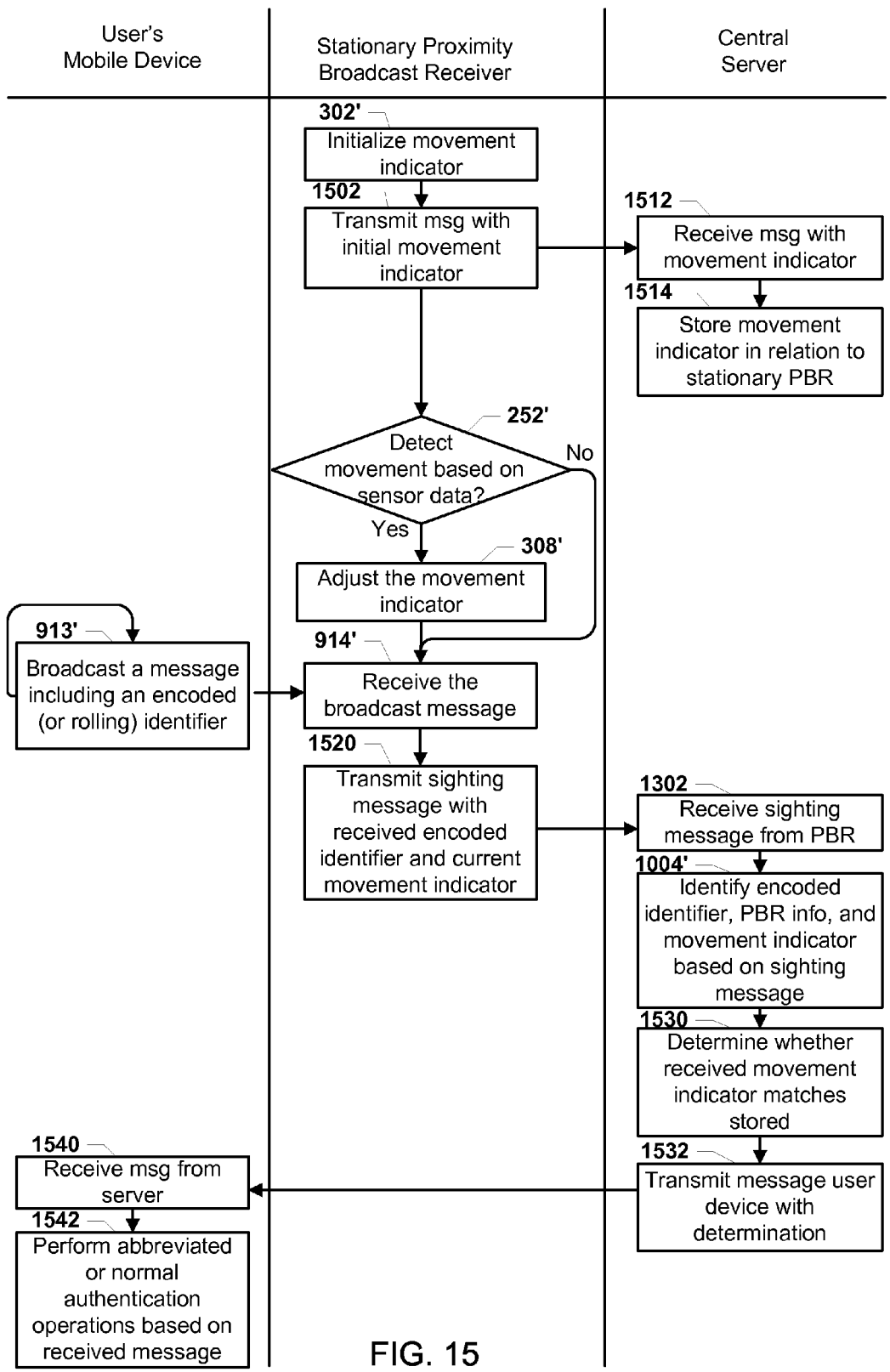
FIG. 15 is a diagram illustrating an embodiment that includes a beacon device, a central server, and a proximity broadcast receiver configured to detect movement.

FIG. 15 illustrates an embodiment signaling and operations performed by a beacon device, a central server, and a receiver device configured to detect motion or movement. In such an embodiment, the roles of beacon and receiver device as described above may be reversed. In particular, the beacon device may be a user's mobile device configured to operate at least as a wireless identity transmitter such that the device may periodically broadcast an encoded device identifier (i.e., rolling identifier). Further, the receiver computing device may be a station proximity broadcast receiver that may receive broadcast messages from the user's mobile device and relay such information within a sighting message to the central server for processing. The stationary proximity broadcast receiver may transmit a movement indicator within the sighting message to indicate whether the stationary proximity broadcast receiver has been moved, similar to as described above. The mobile device may receive messages from the central server that indicate whether the stationary proximity broadcast receiver may be trusted to be in a known location based on an evaluation of the movement indicator.

As an illustration: a laptop computing device that may typically be stationary may be within an office and configured to operate as a stationary proximity broadcast receiver. Further, a user's smartphone may typically be mobile (i.e., carried by the user from place to place) and configured to operate as a wireless identity transmitter. When the user carries his smartphone into the office, the laptop computing device may receive a broadcast message from the smartphone and transmit to a central server a sighting message that includes an encoded identifier from the broadcast message and a movement indicator maintained locally at the laptop. After determining the movement indicator matches an expected or initial value, the central server may transmit a message to the smartphone (e.g., via a cellular network connection) confirming that the laptop computing device is still in the same position it was previously and so the smartphone may perform an abbreviate authentication operation to access a local access point (e.g., WiFi router).

Referring to FIG. 15, the processor of the stationary proximity broadcast receiver (or "PBR" in FIG. 15) may initialize a movement indicator in block 302' similar to as described above with reference to the operations of block 302 of FIG. 3. The initializing operation may set the movement indicator to an initial value (or starting value), such as zero. In block 1502, the processor of the stationary proximity broadcast receiver may transmit a message to the central server that includes the initial movement indicator, such as a message transmitted using Internet protocols. The transmitted message may include other information identifying the stationary proximity broadcast receiver and/or its related registered user, such as a profile ID number or other identification and/or authentication information that may be used to associate the message with a profile stored by the central server. In block 1512, the processor of the central server may receive the message with the initial movement indicator from the stationary proximity broadcast receiver, and may store the movement indicator in block 1514. For example, the central server may store the movement indicator as a value in a data table entry associated with a profile for the stationary proximity broadcast receiver and/or a related registered user.

In determination block 252', the processor of the stationary proximity broadcast receiver may determine whether a movement is detected based on sensor data, such as accelerometer sensor data from an accelerometer sensor housed within the stationary proximity broadcast receiver. The operations in determination block 252' may be similar to those described above with reference to the movement detection operations of a wireless identity transmitter in FIG. 2B. If movement is detected based on sensor data by the stationary proximity broadcast receiver (i.e., determination block 252'="Yes"), in block 308' the processor of the stationary proximity broadcast receiver may adjust the movement indicator (e.g., increment a value, etc.) similar to as described above in block 308 with reference to FIG. 3.

Similar to as described above with reference to block 913 in FIG. 9 or block 202 of FIG. 2A, in block 913' the processor of the user's mobile device may broadcast a message including an encoded (or rolling) device identifier. As described above, operating as a wireless identity transmitter (or transceiver), the user's mobile device may broadcast this message (or signal) and the encoded identifier may be adjusted (or rolled) on a regular or periodic basis (e.g., every few seconds, minutes, etc.). For example, the user's mobile device may perform operations for broadcasting a signal with a device identifier that is rolled periodically.

If movement is not detected based on sensor data by the stationary proximity broadcast receiver (i.e., determination block 252'="No"), or if the operations of block 308' are performed, in block 914' the processor of the stationary proximity broadcast receiver may receive the broadcast message from the user's mobile device configured to operate as a wireless identity transmitter. The operations of block 308' may be similar to those described above with reference to block 308 of FIG. 3. In response to receiving the broadcast message, the processor of the stationary proximity broadcast receiver may transmit a sighting message that includes at least the mobile device's encoded device identifier from the received broadcast message and the current movement indicator of the stationary proximity broadcast receiver in block 1520. The sighting message may include other data, such as described above with reference to FIG. 6A.

In block 1302 the processor of the central server may receive the sighting message from the proximity broadcast receiver. In block 1004' the processor of the central server may identify the encoded device identifier, the stationary proximity broadcast receiver's information (e.g., identification code or ID, etc.), and the movement indicator based on the received sighting message, similar to operations of block 1004 as described above with reference to FIG. 11. In block 1530, the processor of the central server may determine whether the received movement indicator matches the stored (or expected) movement indicator for the stationary proximity broadcast receiver, and may transmit to the user's mobile device the determination in block 1532. For example, the central server may transmit a message over a wide area network that indicates whether the stationary proximity broadcast receiver has moved and thus whether it may be trusted to indicate a known location. In block 1540, the processor of the user's mobile device may receive the transmitted message from the central server. In other words, the user's mobile device may receive a message that indicates whether the stationary proximity broadcast receiver that received the user's mobile device's broadcast signal has been moved. In response, in block 1542 the processor of the user' mobile device may perform either abbreviated authentication operations or normal authentication operations based on the received message. The authentication operations in block 1542 may be considered similar to those described above with reference to block 1210 and/or block 1212 in FIG. 12A. For example, when the received message indicates the central server determined the stationary proximity broadcast receiver has moved, the user's mobile device may require complete credentials for logging into a local access point (e.g., a WiFi router). As another example, when the received message indicates the central server determined the stationary proximity broadcast receiver has not moved, the user's mobile device may perform a quick or automatic login to a local access point (e.g., a WiFi router).

As noted above, in various embodiments, the user's mobile device may be configured to operate as a wireless identity transceiver and therefore may be configured to perform operations of both a wireless identity transmitter and a mobile proximity broadcast receiver as described above with reference to FIGS. 2A-2B, 3, 4, 6A-6B, 7, 12A-12E.

Figure 16:
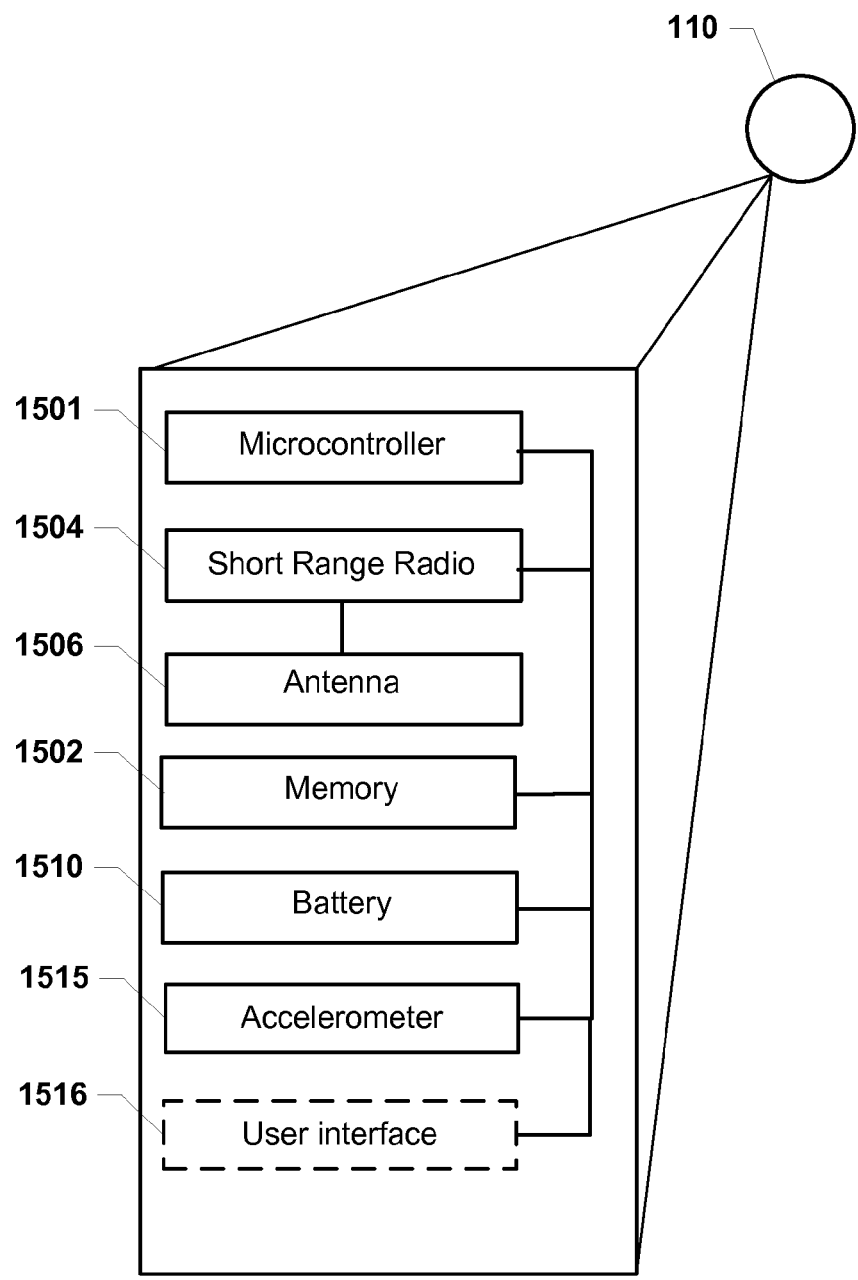
FIG. 16 is a component block diagram of a wireless identity transmitter in accordance with various embodiments.

FIG. 16 illustrates components of an exemplary wireless identity transmitter 110. The wireless identity transmitter 110 may include a microcontroller 1601 (or processor), a short-range radio 1604 (e.g., a Bluetooth® radio or transceiver) coupled to an antenna 1606, a memory 1602, and a battery 1610. Although these components are shown linked by a common connection, they may be interconnected and configured in various ways. For example, a wireless identity transmitter 110 may be configured such that the microcontroller 1601 may determine when to transmit a message based on the contents of the memory 1602. In an embodiment, the microcontroller 1601 may be a Bluetooth system-on-chip unit. The memory 1602 may also include one or more messages or message portions to be transmitted by the short-range radio 1604 via the antenna 1606 based on commands from the microcontroller 1601. The battery 1610 may supply power as needed by the other components. Also, in some implementations the microcontroller 1601, the short-range radio 1604 and/or the memory 1602 may be integrated together as a single integrated circuit. Since these components may be microchips of standard or off-the-shelf configuration, they are represented in FIG. 16 as blocks consistent with the structure of an example embodiment.

The wireless identity transmitter 110 may be coupled with or built into various objects, such as a bracelet. For example, an exemplary wireless identity transmitter 110 may be in a form easily attached to a strap, such as a watchband or dog collar. Alternate embodiments may incorporate a wireless identity transmitter 110 into mobile objects that may need tracking or on stationary objects, such as desks, etc.

The wireless identity transmitter 110 may conserve power by periodically entering a power saving mode or going to sleep, such as regularly alternating between sleeping and broadcasting of the packet with the identification code of the wireless identity transmitter 110. Various embodiments may include different cycles of broadcasting and sleeping, such as some embodiments broadcasting more or less frequently, such as waking and broadcasting every few seconds or minutes between periods of sleep.

In an embodiment, the battery 1610 may be a replaceable coin cell battery. In another embodiment, the wireless identity transmitter 110 may utilize the antenna 1606 to receive update software, instructions, or other data for storage and use in configuration operations, such as configuring transmission intervals and/or transmissions power. The wireless identity transmitter 110 may also store and execute software, algorithms, instructions, code, or other routines for generating rolling codes or identifiers, as described above. In an embodiment, the wireless identity transmitter may not maintain time (e.g., UTC) information, but may instead use a 30 ppm 16 kHz crystal as a clock. Such use of a crystal as a clock may create a timing drift of approximately 40 seconds per year.

Alternatively the memory 1602 may be contained within the microcontroller 1601, which may also include a separate processing unit. The short-range radio 1604 may be a transmitter capable of broadcasting messages or signals including a device ID or, alternatively, a transceiver configured to transmit and receive RF signals, enabling communications with other devices utilizing a communication protocol. For example, the wireless identity transmitter 110 may be configured to communicate with other short-range radio enabled devices, such as smartphones. In an embodiment, the short-range radio 1604 may be configured to communicate via various low-energy, wireless communication protocols, such as Bluetooth, LTE-D, peer-to-peer LTE-D, and WiFi-Direct.

In an embodiment, the wireless identity transmitter 110 may include a speaker (not shown) configured to emit a sound capable of being received by a proximity broadcast receiver and/or being heard by a heard by a user. For example, the wireless identity transmitter 110 may emit audible communications that may indicate its presence to listening proximity broadcast receivers. In another embodiment, the wireless identity transmitter 110 may be configured to transmit signals at varying signal strengths, thereby varying the range at which broadcasts from the wireless identity transmitter 110 may be received by proximity broadcast receivers.

Additionally, the wireless identity transmitter 110 may include one or more sensors for measuring various conditions and variables. In an embodiment, the wireless identity transmitter 110 may include an accelerometer 1615 (or any other motion sensor such as a gyroscope or gravitometer), which may collect data indicative of motion of an asset associated with the wireless identity transmitter 110. For example, the accelerometer 1615 may generate motion data describing the movements of a child carrying the wireless identity transmitter 110. In various embodiments, the wireless identity transmitter 110 may include any combination of other sensors (not shown), such as a humidity sensor, a microphone, a camera, a heat sensor, a pressure sensor, a light sensor, etc. These other potential sensors are only examples of the types of sensors that may be integrated into wireless identity transmitters 110 and other types of sensors may be included. In an optional embodiment, the wireless identity transmitter 110 may also include various user interfaces 1616, such as buttons and displays capable of receiving user inputs and/or display information, such as rendering of a current register value stored within memory 1602.

Figure 17:
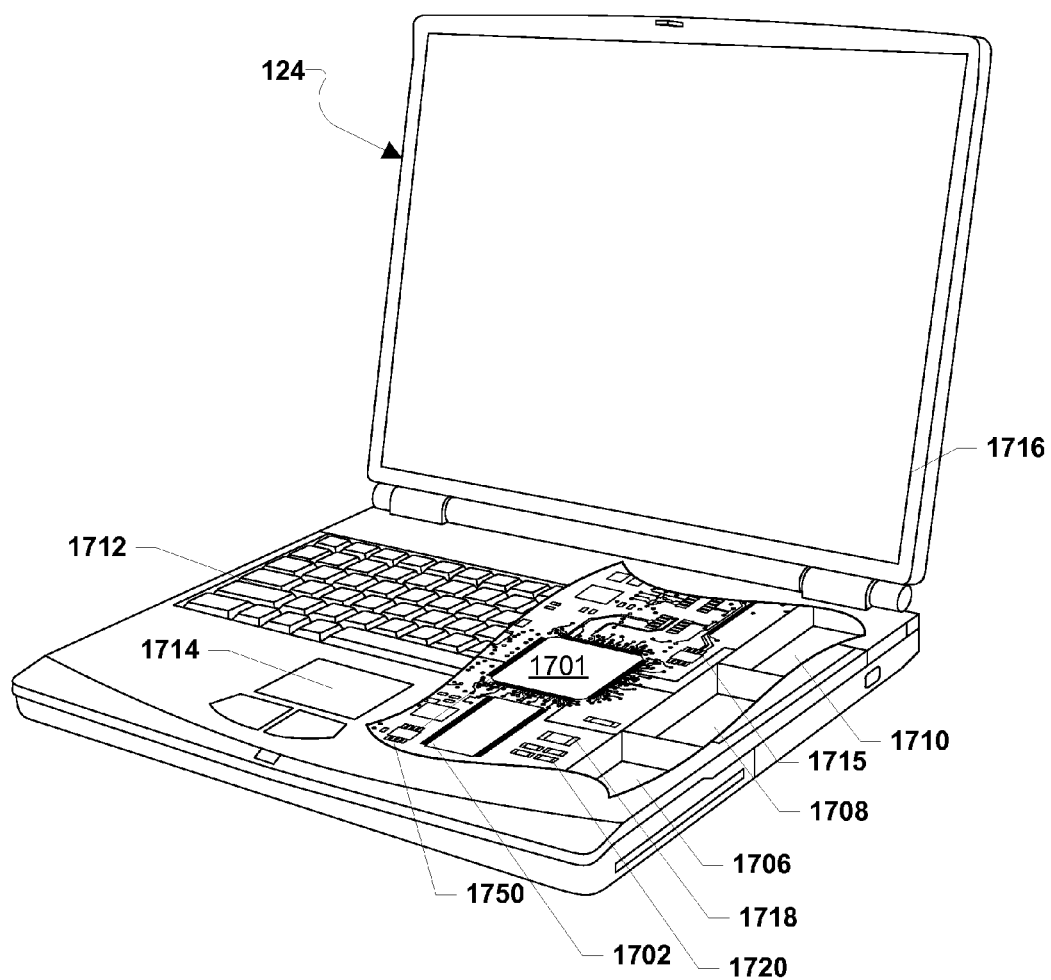
FIG. 17 is a component block diagram of a laptop computing device suitable for use in various embodiments.

Other forms of computing devices, including personal computers and laptop computers, may be used to implementing the various embodiments. Such computing devices typically include the components illustrated in FIG. 17 which illustrates an example laptop computing device 124 which may be configured to operate as a proximity broadcast receiver or merely a device for accessing the Internet. Many laptop computing devices 124 include a touch pad touch surface 1714 that serves as the computer's pointing device, and thus may receive drag, scroll, and flick gestures similar to those implemented on mobile computing devices equipped with a touch screen display. Such a laptop computing device 124 generally includes a processor 1701 coupled to volatile internal memory 1702 and a large capacity nonvolatile memory, such as a disk drive 1706. The laptop computing device 124 may also include a compact disc (CD) and/or DVD drive 1708 coupled to the processor 1701. The laptop computing device 124 may also include a number of connector ports 1710 coupled to the processor 1701 for establishing data connections or receiving external memory devices, such as a network connection circuit for coupling the processor 1701 to a network. The laptop computing device 124 may have one or more short-range radio signal transceivers 1718 (e.g., Peanut®, Bluetooth®, Zigbee®, RF radio) and antennas 1720 for sending and receiving wireless signals as described herein. The transceivers 1718 and antennas 1720 may be used with the above-mentioned circuitry to implement the various wireless transmission protocol stacks/interfaces. In a laptop or notebook configuration, the computer housing may include the touch pad touch surface 1714, the keyboard 1712, and the display 1716 all coupled to the processor 1701. Other configurations of the laptop computing device 124 may include a computer mouse or trackball coupled to the processor (e.g., via a USB input) as are well known, which may also be used in conjunction with the various embodiments. Additionally, the laptop computing device 124 may include a GPS receiver chip 1715 coupled to the processor 1701. In an embodiment, the laptop computing device 124 may also include a cellular network wireless modem chip (not shown) that enables communication via a cellular network and is coupled to the processor 1701. In an embodiment, the laptop computing device 124 may also include one or more sensors for measuring various conditions and variables, such as an accelerometer 1750 (or any other motion sensor such as a gyroscope or gravitometer), which may collect data indicative of motion of the laptop computing device 124.

Figure 18:
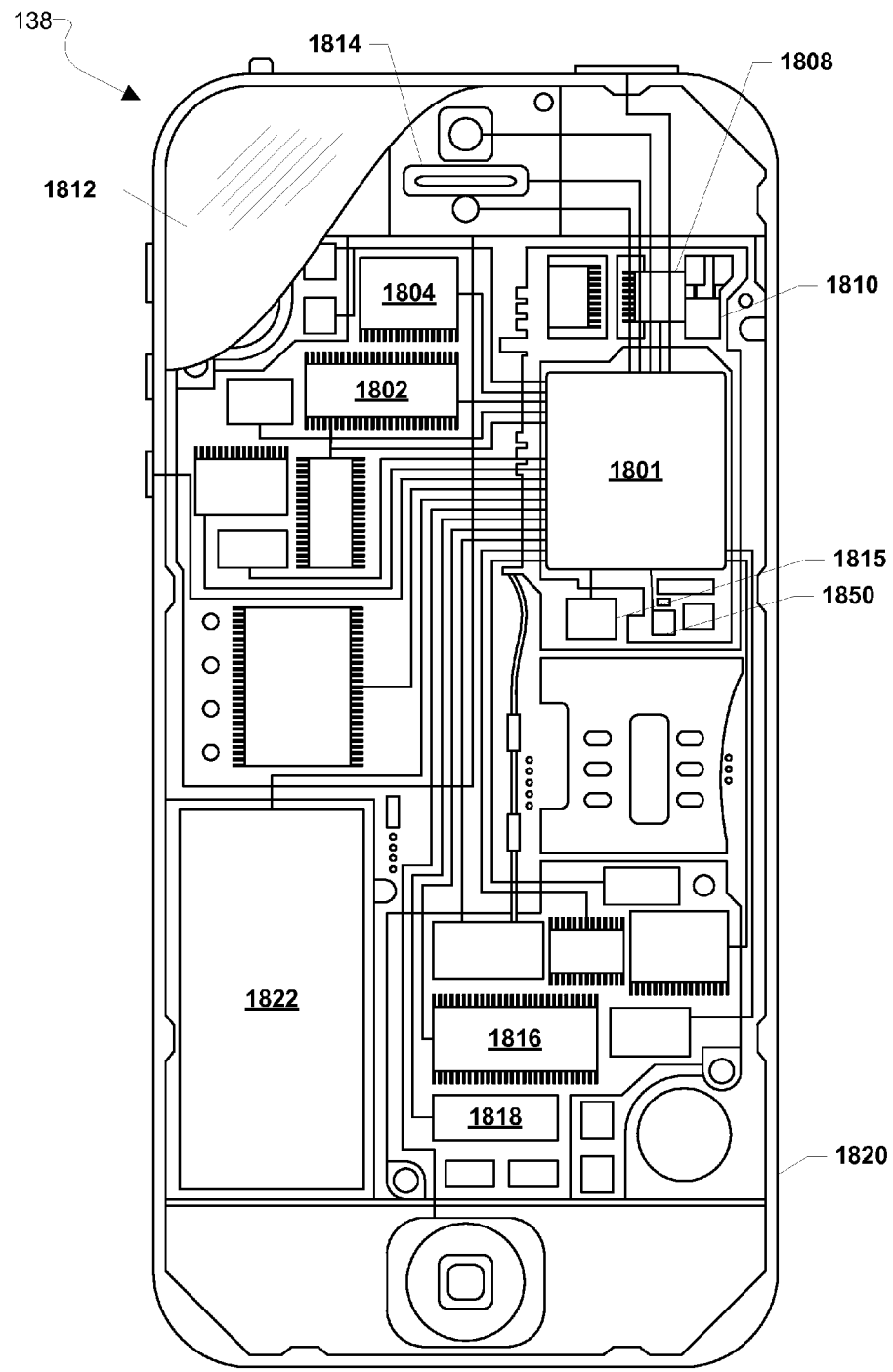
FIG. 18 is a component block diagram of a mobile computing device suitable for use in various embodiments.

FIG. 18 illustrates an exemplary mobile computing device 138. As described above, such a computing device 138 may be configured to operate as a proximity broadcast receiver (or a mobile proximity broadcast receiver). In various embodiments, the computing device 138 may include a processor 1801 coupled to a touchscreen controller 1804 and an internal memory 1802. The processor 1801 may be one or more multicore ICs designated for general or specific processing tasks. The internal memory 1802 may be volatile or nonvolatile memory, and may also be secure and/or encrypted memory, or unsecure and/or unencrypted memory, or any combination thereof. The touchscreen controller 1804 and the processor 1801 may also be coupled to a touchscreen panel 1812, such as a resistive-sensing touchscreen, capacitive-sensing touchscreen, infrared sensing touchscreen, etc. The computing device 138 may have one or more radio signal transceivers 1808 (e.g., Peanut®, Bluetooth®, Zigbee®, Wi-Fi, RF radio) and antennae 1810, for sending and receiving, coupled to each other and/or to the processor 1801. The transceivers 1808 and antennae 1810 may be used with the above-mentioned circuitry to implement the various wireless transmission protocol stacks and interfaces. The computing device 138 may include a cellular network wireless modem chip 1816 that enables communication via a cellular network and is coupled to the processor 1801. The computing device 138 may include a peripheral device connection interface 1818 coupled to the processor 1801. The peripheral device connection interface 1818 may be singularly configured to accept one type of connection, or multiply configured to accept various types of physical and communication connections, common or proprietary, such as USB, FireWire, Thunderbolt, or PCIe. The peripheral device connection interface 1818 may also be coupled to a similarly configured peripheral device connection port (not shown). The computing device 138 may also include speakers 1814 for providing audio outputs. The computing device 138 may also include a housing 1820, constructed of a plastic, metal, or a combination of materials, for containing all or some of the components discussed herein. The computing device 138 may include a power source 1822 coupled to the processor 1801, such as a disposable or rechargeable battery. The rechargeable battery may also be coupled to the peripheral device connection port to receive a charging current from a source external to the computing device 138. Additionally, the computing device 138 may include a GPS receiver chip 1815 coupled to the processor 1801. In an embodiment, the computing device 138 may also include one or more sensors for measuring various conditions and variables, such as an accelerometer 1850 (or any other motion sensor such as a gyroscope or gravitometer), which may collect data indicative of motion of the computing device 138.

Figure 19:
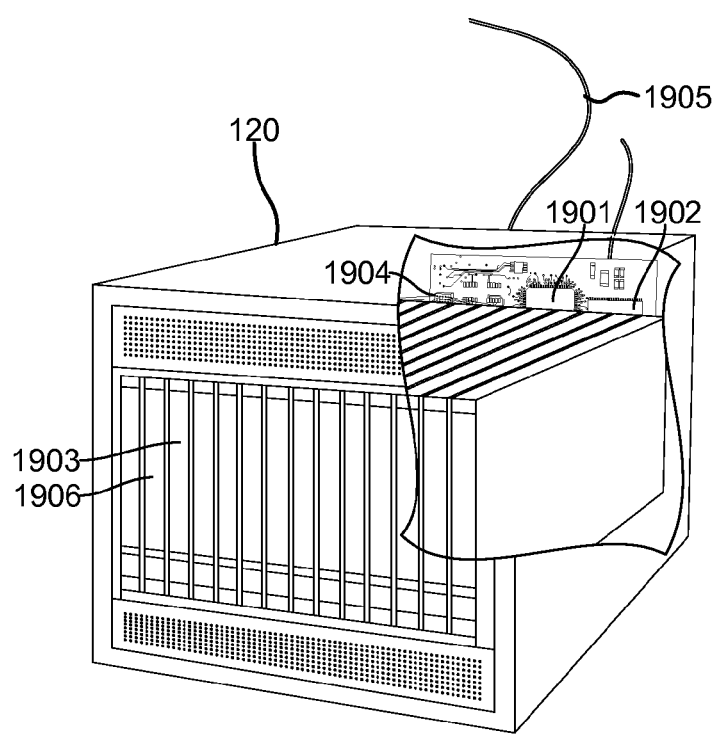
FIG. 19 is a component block diagram of a server computing device suitable for use in various embodiments.

FIG. 19 is a system block diagram of a server 120 suitable for implementing the various embodiments of this disclosure. The server 120 may be a commercially available server device. Such a server 120 typically includes a processor 1901 coupled to volatile memory 1902 and a large capacity nonvolatile memory, such as a disk drive 1903. The server 120 may also include a floppy disc drive, compact disc (CD) or DVD disc drive 1906 coupled to the processor 1901. The server 120 may also include network access ports 1904 coupled to the processor 1901 for establishing data connections with a network 1905, such as a local area network coupled to other system computers and servers.

The processors 1601, 1701, 1801, 1901 may be any programmable microprocessor, microcomputer or multiple processor chip or chips that can be configured by software instructions (applications) to perform a variety of functions, including the functions of the various embodiments described below. In some devices, multiple processors may be provided, such as one processor dedicated to wireless communication functions and one processor dedicated to running other applications. Typically, software applications may be stored in the internal memory 1602, 1702, 1802, 1902 before they are accessed and loaded into the processors 1601, 1701, 1801, 1901. The processors 1601, 1701, 1801, 1901 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, processor-executable software instructions (or processor-executable instructions), firmware, or any combination thereof. If implemented in software, the functions may be stored on or transmitted over as one or more instructions or code on a non-transitory computer-readable or processor-readable medium. The steps of a method or algorithm disclosed herein may be embodied in a processor-executable software module, which may reside on a non-transitory processor-readable storage medium or computer-readable storage medium (i.e., a non-transitory processor-readable storage medium having stored processor-executable instructions). Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for authenticating a computing device to access functionalities, comprising:
   receiving, in the computing device, a first signal from a proximity beacon device;
   obtaining, from the received first signal, information that indicates whether the proximity beacon device has detected movement;
   determining whether the obtained information from the received first signal matches stored data corresponding to the validity of a known location of the proximity beacon device;
   performing an abbreviated authentication operation for the computing device to access the functionalities in response to determining that the obtained information from the received first signal matches the stored data; and
   performing a normal authentication operation for the computing device to access the functionalities in response to determining that the obtained information from the received first signal does not match the stored data.

2. The method of claim 1, wherein the first signal is one of a broadcast message and a secure link.

3. The method of claim 1, further comprising authenticating the proximity beacon device based on the obtained information from the received first signal.

4. The method of claim 3, wherein authenticating the proximity beacon device based on the obtained information from the received first signal comprises:

transmitting a message to a server to authenticate the proximity beacon device based on the obtained information from the received first signal; and receiving from the server a response message that indicates whether the proximity beacon device is authenticated.

5. The method of claim 1, wherein the obtained information from the received first signal includes an obscured device identifier.

6. The method of claim 1, wherein the obtained information from the received first signal includes a 64-bit movement indicator.

7. The method of claim 1, wherein the abbreviated authentication operation includes automatically logging into at least one of a WiFi router, a website, and an application or automatically configuring the computing device to operate in a configuration mode.

8. The method of claim 1, further comprising:
broadcasting a second signal with a device identifier;
receiving, from a server, a message that indicates whether a proximity broadcast receiver that received the broadcast second signal has been moved;
performing the abbreviated authentication operation for the computing device to access the functionalities in response to receiving the message that indicates the proximity broadcast receiver has not been moved; and
performing the normal authentication operation for the computing device to access the functionalities in response to receiving the message that indicates the proximity broadcast receiver has been moved.

9. A computing device, comprising:
a memory;
a hardware processor coupled to the memory and configured with processor-executable instructions to perform operations comprising:
receiving a first signal from a proximity beacon device;
obtaining, from the received first signal, information that indicates whether the proximity beacon device has detected movement;
determining whether the obtained information from the received first signal matches stored data corresponding to the validity of a known location of the proximity beacon device;
performing an abbreviated authentication operation for the computing device to access functionalities in response to determining that the obtained information from the received first signal matches the stored data; and
performing a normal authentication operation for the computing device to access the functionalities in response to determining that the obtained information from the received first signal does not match the stored data.

10. The computing device of claim 9, wherein the first signal is one of a broadcast message and a secure link.

11. The computing device of claim 9, wherein the hardware processor is configured with processor-executable instructions to perform operations further comprising authenticating the proximity beacon device based on the obtained information from the received first signal.

12. The computing device of claim 11, wherein the hardware processor is configured with processor-executable instructions to perform operations such that authenticating the proximity beacon device based on the obtained information from the received first signal comprises:

transmitting a message to a server to authenticate the proximity beacon device based on the obtained information from the received first signal; and receiving from the server a response message that indicates whether the proximity beacon device is authenticated.

13. The computing device of claim 9, wherein the obtained information from the received first signal includes an obscured device identifier.

14. The computing device of claim 9, wherein the obtained information from the received first signal includes a 64-bit movement indicator.

15. The computing device of claim 9, wherein the abbreviated authentication operation includes automatically logging into at least one of a WiFi router, a website, and an application or automatically configuring the computing device to operate in a configuration mode.

16. The computing device of claim 9, wherein the hardware processor is configured with processor-executable instructions to perform operations further comprising:
broadcasting a second signal with a device identifier;
receiving, from a server, a message that indicates whether a proximity broadcast receiver that received the broadcast second signal has been moved;
performing the abbreviated authentication operation for the computing device to access the functionalities in response to receiving the message that indicates the proximity broadcast receiver has not been moved; and
performing the normal authentication operation for the computing device to access the functionalities in response to receiving the message that indicates the proximity broadcast receiver has been moved.

17. A non-transitory processor-readable storage medium having stored thereon processor-executable instructions configured to cause a processor of a computing device to perform operations for authenticating the computing device to access functionalities, the operations comprising:
receiving a first signal from a proximity beacon device;
obtaining, from the received first signal, information that indicates whether the proximity beacon device has detected movement;
determining whether the obtained information from the received first signal matches stored data corresponding to the validity of a known location of the proximity beacon device;
performing an abbreviated authentication operation for the computing device to access the functionalities in response to determining that the obtained information from the received first signal matches the stored data; and
performing a normal authentication operation for the computing device to access the functionalities in response to determining that the obtained information from the received first signal does not match the stored data.

18. The non-transitory processor-readable storage medium of claim 17, wherein the first signal is one of a broadcast message and a secure link.

19. The non-transitory processor-readable storage medium of claim 17, wherein the stored processor-executable instructions are configured to cause the processor to perform operations further comprising authenticating the proximity beacon device based on the obtained information from the received first signal.

20. The non-transitory processor-readable storage medium of claim 19, wherein the stored processor-executable instructions are configured to cause the processor to perform operations such that authenticating the proximity beacon device based on the obtained information from the received first signal comprises:
  transmitting a message to a server to authenticate the proximity beacon device based on the obtained information from the received first signal; and
  receiving from the server a response message that indicates whether the proximity beacon device is authenticated.

21. The non-transitory processor-readable storage medium of claim 17, wherein the obtained information from the received first signal includes an obscured device identifier.

22. The non-transitory processor-readable storage medium of claim 17, wherein the obtained information from the received first signal includes a 64-bit movement indicator.

23. The non-transitory processor-readable storage medium of claim 17, wherein the abbreviated authentication operation includes automatically logging into at least one of a WiFi router, a website, and an application or automatically configuring the computing device to operate in a configuration mode.

24. The non-transitory processor-readable storage medium of claim 17, wherein the stored processor-executable instructions are configured to cause the processor to perform operations further comprising:
  broadcasting a second signal with a device identifier;
  receiving, from a server, a message that indicates whether a proximity broadcast receiver that received the broadcast second signal has been moved;
  performing the abbreviated authentication operation for the computing device to access the functionalities in response to receiving the message that indicates the proximity broadcast receiver has not been moved; and
  performing the normal authentication operation for the computing device to access the functionalities in response to receiving the message that indicates the proximity broadcast receiver has been moved.

25. A communication system, comprising:
  a proximity beacon device; and
  a computing device,
  wherein the computing device comprises a first hardware processor is configured with processor-executable instructions to perform operations comprising:
    receiving a first signal from the proximity beacon device;
    obtaining, from the received first signal, information that indicates whether the proximity beacon device has detected movement;
    determining whether the obtained information from the received first signal matches stored data corresponding to the validity of a known location of the proximity beacon device;
    performing an abbreviated authentication operation for the computing device to access functionalities in response to determining that the obtained information from the received first signal matches the stored data; and
    performing a normal authentication operation for the computing device to access the functionalities in response to determining that the obtained information from the received first signal does not match the stored data, and wherein the proximity beacon device comprises:
      a first sensor configured to generate sensor data indicating movement at the proximity beacon device; and
      a second hardware processor configured with processor-executable instructions to perform operations comprising:
        transmitting the first signal that includes the information that indicates whether the movement is detected, wherein the information is at least one of a first device identifier and a movement indicator; and
        adjusting the information transmitted in the first signal when the movement is detected based on the sensor data from the first sensor.

26. The communication system of claim 25, wherein the first signal is one of a broadcast message and a secure link.

27. The communication system of claim 25, wherein the abbreviated authentication operation includes automatically logging into at least one of a WiFi router, a website, and an application or automatically configuring the computing device to operate in a configuration mode.

28. The communication system of claim 25, wherein the first hardware processor is configured with processor-executable instructions to perform operations further comprising authenticating the proximity beacon device based on the obtained information from the received first signal.

29. The communication system of claim 28, further comprising:
  a server, comprising a third hardware processor configured with processor-executable instructions to perform operations comprising:
    receiving, from the computing device, a first message to authenticate the proximity beacon device based on the information from the first signal; and
    transmitting, to the computing device, a response message that indicates whether the proximity beacon device is authenticated, and
  wherein the first hardware processor is configured with processor-executable instructions to perform operations such that authenticating the proximity beacon device based on the obtained information from the received first signal comprises:
    transmitting the first message to the server to authenticate the proximity beacon device based on the obtained information from the received first signal; and
    receiving from the server the response message that indicates whether the proximity beacon device is authenticated.

30. The communication system of claim 29, further comprising:
  a proximity broadcast receiver, comprising:
    a second sensor configured to generate sensor data indicating movement at the proximity broadcast receiver; and
    a fourth hardware processor configured with processor-executable instructions to perform operations comprising:
      transmitting to the server a second message that includes an indicator having an initial value;
      detecting movement at the proximity broadcast receiver based on the sensor data from the second sensor;
      adjusting the indicator in response to detecting the movement at the proximity broadcast receiver based on the sensor data from the second sensor;

receiving from the computing device a second signal that includes a second device identifier associated with the computing device; and transmitting to the server a sighting message that includes at least the second device identifier from the received second signal and the indicator, wherein the first hardware processor is configured with processor-executable instructions to perform operations further comprising:

broadcasting the second signal with the second device identifier;

receiving, from the server, a third message that indicates whether the proximity broadcast receiver that received the broadcast second signal has been moved;

performing the abbreviated authentication operation for the computing device to access the functionalities in response to receiving the third message from the server that indicates the proximity broadcast receiver has not been moved; and performing the normal authentication operation for the computing device to access the functionalities in response to receiving the third message from the server that indicates the proximity broadcast receiver has been moved, and wherein the third hardware processor is configured with processor-executable instructions to perform operations further comprising:

receiving, from the proximity broadcast receiver, the second message that includes the indicator having the initial value;

storing the indicator having the initial value;

receiving, from the proximity broadcast receiver, the sighting message;

determining whether the proximity broadcast receiver has been moved based on whether the indicator from the received sighting message matches the stored indicator having the initial value; and transmitting, to the computing device, the third message that indicates whether the proximity broadcast receiver that received the broadcast second signal has been moved based in response to determining whether the proximity broadcast receiver has been moved.

* * * * *